United States Patent
Tucker et al.

(10) Patent No.: US 10,098,132 B2
(45) Date of Patent: *Oct. 9, 2018

(54) SECURE, DISTRIBUTED HIERARCHICAL CONVERGENCE NETWORK

(71) Applicant: CoCo Communications Corp., Seattle, WA (US)

(72) Inventors: Mark L Tucker, Seattle, WA (US); Jeremy Bruestle, Seattle, WA (US); Riley Eller, Seattle, WA (US); Brian Retford, Seattle, WA (US); Choong Ng, Seattle, WA (US)

(73) Assignee: COCO COMMUNICATIONS CORP, Seattle, WA (US)

( * ) Notice: Subject to any disclaimer, the term of this patent is extended or adjusted under 35 U.S.C. 154(b) by 388 days.

This patent is subject to a terminal disclaimer.

(21) Appl. No.: 14/886,704

(22) Filed: Oct. 19, 2015

(65) Prior Publication Data

US 2016/0143075 A1 May 19, 2016

Related U.S. Application Data

(63) Continuation-in-part of application No. 13/948,062, filed on Jul. 22, 2013, now Pat. No. 9,167,619, which
(Continued)

(51) Int. Cl.
*H04B 7/00* (2006.01)
*H04W 72/10* (2009.01)
(Continued)

(52) U.S. Cl.
CPC .......... *H04W 72/10* (2013.01); *H04L 63/0823* (2013.01); *H04M 15/31* (2013.01); *H04M 15/48* (2013.01); *H04M 15/8061* (2013.01); *H04W 4/10* (2013.01); *H04W 4/24* (2013.01); *H04W 12/06* (2013.01); *H04W 76/45* (2018.02); *H04W 84/08* (2013.01); *H04W 12/04* (2013.01); *H04W 16/14* (2013.01)

(58) Field of Classification Search
USPC ..................................... 455/518, 41.1–41.3
See application file for complete search history.

(56) References Cited

U.S. PATENT DOCUMENTS 5,552,798 A   9/1996  Dietrich et al.
6,643,258 B1 * 11/2003  Ise ........................ H04L 47/10
                                                         370/230
(Continued)

FOREIGN PATENT DOCUMENTS

WO        0156236 A1    8/2001

*Primary Examiner* — Fayyaz Alam
(74) *Attorney, Agent, or Firm* — Lowe Graham Jones PLLC; Raymond Armentrout

(57) ABSTRACT

A facility for performing employing multiple frequencies in a secure distributed hierarchical convergence network is described. The facility receives a signal in a first frequency, converts the received signal to an internal representation, applies a business rule to the converted signal, and, when the business rule indicates that the signal should be transmitted in a second frequency, causes the internal representation of the signal to be translated to a second frequency and transmitted in the second frequency.

20 Claims, 37 Drawing Sheets

| Current Communications Environment | | | | |
|---|---|---|---|---|
| Application | SMS | Full Channel Analog Voice | Narrow Band | Encrypted |
| Transport | GSM Full Duplex Voice | Raw Waveform Kenwood | Motorola Half Duplex P25 | AN/URC 100 series |
| Frequency | 850/1900 MHz | 235-300 MHz | 700/800 MHz | 225-416 MHz |
| Divisions | Commercial | Public Safety | Government DHS | Military |

Related U.S. Application Data is a continuation of application No. 12/160,598, filed as application No. PCT/US2006/006471 on Feb. 23, 2006, now Pat. No. 8,494,458.

(60) Provisional application No. 60/655,808, filed on Feb. 23, 2005.

(51) Int. Cl.
| | | |
|---|---|---|
| *H04W 76/45* | (2018.01) | |
| *H04W 4/10* | (2009.01) | |
| *H04W 84/08* | (2009.01) | |
| *H04L 29/06* | (2006.01) | |
| *H04W 12/06* | (2009.01) | |
| *H04M 15/00* | (2006.01) | |
| *H04W 4/24* | (2018.01) | |
| *H04W 16/14* | (2009.01) | |
| *H04W 12/04* | (2009.01) | |

(56) References Cited

U.S. PATENT DOCUMENTS

| | | | |
|---|---|---|---|
| 9,307,370 B1* | 4/2016 | Pai | H04W 4/10 |
| 2001/0030785 A1 | 10/2001 | Pangrac et al. | |
| 2003/0002477 A1 | 1/2003 | Israel et al. | |
| 2003/0061363 A1 | 3/2003 | Bahl et al. | |
| 2003/0198200 A1* | 10/2003 | Diener | H04L 1/1664 370/329 |
| 2004/0121729 A1 | 6/2004 | Herndon et al. | |
| 2008/0096597 A1* | 4/2008 | Vempati | H04W 4/10 455/518 |
| 2014/0141794 A1* | 5/2014 | Smith | H04W 16/14 455/454 |
| 2016/0157103 A1* | 6/2016 | Teng | H04W 16/14 370/329 |
| 2017/0303308 A1* | 10/2017 | Hassan | H04W 74/004 |

\* cited by examiner

| Application | SMS | Full Channel Analog Voice | Narrow Band | Encrypted |
|---|---|---|---|---|
| Transport | GSM Full Duplex Voice | Raw Waveform Kenwood | Motorola Half Duplex P25 | AN/URC 100 series |
| Frequency | 850/1900 MHz | 235-300 MHz | 700/800 MHz | 225-416 MHz |
| Divisions | Commercial | Public Safety | Government DHS | Military |

Current Communications Environment

*FIG. 1*

SECURE, DISTRIBUTED HIERARCHICAL CONVERGENCE NETWORK

CROSS-REFERENCE TO RELATED APPLICATION

This application is a Continuation application of U.S. Non-Provisional application Ser. No. 13/948,062, filed on Jul. 22, 2013, published as U.S. Publication No. 2013/0308495, and entitled "SECURE, DISTRIBUTED HIERARCHICAL CONVERGENCE NETWORK," which is a Continuation of U.S. Non-Provisional application Ser. No. 12/160,598, filed on Jul. 10, 2008, and entitled "SECURE, DISTRIBUTED HIERARCHICAL CONVERGENCE NETWORK," which issued to U.S. Pat. No. 8,494,458 on Jul. 23, 2013, and which is a U.S. National Stage application of International Application No. PCT/US06/06471, filed on Feb. 23, 2006, and entitled "SECURE, DISTRIBUTED HIERARCHICAL CONVERGENCE NETWORK," which claims the benefit of U.S. Provisional Patent Application Ser. No. 60/655,808, filed on Feb. 23, 2005, and entitled "Secure, Distributed Hierarchical Convergence Network," the contents of which are incorporated herein by reference in their entireties.

BACKGROUND

In the land mobile radio (LMR) communication environment LMR networks conventionally use a single frequency range to transmit and receive radio signals. There exist many types of LMR networks using many transport and modulation schemes carrying different types of formatted information in the radio wave. The most basic are analog information and currently the most advanced are P25 & Tetra standards-based digital transmissions. LMR networks generally carry half duplex or multi channel duplex voice communications. Additionally, the digital based LMR networks are capable of carrying low bandwidth data.

Commercial wireless carrier networks use commercial frequency ranges to carry full duplex voice and packet data. The U.S. military makes use of other frequency areas in various low band and high band ranges carrying a variety of voice and data transmissions. The frequency ranges are separate from the public safety, government and commercial ranges so that the transmissions have minimal radio interference with each other. Additionally, multiple modulation schemes and transports exist between wireless carriers and vary greatly on military bands. Add to this the public broadband frequency allocations for 802.11 and other publicly available spectrum areas and the spectrum chart break down is fragmented in no particular order with a large number of incompatible modulation schemes and transports making it very difficult for specific voice and data applications using separate frequencies and networks to intemperate, as is illustrated in FIG. 1. FIG. 1 further illustrates GSM with SMS with full-duplex voice, UHF LMR analog with full channel voice with no transport layer, 800 MHz LMR P25 with narrow band voice, and military band for voice.

This stove piped frequency and transport arrangement has never been ideal but now there is an urgent need by the government and military with a compelling business case for commercial communication companies to be able to interoperate and communicate between frequencies and disparate networks using both existing and next generation equipment.

BRIEF DESCRIPTION OF THE DRAWINGS

FIG. 1 is a block diagram illustrating the current communications environment.

DETAILED DESCRIPTION

A facility is described for unification of disparate networks and devices into a secure, distributed, self-healing, peer-to-peer-style system of systems and its associated provisioning, management, monitoring, and group communication schemes.

The facility provides an ability to "converge" existing radio, wireless carrier, broadband wireless, and satellite and terrestrial networks together for use with existing equipment and next generation equipment to operate as a single scalable system or network with a controlled common environment for voice, video and data applications requires new methodology and approaches. The facility further provides ways for controlled distributed peering, services abstraction, frequency management, network monitoring and management, provisioning and group policy enforcement are needed.

The underpinnings for converged networks is the inter-frequency management system, the multi-peer methodology, transport and services abstraction process and the common policy and security systems that dynamically controls the use and operation of the converged network.

Inter-frequency Management

Inter-frequency management can be regarded as taking stove-piped or separate frequency usage ranges and allowing networks of different frequencies to work together in a controlled way. Points that exist on a network that provide a frequency and network intersection perform a transport translation to convert information that is transmitted on one network to conform with the transport format of another network. This is the most basic form of "seaming" different frequencies and network types together. The following process can be added to the basic seaming method to create a controlled converged environment in which the underlying network and frequency resources are managed to allow the converged network to function as a single system.

Figure 2:
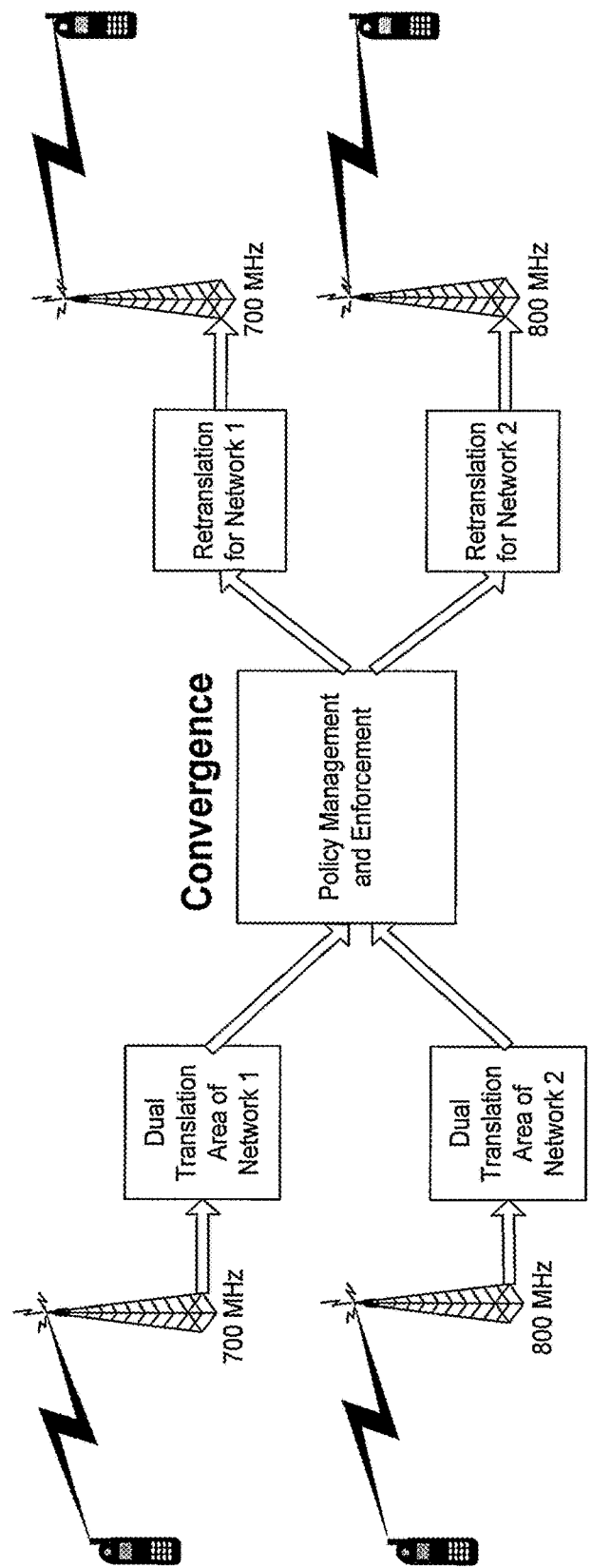
FIG. 2 is a block diagram illustrating peering points between two networks.

Each peering point should be aware of and be able to translate and enforce the policy or operating rules of the converged network. To accomplish this a secure consistent policy management system is part of the design of the converged network and every peering point in the network includes a method of translating and enforcing, to the extent possible, the rules or charter set forth for the network and individual transmissions. The peering point should be aware of the capacity, performance, and current load of both (can peer many networks at a single point but two has the same requirements) the networks it peers including frequency usage, as is illustrated in FIG. 2.

As illustrated therein, the peering point receives transmission from both networks and depending on the policy rules performs a transport translation and an application translation so that the transmission and communication task continue through both systems. Because the peering point has information for both networks pertaining to network capacity, frequency capacity, and activity, the peering point can throttle, prioritize, cache, and application abstract and sync to enforce the policy rules of the transmission streams being received, as is illustrated in FIG. 3.

Figure 3:
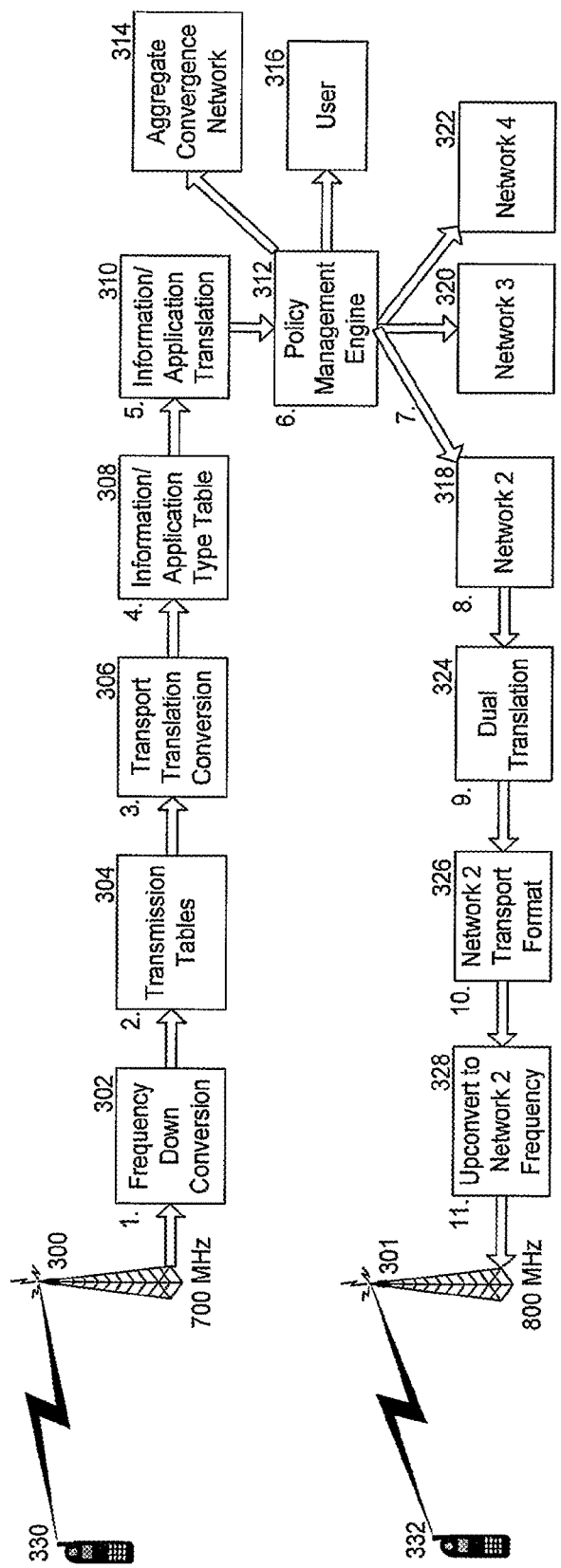
FIG. 3 is a flow diagram illustrating a process flow for peering point transmission management.

FIG. 3 is a flow diagram illustrating a process flow for peering point transmission management. As is illustrated therein, the peering point goes through the following process:

0. A network subscriber 330 uses a service on network 300.
1. Peering point down converts 302 frequency of network 1 to digital transmission form.
2. Peering point finds the transmission type through a match lookup table 304
3. Peering point performs transport translation abstraction process 306 to common transport format
4. Peering point finds information or application payload type through a match look up table 308
5. Peering point performs information or application payload translation and abstraction process 310
6. Policy rules are applied 312 to abstracted transport and information data
7. Decision tree determines next step and interface criteria with other network (314, 316, 318, 320, 322)
8. If passed, rules-test-abstracted information begins the send-through to network 2 (301) process 318
9. Peering point performs retranslation process 324 from abstracted information to network 2 specific information or application format
10. Peering point performs retranslation 326 from common transport format to network 2 specific transport
11. Peering point performs upconvert 328 from digital form to network 2 frequency transmission
12. Network 2 provides services to network subscriber 332

The result of this process is that both networks' frequency utilization, network load, and application activity is managed by the peering point and cross network transmissions are blended into the existing activity of each individual network. With the appropriate business rules in place, frequency resource allocation can be managed as well as consistent environment "convergence" applications such as abstracted voice talk groups can be synchronized with the underlying networks' (refer to network 1 and 2 in FIG. 3) different transport and proprietary talk group or plain push-to-talk technology including simple channelized analog voice.

FIG. 3 illustrates a process of transmission management received at one end of the peering point, performing frequency down-convert to digital, transmission recognition phase, transport translation process, determining what type of information or application abstraction is required, enforcing business rule/policy decisions on the abstracted information, forking to show decision logic to pass the stream through to another network or not, determining what type of information retranslation is needed for sending through to the other network for the information, transmission retranslation process, and upconvert and out on the frequency of the other network.

Figure 4:
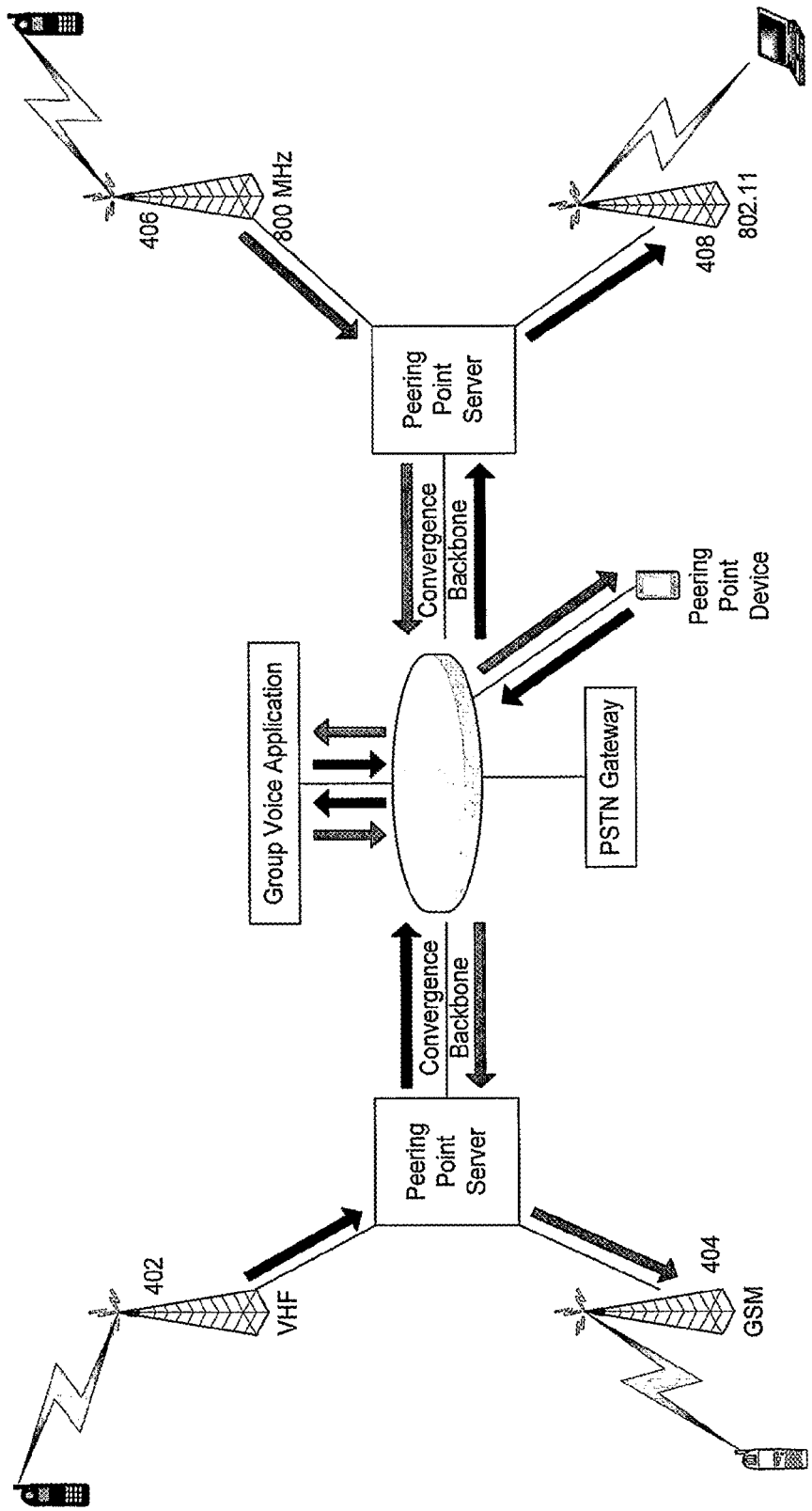
FIG. 4 is a block diagram illustrating peering point bridging networks.

FIG. 4 is a block diagram illustrating bridging networks using peering points. The figure illustrates a peering point with four networks being bridged or managed: a VHF analog network 402, a P.25 800 MHz network 406, a GSM network 404, and an 802.11 network 408. Also shown is the process for dual network peering. The application and information identification indicating a voice call on the GSM or push to talk on the VHF analog on channel 7 is shown, along with a P.25 narrow band voice talk group participating on P.25 800 MHz and a PDA push to talk on the 802.11 network. For each one of these, the specific application or information translation has a type match for group voice. The figure illustrates an abstracted application translation to an internetwork group voice application format. Also illustrated is the retranslation and sending out portion of FIG. 3, reversed from the first part of this figure.

As is illustrated in FIG. 4, the dual abstraction, charter based peering point technique described herein is not only applicable to LMR network types, but also can be applied to wireless carrier, satellite, terrestrial backbone, public WiFi and peer-to-peer types of networks or any combination thereof.

Peering Point Management and Achieving Convergence Networking

Figure 5:
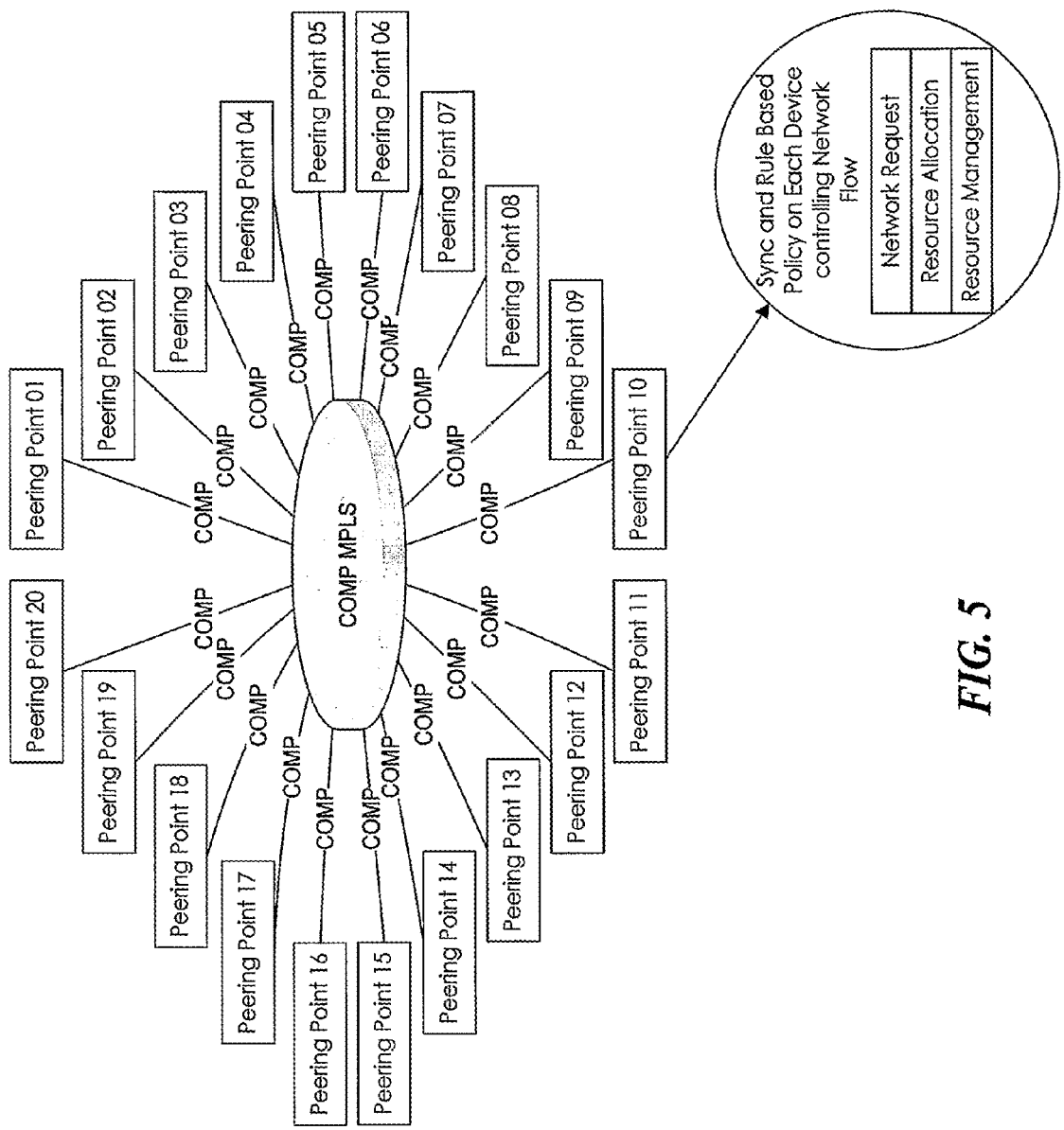
FIG. 5 is a block diagram illustrating a controlled interoperability meshed peering network.

By providing a consistent convergence networking environment through a dually abstracted transport and application layer, a truly functional convergence network can be obtained. There are multiple methods through which a consistent convergence layer can be achieved to make multiple peering points behave in a consistent and synchronized way through policy-based rule sets. One method is to have a central resource (e.g., transaction) server or series of servers that can coordinate rule set validations and resource requests. A second method is to have a peer-to-peer or distributed methodology that enables each network or frequency peering point to decide how to enforce the collective convergence network policy so that the convergence network functions as a single network in a secure mesh topology, as is illustrated in FIG. 5.

Extending the power of the controlled peering into a consistent abstracted application is very powerful. The dual abstraction method for abstracting both the transport and the information or application payload is important for creating controllability and scale for convergence network applications to provide true country wide or global interoperability such as multi-frequency, inter-network group voice, push-to-talk, conferencing or talk group functionality as is illustrated in FIG. 5. This figure illustrates 20-50 mesh style policy-based peering points similar to FIG. 4, but showing COMP riding on MPLS, indicating that network-wide requests, resource allocation and management is all coordinated and in sync based on a consistent policy based rule set enforced at every peering point.

Figure 6:
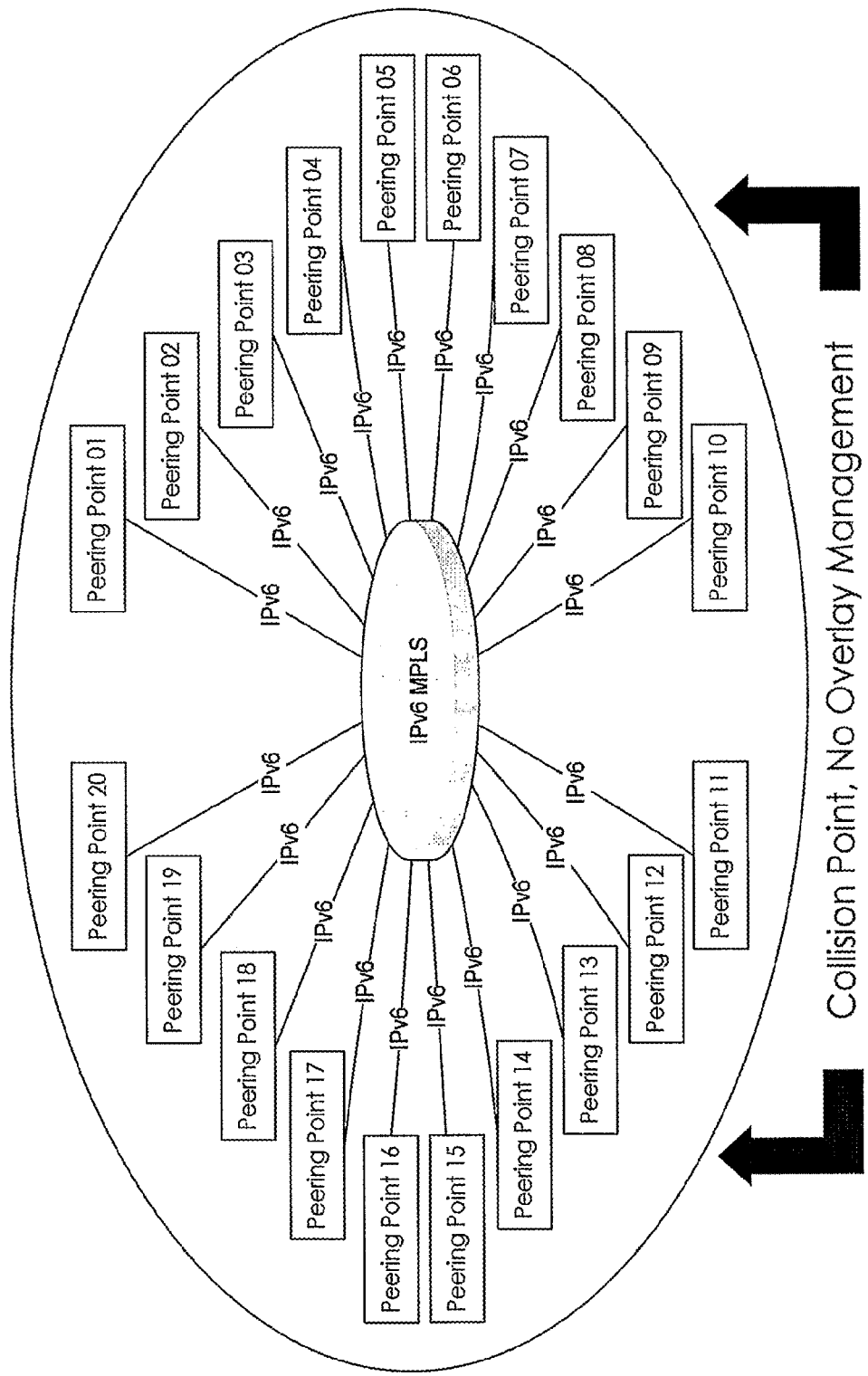
FIG. 6 is a block diagram illustrating non-controlled peering using 1Pv6.

Without the ability for the peering point to manage the frequency resources and control the underlying networks through rules set by the policy charter in addition to generalizing the information and tasks being transmitted to a common format large scale multi-frequency, inter-network interoperability may not be possible. Once multiple peering points and hundreds of networks are seamed together without coordinated control of the peering points and networks to operate as a single converged network collisions, noise, over-capacity, latency and resource allocation request starving will occur. This type of unusable network scenario will occur if, say, 100 to 500 peering points simply translated transport and payload between frequencies and networks such as when using IP or IPv6 as the backbone between dual 100-500 peering points. This is illustrated in FIG. 6. According to FIG. 6, 20-50 basic frequency translation boxes are connected via IPv6 without policy management or knowledge of the overall network scheme or application abstraction. Also illustrated is how the collisions that non-controlled peering would damage performance on all networks.

Economically Enforced Frequency Migration

One of the difficult problems in frequency management by NTIA and FCC is how to migrate customers from one frequency range to another. The problem is that if frequency capacity is reached and a customer needs a larger spectrum range to handle the load, a new frequency is granted and the new LMR network is installed using the new range. The old equipment still needs to be used for some time during the migration process. What currently happens is that the old frequency range and original LMR network is used for extended periods because of coverage issues of the new system and budget constraints that do not allow everyone to have a new device with adequate new infrastructure to cover a large enough coverage footprint. Therefore, frequency migration is potentially taking up twice the total spectrum allocation required, adding to the fragmentation problem and creating an environment where frequency resources are becoming even scarcer. This problem is anticipated to increase when national radio networks, such as the joint DHS, DOJ, and Treasury project for a national integrated wireless network, come on line. A method for encouraging multi-frequency, multi-network usage is needed along with a method for encouraging frequency migration to be completed in a timely manner.

Figure 34:
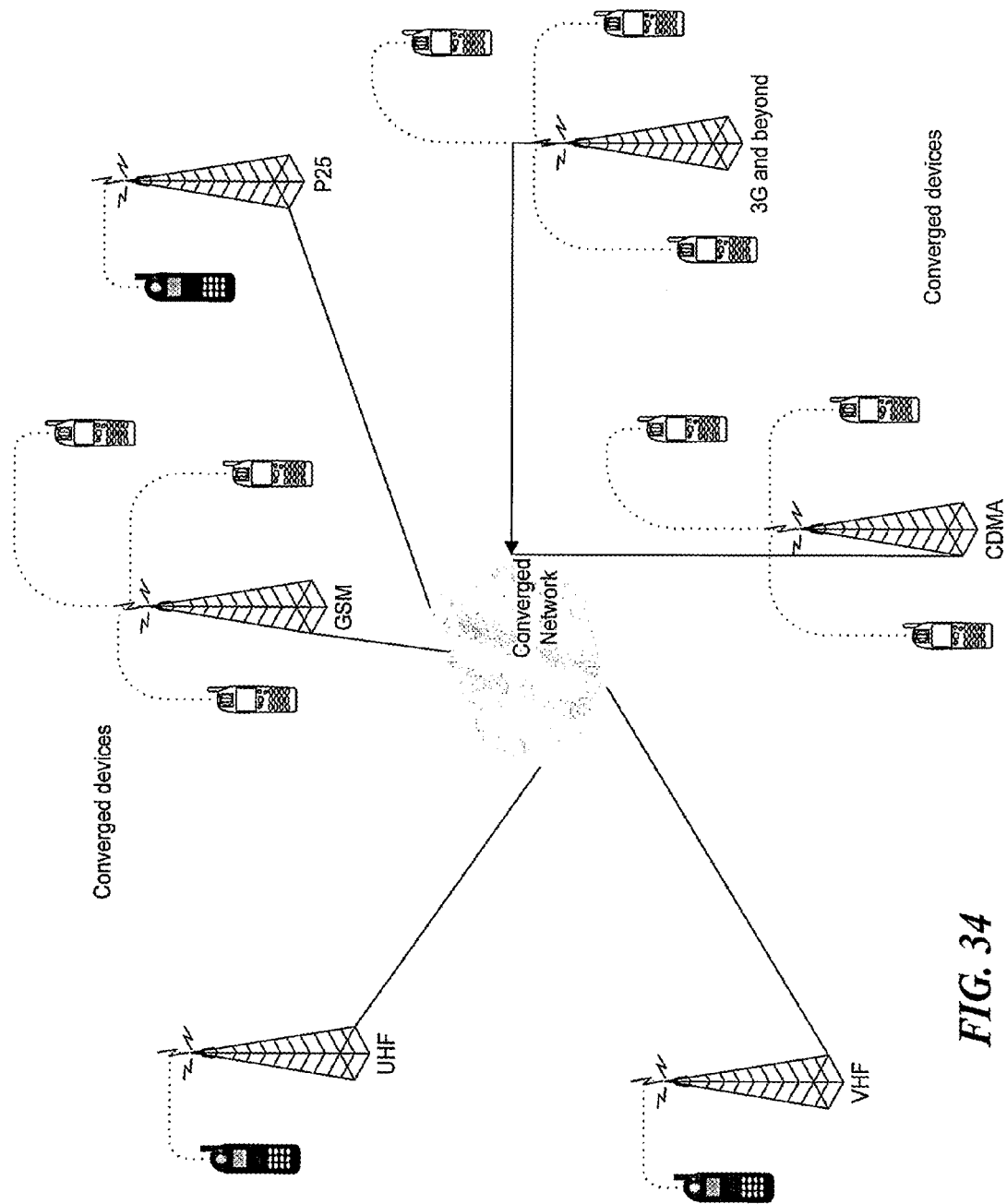
FIG. 34 is a block diagram illustrating a model for migrating toward converged devices.
Figure 35:
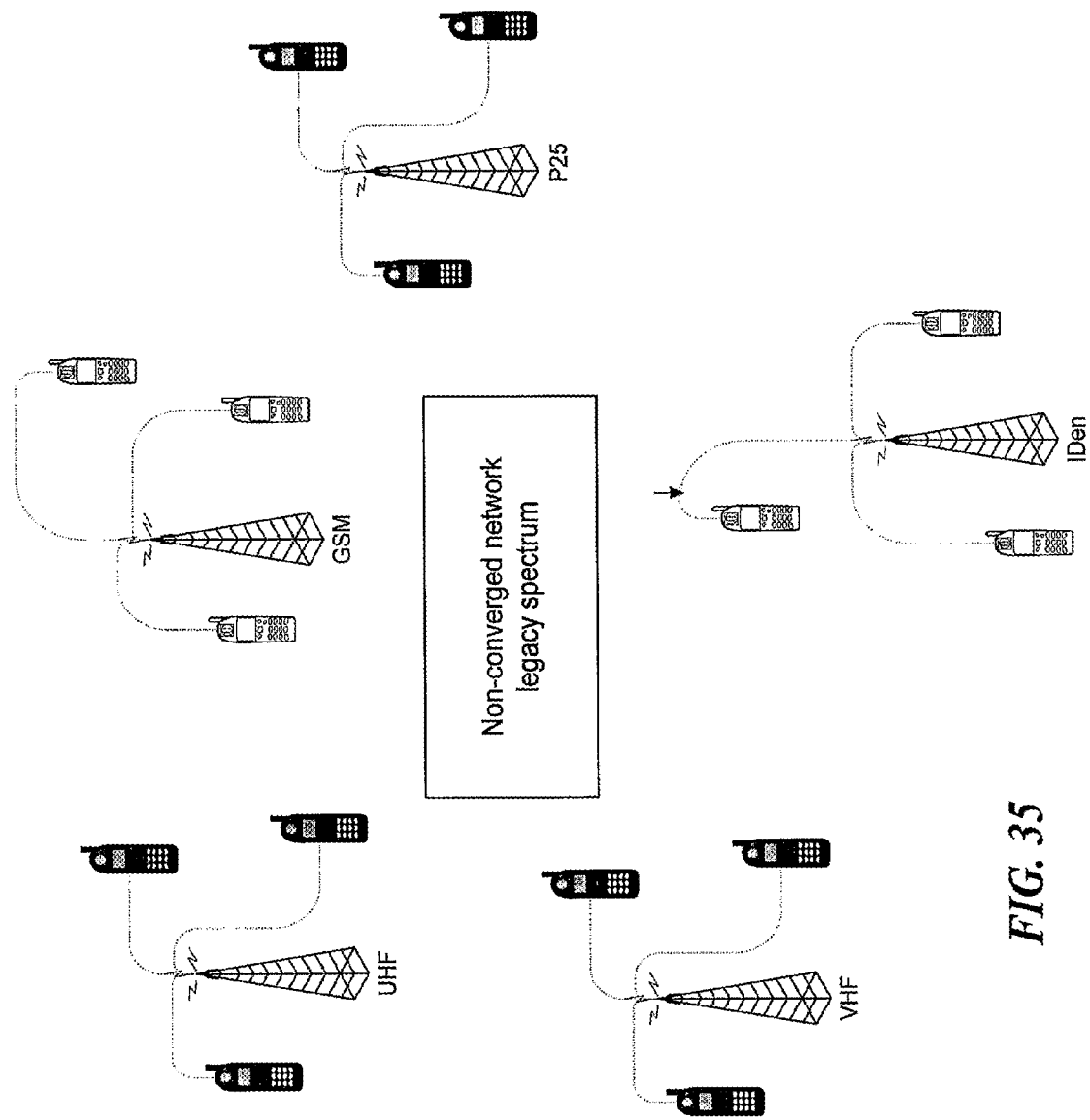
FIG. 35 is a block diagram illustrating a non-converged network legacy spectrum.
Figure 36:
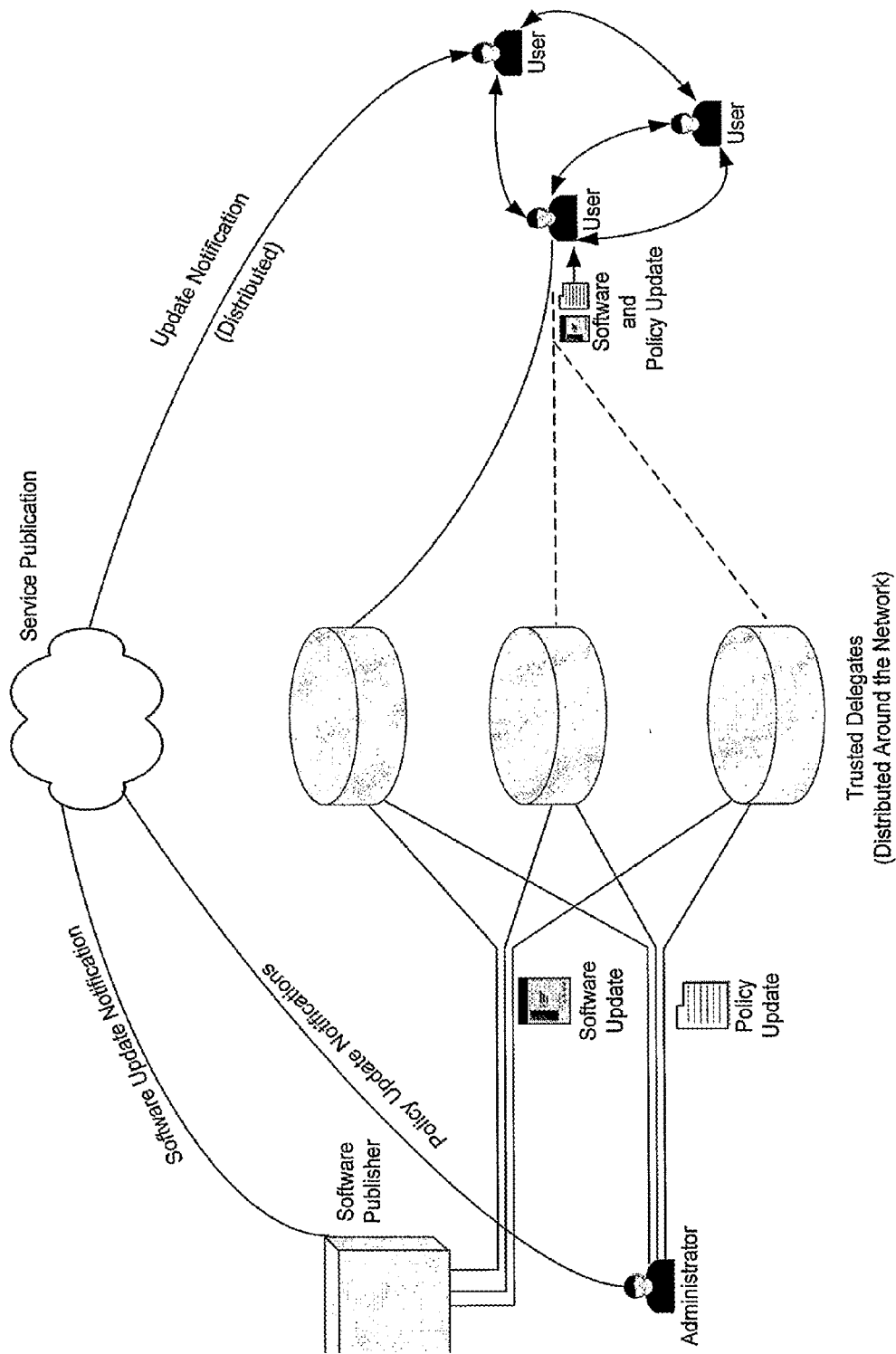
FIG. 36 is a block diagram illustrating a publication and subscription model employed by various embodiments.
Figure 37:
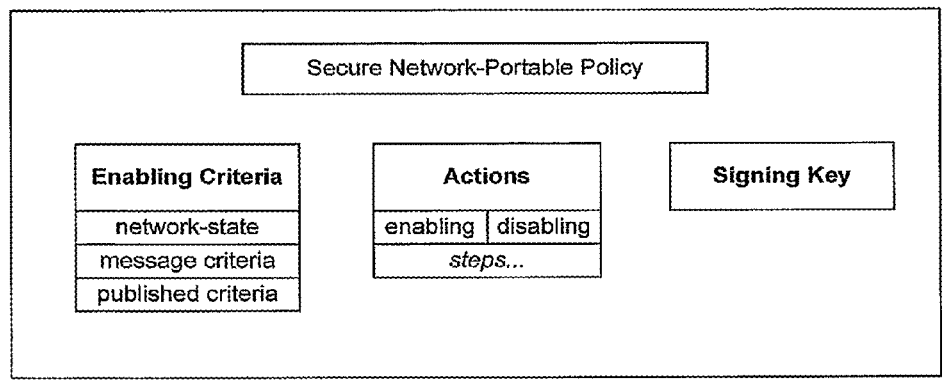
FIG. 37 is a block diagram illustrating delegated off-line provisioning.
Figure 37:
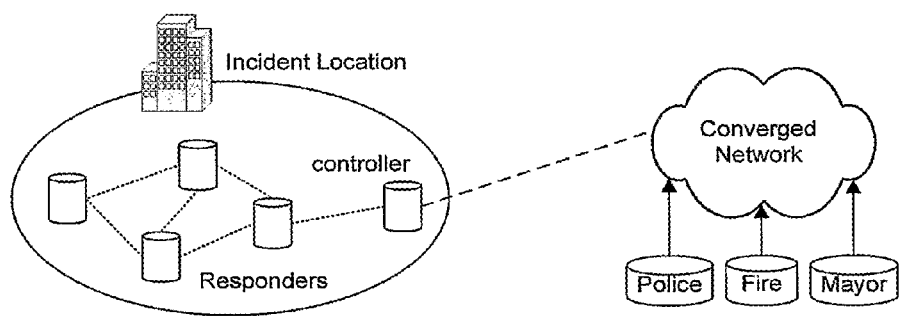
Figure 37:
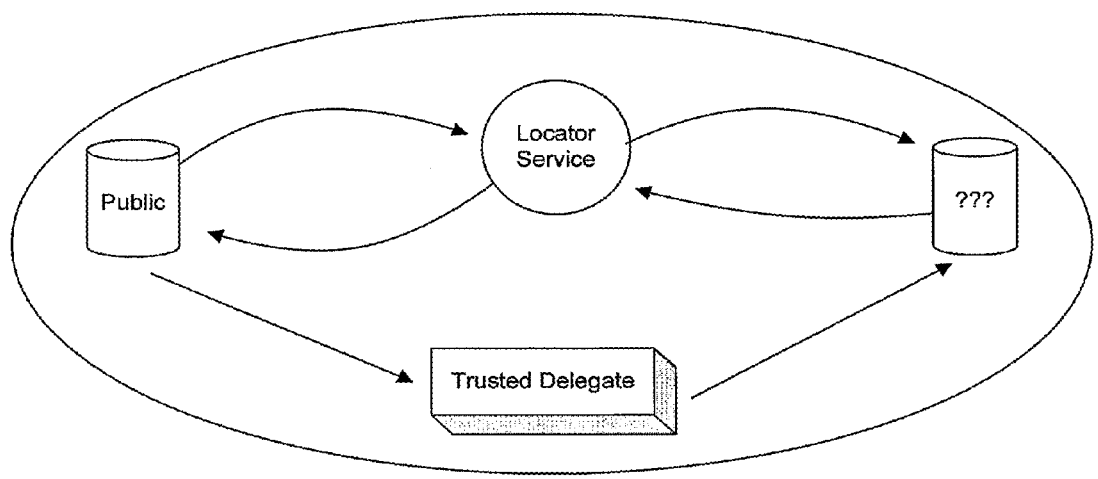

A method for economically enforcing frequency migration is an answer to this problem. Using the multi-frequency, multi-network peering technique and convergence network control as described above provides a consistent way to measure frequency range usage by quantifying radio transmissions in a way that calculates bandwidth utilization during the peering point's dual abstraction process and provides a way to measure usage in a generalized method so that policy rule enforcement and a quantifiable billing rate can be assessed for usage of the original frequency range over time. This makes it possible for controlling agencies to assess a migration time value based on a monetary agreement without disrupting the operational use of communications on the original network. Hence, if a customer wants to keep running their old system past the time agreed upon, a mechanism for charging a fee on a usage or activity basis can be enforced by the peering points depending on the usage and the policy. This should encourage migration or allow a quantifiable method for keeping both spectrum allocations, as it can now be budget for total cost of ownership. This provides an efficient mechanism for frequency migration, as is illustrated in FIG. 34. FIG. 34 is a block diagram illustrating a model for migrating toward converged devices.

Inter-agency Frequency Clearinghouse

Figure 7:
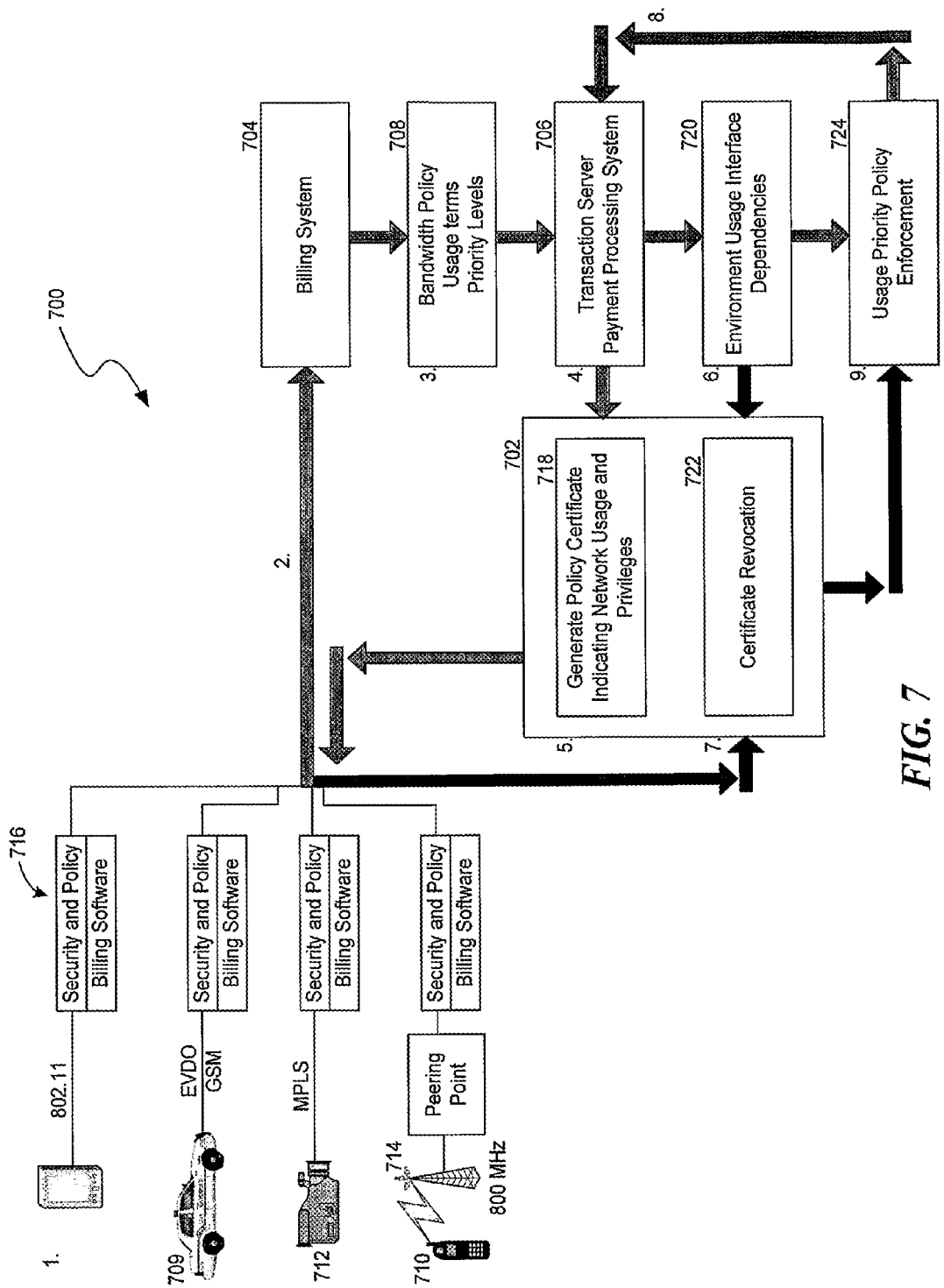
FIG. 7 is a block diagram illustrating a billing clearing house.

To extend this one step further, it is now possible to define a new method of frequency allocation. Instead of providing bulk frequency range grants, controlling agencies can provide frequency ranges that are used by many different networks and customers (e.g., agencies). The allocation of the range takes the form of bandwidth, utilizing the frequency to bandwidth conversion as described above, and usage criteria that is then utilized on demand. This frequency clearing house process allows networks and devices that have the proper identity and policy charter to pay for the bandwidth and its related frequency resource usage on a prepaid, monthly, or per use basis. The result is a more efficient method of spectrum allocation and resource usage. The price for usage can be set to a floating rate based on the availability of resources and the usage criteria. An example of this is to allocate a frequency range that allows network peering points as described above and peer-to-peer devices that conform the security and policy requirements of the above defined convergence network. A transactional engine allowing credit card or digital payment mechanism can tie into the different billing methods and a market rate can be set for spectrum usage of the same range by multiple networks and customers, as is illustrated in FIG. 7. According to FIG. 7, the clearing house 700 shows a conversion area for frequency to bandwidth, a policy generator and revoking system 702, a billing system 704, and a transaction server 706. A car 709, a phone 710, a wireless camera node 712, and a Radio network with a peering point 714 (as described above) are all connected to the clearing house, such as wirelessly.

The process for multiple customer, floating rate, per usage shared frequency range is as follows:

1. A device that transmits on the shared frequency range is loaded with peer-to-peer network layer 716 that supports security model, policy model and the billing system described herein.
2. A transactional system clears credit cards or digital payments or employs a billing system.
3. The transaction or billing system 704 selects the amount of bandwidth and the term that is anticipated to be used along with the usage criteria such as priority level 708.
4. The transaction is executed.
5. A policy document 718 is generated and is distributably stored in the network indicating the devices' network usage privileges and usage allotment.
6. The billing system is interfaced for usage depending on usage environment 720.
7. When the device has reached its usage level, the certificate will be revoked 722 or none honored by the other devices, networks and peering points in the network.
8. A customer can refill or make monthly payment to continue usage.
9. Priority and other usage criteria are automatically enforced during network usage 724.

Advanced Billing Systems and Techniques for Convergence Networks

New techniques and systems are required to monetize resource and task criteria-based usage of a converged network with the ability to determine transmission or task type because the native billing metering control, usage tracking and consolidated accounting typically takes place on the underlying network. The inclusion of the dual abstraction layers and the ability to overlay an abstracted transport changes the ability of the underlying billing system to necessarily track transmission type or application. Additionally, LMR and WiFi style networks do not typically have any base billing system for aggregate resource or per transmission use metering. Furthermore, peer-to-peer billing techniques may be required between devices sharing resources and there may need to be a mechanism for billing state enforcement and synchronization from devices and network segments that go on and off from the main convergence network or backbone.

In some embodiments, the facility provides a consistent billing system that can interface at the peer-to-peer node if the peer-to-peer network, billing, security and policy software is loaded onto the device or if the network or device is converged at a peering point, as is described above. The peering point in these embodiments provides a virtual identity to users of the network and through a generalized dual abstraction layer process the facility can meter and control activity by causing the policy rule sets to become a part of the consistent billing system. In addition a billing synchronizing mechanism is put in place to deal with peer-to-peer network state changes becoming isolated from consistent billing system servers and then being reconnected.

Offline Transactional Peer-to-peer Billing

Figure 8:
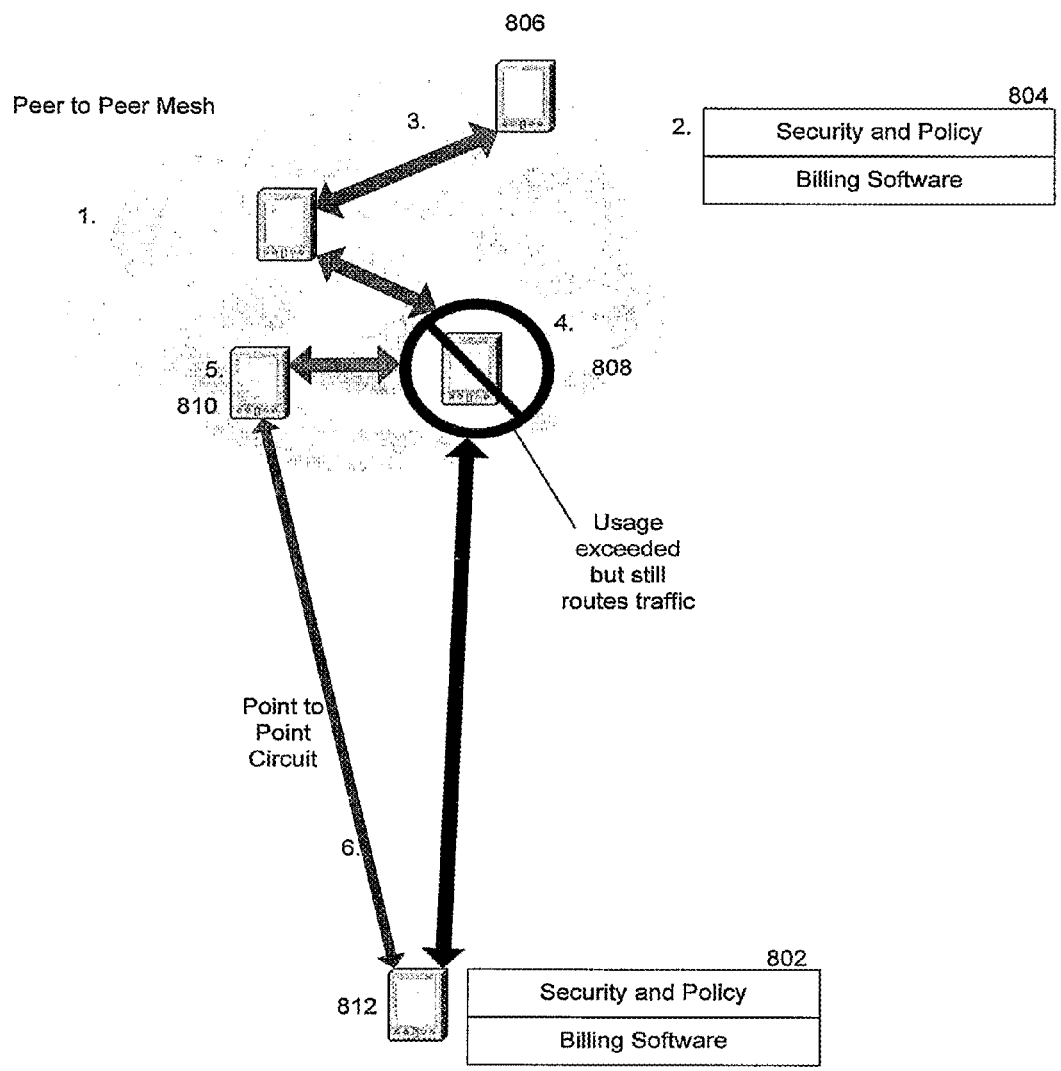
FIG. 8 is a block diagram illustrating a voice call between two users in a shared mesh or peer-to-peer environment.

Offline transactional peer-to-peer billing is the process of metering, measuring and enforcing shared resources between peer-to-peer devices and users in an adhoc environment with or without connectivity to the convergence backbone where the consistent billing system servers reside. The technique for doing this is a secure distributed policy-based method of resource sharing and network control. A resource sharing policy rule set document is created for each device and user on the peer-to-peer network. The document specifies shared network usage criteria such as priority and quality of service level. Additional specifications for network and group permission as well as the billing base type (per bulk usage metering, per time metering, per task type metering) are also included in the billing policy document. Each device through the peer-to-peer software has a cryptographic way of storing the network and transmission activity of the device. Additionally, there is a debit and credit system built in for usage swapping and each peer-to-peer transmission has a cryptographic currency that is exchanged between devices indicating the cost and bandwidth and transmission cost be used by a communications task on a shared network. FIG. 8 provides an example of a voice call between two users in the shared mesh or peer-to-peer environment and how offline billing is conducted.

Flow of the offline transactional peer-to-peer billing process:

1. Each device has a peer-to-peer network security policy 802.
2. Additionally, each device has a billing charter document 804 indicating usage criteria of the shared network, the consumption amount and how to account for and exchange usage.
3. The cryptographic currency that is exchanged between peer-to-peer network participants is recorded in the secure debit and credit section 806 of the currency system based on each device's billing charter.
4. Depending on the rules of the charter each user could be allowed to go negative or past the stated amount of bandwidth or resource usage allocation indicated in the charter (808). Alternatively, the charter rules could enforce no more usage by the user (i.e.: no more calls could be made) but the device could still be allowed to route shared traffic of the peer-to-peer network.
5. The currency exchange process increases the credit section of each transport node that is not part of the end-to-end transmission which at this stage is sharing its resources to those nodes that are using the node as a router, pass through or repeater to send transmission to a particular node such as voice (810).
6. Policy enforcement provides usage criteria that accompany the transmission through the shared peer-to-peer network such as priority and quality of service (812).

Once the peer-to-peer network segment or each node/device rejoins the converged backbone network, the offline transactional peer-to-peer billing process conducts a syncing process which updates the convergence account of the user with the offline usage information. A cryptographic debit and credit reconciliation process occurs between each device to sync the convergence consistent billing account with the devices internal debit and credit balance. At this stage the convergence billing account depending on the account status can replenish and modify the billing charter document to reflect the business rules for that user account.

Figure 9:
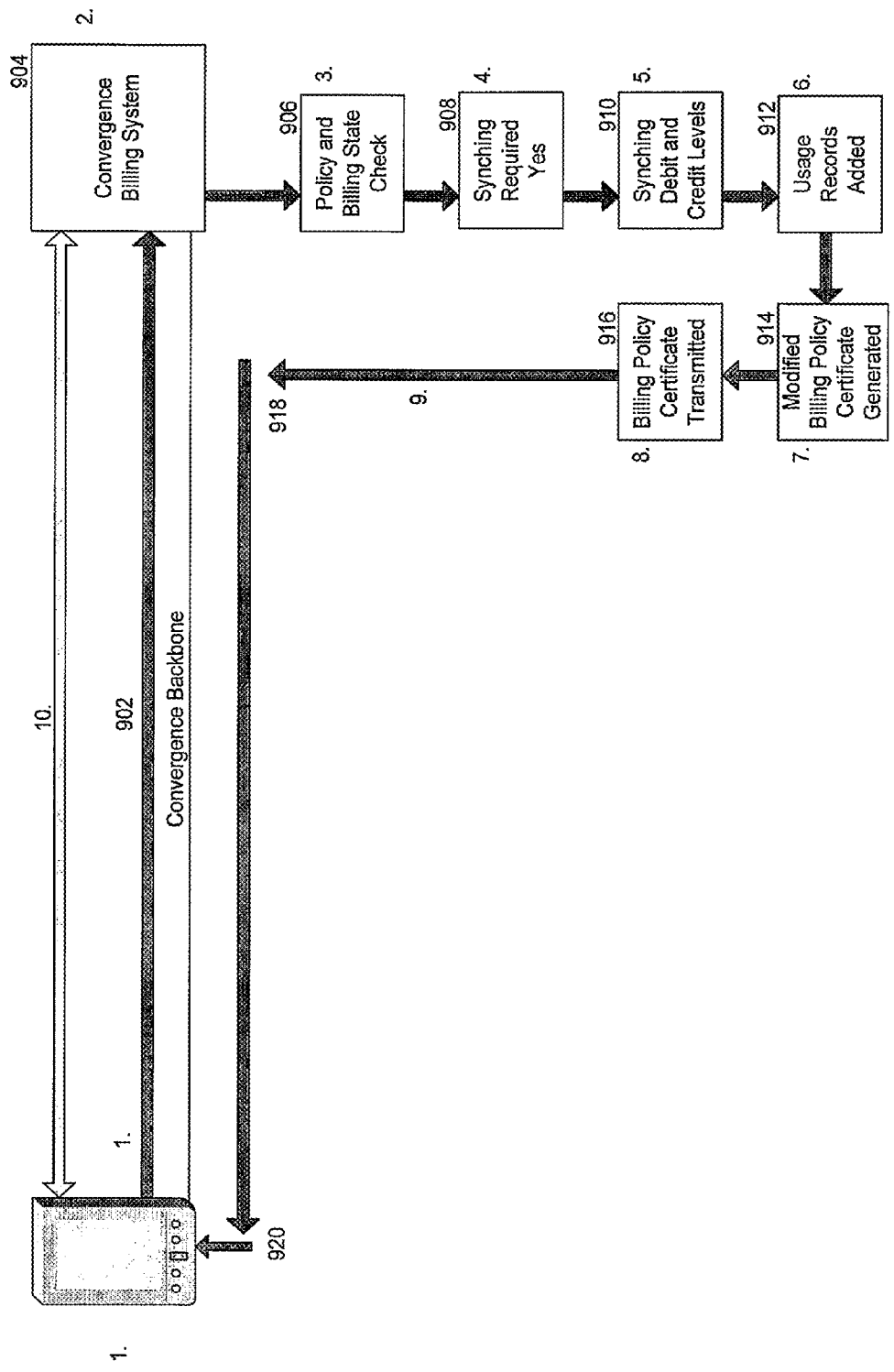
FIG. 9 is a flow diagram illustrating offline transactional to peer-to-peer billing synchronization with a convergence billing account.

FIG. 9 illustrates a process for offline to online peer-to-peer billing syncing to a consistent convergence billing account. The process occurs as follows:

1. A reconnection state change notification is received from the peer-to-peer network protocol (902).
2. The convergence billing system 904 performs a charter or policy check and billing state check for billing sync requirements (906). This check may be performed by another component of the facility.

3. If at block 908 syncing is required, the process performs a location look-up for convergence billing service.
4. At block 908, the process connects and authenticates to billing server containing master account with billing properties and activity logs.
5. The process initiates a syncing process to reconcile between peer-to-peer node debit and credit levels with account activity and usage (910).
6. At block 912, usage records the added to convergence billing account of the node.
7. At block 914, a modified billing policy document is generated.
8. At block 916, the modified billing policy document is transmitted to the node.
9. At 918, the process causes the charter system to update debit and credit.
10. At 920, the sync is completed, and the new billing and charter policy state is ready.

Unified Multi-carrier Billing

New billing techniques may be required to add wireless carrier networks to the convergence networks. To maximize coverage and redundancy of the convergence network, the ability to add multiple wireless carrier networks using different frequencies and underlying transports (GSM, GPRS, CDMA, 1×RTT, UTMS, iDen), with separate billing systems for both voice and data segments, into the consistent convergence network billing system is useful. The ability to reconstruct multi-path multi-network task sessions and provide aggregate and individual account clearing and reconciliation for the underlying carrier network are new techniques which can be used for seamless underlying wireless carrier to convergence network provider interface.

Using a two carrier example case to explain the process, two carrier networks converge onto the convergence network through the multi-frequency, multi-network peering technique described herein—two separate peering points. A multi-frequency device, say a PDA with GSM/GPRS and CDMA/1×RTT chipsets (separate, combined or software-defined), can connect to one or both carrier networks to join the convergence network. The PDA has the peer-to-peer, security, and policy and billing software on it. The PDA then initiates a voice call and the policy rules indicate that Quality of Service (QoS) is paramount. The environment is such that the peer-to-peer protocol detects that the GSM/GPRS network has a strong signal with low latency and the COMA voice channel also has a strong signal. The policy rule indicating a high level of QoS should be used if possible dictates to the device that both networks should carry the voice traffic (see prior art for multiple circuit details). The GSM/GPRS circuit is running over the data side of the network which is IP based and connects to the convergence network via the peering point and then on to a push-to-talk group conference service. The second network constructs a circuit switched data connection on the voice side of the network and goes through the peering point and connects to the same push-to-talk group conference service. When transmissions are sent and received, the transmissions are duplicated on both networks. Billing for the underlying carrier networks is collected by each carrier's billing system independently and has no way to determine what the actual transmission type or task was. All the underlying billing systems know is that either a voice session that is time-based was initiated or packet data was sent to the peering point.

The convergence billing system can collect and reconstruct a multi-network/transport call based on the initiating usage criteria. This can be collected at the peering point during the dual abstraction process or can be collected on the device itself because it is also a peer-to-peer node that interfaces with the convergence billing system. The billing policy and usage periodic updates from the peer-to-peer technology are synced with the convergence billing system as described above. A total convergence network resource calculation can be done on a task or network basis and the syncing mechanism can record this activity in the convergence billing system account information for the user.

The peering points can also sync with the billing system because they are also peer-to-peer nodes on the convergence network and record actual carrier segment billing records for the task transmission as well providing a way to reconcile activity from two separate points on the convergence network, the device and the peering point. From these records, a complete task can be recorded and reconstructed in the convergence billing system indicating how much and what type of transmission took place on the underlying carrier network.

A clearing house function can reconcile billing activity by account or in the aggregate with the underlying carrier billing systems based on the business agreement with each. Then billing transaction records can be sent to the carrier or from the carrier to the convergence provider via RADIUS servers for complete reconciliation or payment exchange. This is illustrated in FIG. 10.

Figure 10:
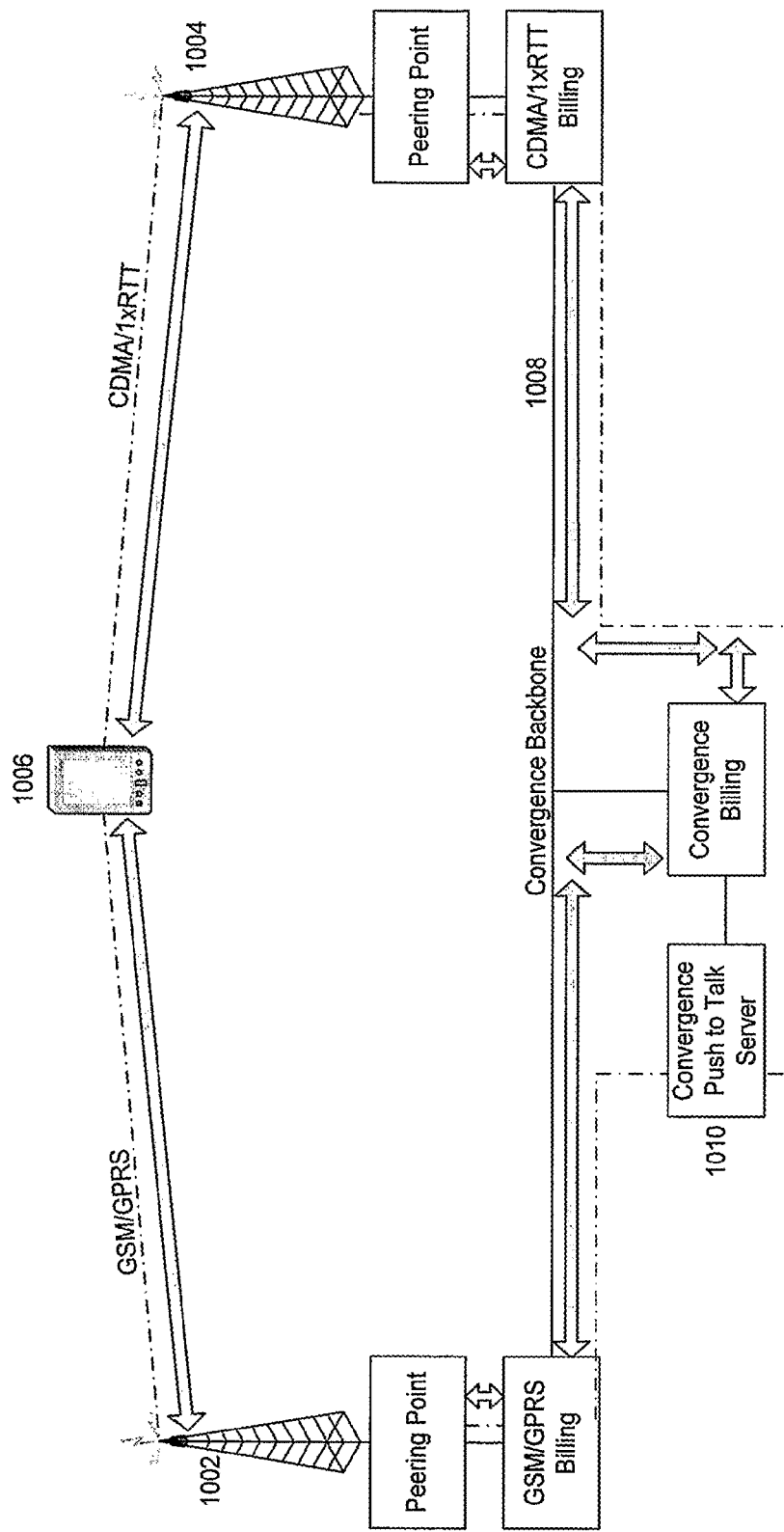
FIG. 10 is a block diagram illustrating reconciliation of billing activity with two network types.

According to FIG. 10, two carrier networks are connected to the convergence backbone. A carrier 1002 is GSM/GPRS and the other 1004 CDMA/1×RTT. A PDA 1006 is connected to both carrier networks, as shown with dotted lines, which then continue through the convergence backbone 1008 to the convergence push-to-talk server 1010, indicating a dual-pathed high QoS push-to-talk converging session. From the peering point icons of both carriers, a different line to the convergence billing system shows a records sync. Another line type shows RADIUS transfers for reconciliation between the convergence billing server and each carrier billing icon.

Legacy Frequency Billing

Usage of frequency is quantified by four metrics: Spectrum footprint, time, duration, and geographical footprint. Gathered together with a distilled version of the communication—speaker voice identification (voice print) metrics, frequency and volume envelope characteristics—these metrics form the Spectrum Activity Measurement (SAM). Because a single user activity (i.e. a single push-to-talk communication via handheld radio) may traverse several different frequencies in different geographical areas at different times (i.e. in a LMR network utilizing repeaters) a second metric, the Spectrum Usage Metric (SUM) is used to measure the total effect of that user activity. A single SUM includes several pieces of SAM data joined together to represent the total spectrum resource usage of a single activity engaged in by a user. In conjunction with the metered usage price of the relevant spectrum, the SUM is used to calculate the monetary cost of a user activity.

There are several methods of gathering SAMs. These measurements may be gathered from existing legacy infrastructure either by transmitting usage logs collected by existing radio infrastructure to be processed by the billing system, installing new software on that infrastructure to gather usage information, by attaching a new logging device to that infrastructure to gather the usage information. These measurements may also be collected by placing a radio receiver or several radio receivers in the relevant geographical area for the purposes of gathering measurements. The collected measurements may then be transmitted to a collection point for processing.

To collect this data a hardware activity sensor using a standard LMR radio accessory connector (for example Motorola MaxTrac 5-pin analog accessory connector or Kenwood 25-pin digital accessory connector) can be used to extract and transmit activity information about the local radio network. This is achieved by monitoring the PTT indication sent by the radio over the accessory connector and then retransmitting that information via an out-of-band communications channel, for example a modem attached to a leased telephone line, or in-band encoded as data.

This device may be installed with a new radio base station as part of a billing infrastructure deployment or attached to an existing piece of radio infrastructure. A number of modifications of this device may also be used to collect SAM data including a software approach where software or firmware performing the same function is installed on existing devices, a software-defined radio combined with monitoring software is used to perform the same function, or a similar device utilizing a remote control interface (for example a tone remote interface over standard telephone wire) is used to monitor an existing remote radio.

The software-integrated radio and software-defined radio approaches both allow the collection of additional information about observed activity beyond the defined SAM data. Additional data that may be collected depending on hardware configuration includes signal strength information, audio quality information, and modulation type. PL tone, station identifier, or other transmitter identifying information may also be collected and transmitted with the SAM, aiding in assignment of billing.

Once the SAM data has been collected it is first checked for validity to exclude RF noise, stray signals from neighboring regions, and errant device behavior. There are several methods of evaluating whether a collected SAM is valid and should be transmitted for billing or whether it should be discarded as invalid:

Audio quality evaluation
Signal strength evaluation
Neighbor spectrum check

For example evaluating the audio clarity of a received transmission (the audio quality) will provide an indication of whether the signal was transmitted by a transmitter in a region neighboring that being monitored. It will also indicate whether the transmission resembles a billable communication (e.g. a transmission on an analog LMR network strongly represents the acoustic characteristics of voice) or whether the transmission appears to be an environmental artifact (e.g. a burst of radio static from the starter in a vehicle). Signal strength may be used similarly, and verification of the physical proximity of neighboring unowned transmitters allows the appropriate calibration.

To bill the correct entity for the measured usage for collected activity the user initiating the activity should be identified. Several pieces of information are available to aid in the user's identification:

Geographic region
Frequency used
Voice print
Relay access code
Prior notification
PL tone or station identifier
Other uniquely identifying handset characteristics The combination of these pieces of information aid in the calculation of the billing entity to attribute the activity to. For example the combination of the use by an agent of their fixed, agency-wide PL tone on a VHF handheld will allow that agency to be identified and that activity distinguished from activity generated by an agent of a different agency that uses a different PL tone. Another example of the combination of this data is the combination of geographical information and a relay access code, for instance the city the activity took place in and the access code used by an agent to activate their organization's repeater.

Once a SAM has been attributed to a billing entity it should be sent to a legacy frequency billing service for aggregation into billable events and transmission to a unified convergence billing system. A single billable event is the collection of several SAMs to represent the total cost associated with an action taken by a user, for example when a user transmits voice on a legacy LMR network via a duplex repeater, the billable event includes the spectrum time, physical footprint, and bandwidth usage of that user's PTT transmission across the original frequency used as well as the same measurements of the transmission made on their behalf by the repeater. Another example of the combination of two SAMs that constitute a single billable event is the case of a single radio transmission activity by a user that is broken by an intermittent brief signal fade. The logging device may record this transmission as two events SAMs when in fact the two represent a single user activity. There are several techniques that may be applied to combine a series of SAM data into a single billing event:

Time correlation
Audio comparison
Repeater configuration verification

By comparing start and end times of two transmissions, any potential relationship between the two transmissions can be discerned, for example:

Immediately adjacent end time of transmission A with the begin time of transmission B indicates an interruption separating two parts of the same transmission, given that other indicators such as signal strength and user identifying information are identical.

Immediately adjacent start and end times of both transmissions A and B when A and B are geographically near and a repeater bridging the two frequencies is present indicate the use of a duplex repeater by the user initiating transmission A Closely adjacent end time of transmission A with the begin time of transmission B where A and B are on the same frequency but have differing but internally consistent signal strength indicate the use of a simplex repeater on one frequency To confirm the accuracy of these comparisons a variety of additional comparisons can be made, primarily an audio comparison of the transmissions to verify continuity (in the case of a broken transmission) or similarity (in the case of a repeater duplicated signal). To make these comparisons some information about content should be retained as part of the SAM.

Figure 38:
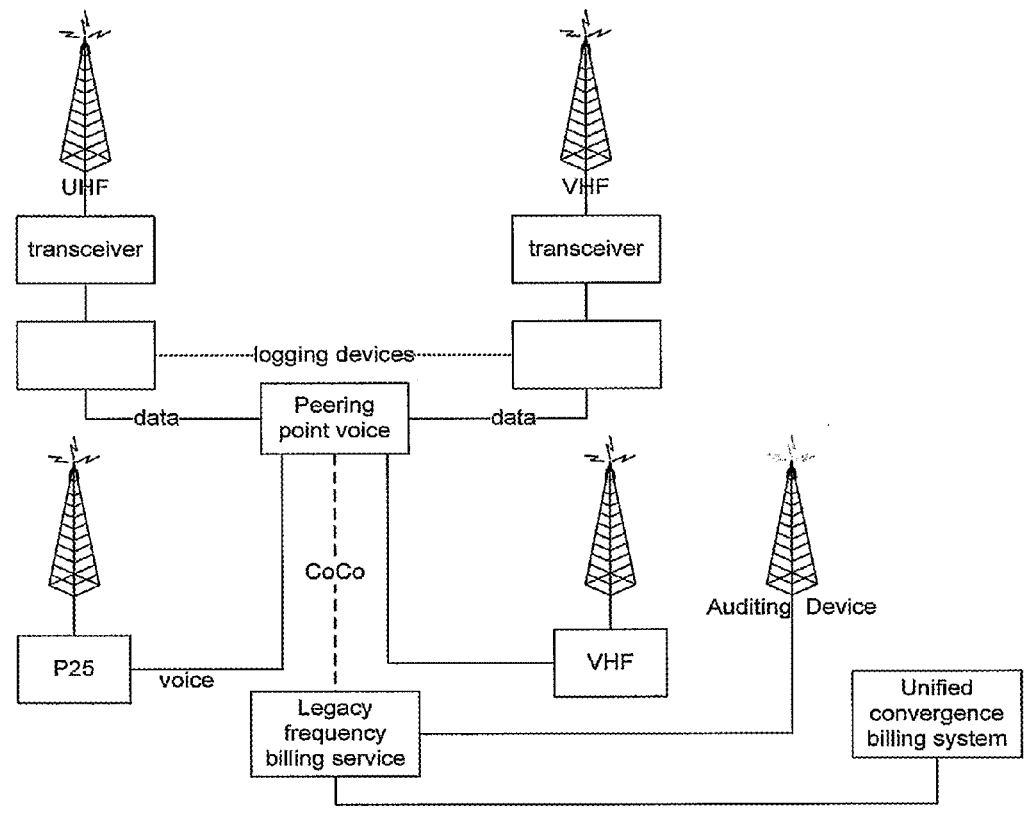
FIG. 38 is a block diagram illustrating legacy frequency billing.
Figure 38:
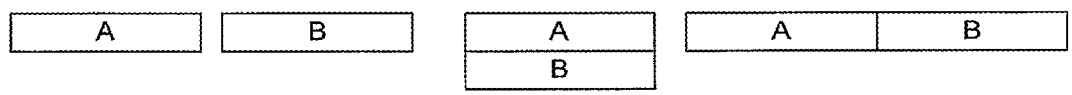
Figure 38:

The retention of this audio data in distilled digital format to allow verification and provide auditability is accomplished by way of integrating this data with the other recorded characteristics of the audio in the form of the SAM. As discussed above speaker voice identification metrics as well as volume and frequency envelopes are retained as part of the SAM at time of collection. The SAM data may then be immediately transmitted to the legacy frequency billing service or retained on permanent or temporary storage on the hardware activity sensor for later scheduled or manual transmission. All data should be transmitted to the billing service in a timely manner to ensure that complete data is available for the calculation of billable events. This system is illustrated in FIG. 38.

Converged Frequency, Consistent Network Environment Devices

Technology has advanced to the point where a single device can contain multiple communication chipsets (each for a specific frequency range and transport type) or a fast enough general processor functioning with a bulk frequency range up-convert and down-convert chipset that can then translate the wave form segments into channelized specific transport forms. This is commonly called Software Defined Radio or SDR.

There are efficiency, coverage area and economic benefits that can be gained from a device that can access multiple networks on multiple frequencies. An example of this is the ability for a SDR based LMR radio that can act as both a VHF or UHF device.

Network protocol technology advancements have also been made that can create a consistent network environment and super network of networks in logically and physically distributed way. These technologies are commonly referred to as Cryptographic Overlay Mesh Protocols (COMP) or peer-to-peer adhoc protocols. These protocols generalize or abstract the underlying transport of a native underlying networking to a common logical transport form. This makes devices and entire other networks function consistently together to create a unified convergence network.

A powerful new type of convergence device can be created by combining these two technologies so that the properties of the underlying network and frequency is known to the peer-to-peer protocol layer and document-based network policies can be enforced in aggregate for all the underlying frequencies and networks of the SDR or multiple chipset lower edge. This technique extends the ability for a device to just transmit and use different LMR, wireless carrier or WiFi networks in their native way to a generalized frequency and network management system that the device can use in a consistent way as a "resource pool" and apply abstracted applications that the underlying applications can be translated to, allowing interoperable communications and inter-frequency range management to be performed in an efficient way. Additionally such a device can act as a interoperable peering point similar to that described above so that single frequency devices that the lower edge supports can be proxied or bridged onto the convergence network. Furthermore, this type of device can be used to help efficiently and economically move networks to other assigned frequency ranges. Dynamic frequency consistent network environment device.

Adding a lower edge SDR and Upper edge peer-to-peer network protocol such as a COMP to the same device with a bidirectional multi-frequency, multi-network interface, a method is enabled for management of diverse spectrum resources by abstracting multiple frequencies and modulations to a consistent link layer and utilizing multi-path routing techniques on the resulting links. Three new techniques are used to accomplish this of converting devices to links, providing the upper edge a way of measuring link quality metric of the underlying (lower edge) frequency and network, and a collective aggregate link or resource policy enforcement management method. Additionally the device may need to support the security and policy engine functionality of the peering point to act as a peering point for other legacy or single frequency network device to join the convergence network.

Figure 11:
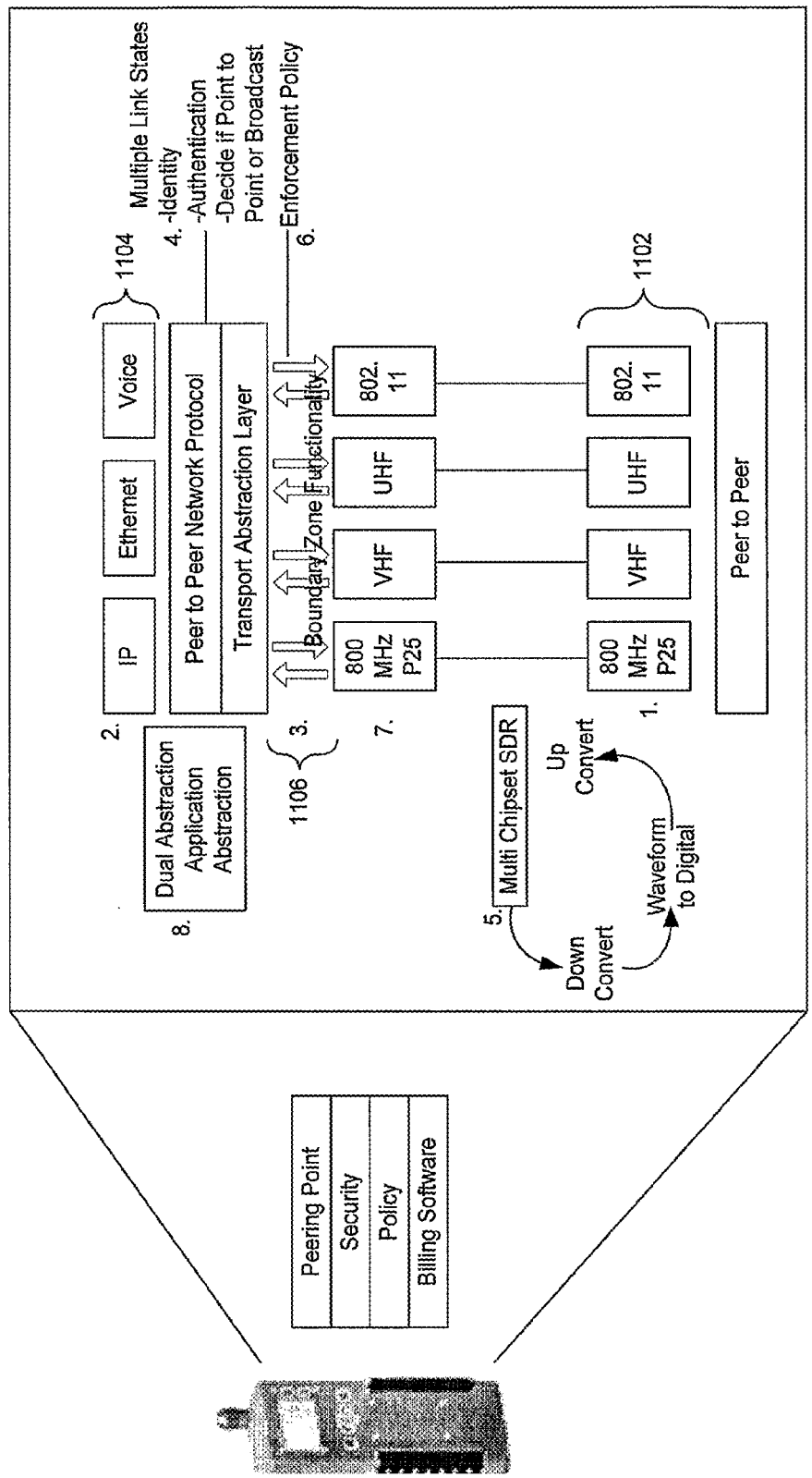
FIG. 11 is a block diagram illustrating improved functionality on software defined radio.

The following describes a process of interoperable communications and inter-frequency range management with reference to FIG. 11:

1. A device's lower edge is made up of multiple underlying network and frequency chipsets 1102 or SDR is utilized to transmit and receive on multiple frequencies and networks.
2. The device's upper edge 1104 has a peer-to-peer COMP style generalized communications protocol.
3. A bidirectional interface at the "Boundary Zone" 1106 allows data, state, control information flow back between the edges.
4. The upper edge has the ability to poll each lower edge chipset or SDR frequency range channel or network and receive a link quality metric. For example: signal quality (1-10)*((max capacity−current load)/max capacity).
5. The upper edge maintains an aggregate link resource state which represents all the lower edge network resources.
6. The upper edge applies the resource policy based rules to the overall resource pool and/or to each individual link state depending on the rules to determine how to allocate the resources to the tasks being run on the device.
7. The upper edge can use one or more of the underlying networks to send or receive transmissions, which is determined by the link states including the aggregate link state, the policy rules, and the tasks being performed on the device.
8. The transmissions from each lower edge network go through the dual abstraction process defined above allowing interoperability at both the network and application level allowing the device to utilize the aggregate network resource pool of the device as interchangeable transports for common generalized applications as defined above.

This provides the upper edge the ability to control the lower edge network resources on a macro level depending on the convergence policy making it possible to perform frequency and underlying network management for the device without disruption to the underlying networks. This is illustrated in FIG. 12.

Figure 12:
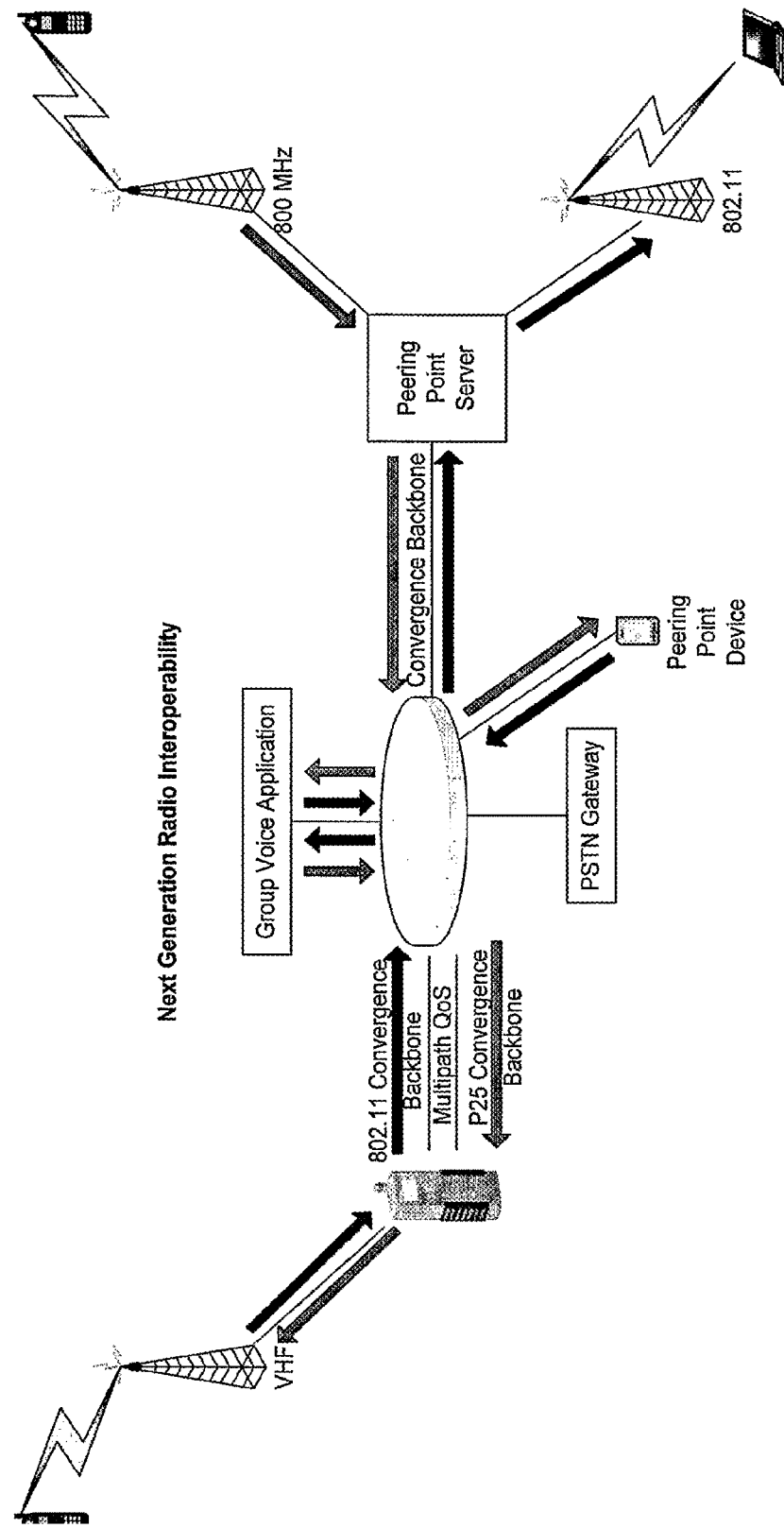
FIG. 12 is a block diagram illustrating an example of talk groups over multiple networks.

FIG. 12 illustrates an example of push-to-talk talk group participation for a multi-network lower edge device. An aggregate link resource pool is shown, with a high QoS policy with options for multipath routing over the 802.11 (1202) and a P.25 lower edge (1204) through the convergence backbone to the talk group service area on the network. Also shown is a VHF single frequency radio device 1206 acting as the bridge on the VHF lower edge interface of the device so that it too can get to the talk group service.

Convergence Resource, Network Capabilities and Performance Measurement

Convergence networking needs new metrics that quantify the performance, capabilities and resource usage on an inter-convergence and external network basis. This will aid in convergence network design and planning and allow rating of the new capabilities such as interoperability in a standardized way.

The process of measuring interoperability for a given network or geographic area requires techniques for measuring frequency range usage and network resources in an abstracted way, determining the level of inter-network connectivity, determining the amount of resource and application sharing and then quantifying the results into a single rating with a set of corresponding ratios showing the current level compared to the max level of interoperability. The ratios provide interoperability sub component measurements for frequency interoperability, network interoperability and resource and application interoperability.

Interoperability Metric

To compute interoperability, a consistent method of measuring resources, abstracting them to a common quantifiable measure and calculating the aggregate interoperability usage against the maximum potential usage on a given bounded range would be useful.

The technique for measuring frequency usage and LMR network resource usage is defined in the legacy billing section of this document. This collection method measures the usage of LMR networks through peering points that can communicate on multiple frequency ranges and LMR network types. The transmissions then go through the transport abstraction process and the frequency use is converted to a common bandwidth measure. Devices and peering points function similarly for public spectrum ranges such as 802.11 and for wireless carrier spectrum ranges and networks. By being able to effectively count the different LMR networks, wireless carrier networks, and broadband wireless networks for a given geographic range a quantifiable network and frequency range a Wireless Underlying Convergence Network Count ("WUCNC") is established. A terrestrial network count can be established by counting or detecting the number of ISPs with nondependent backbones in the area, zero if none exists in the range. This is called the Accessible Terrestrial Network Count ("ATNC"). Ranges that have satellite networks in operation (earth station or receivable device) also have an Accessible Satellite Network Count ("ASNC"). By summing these counts together, a Total Network Count ("TNC") is established for the given bounded range:

TNC=WUCNC+ATNC+ASNC

By performing trace routes on underlying networks and correlating the convergence intersection points from the peering points a Convergence network path (network intersection points), sometimes referred to as multi link circuit construction, can be calculated to a Maximum Contiguous Interoperable Network Count ("MCINC") as well as a Convergence Network Fragmentation Count ("CNFC") which represent the number of network segments that cannot communicate with each other. MCINC=CEILING (Contiguous Network Links)=Contiguous Network Count=number of nodes in the largest connected component of the network. CNFC=Number of isolated network components which cannot communicate with each other (e.g., the number of connected components in the graph theoretic sense).

Define the Connectivity Interoperable Rating ("CIR") using the connectivity values above to obtain a total connectivity score.

CIR=(TNC−MCINC)/TNC

The CNC is the number of networks in the largest fragment. The MCINC ranges from 1 (which is the worst case, when no network may reach any other network except itself) to NC (which is the best case, when each network can reach all NC networks, the total number of networks).

When MCINC=TNC then CIR=0 and CNFC=1 which means there is only 1 "fragment," i.e. all networks are interconnected. When MCINC=1, then each network is in its own isolated fragment, i.e. it can reach only itself. In this case, CNFC=TNC and CIR=(TNC−1)/TNC~1 (approaches 1) which means the networks are increasingly isolated from each other.

By monitoring and calculating the bandwidth usage for each network and frequency, a overall Range Network Usage Percentage ("RNUP") can be calculated.

RNUP=AVG((Underlying Network & Frequency Bandwidth Max−Underlying Network & Frequency Bandwidth Usage) I Underlying Network & Frequency Bandwidth Max)

A total bandwidth usage may be computed as a weighted average across all networks. If the collection of networks is {N1, . . . , Nt}, then the weighted average may be calculated as:

$$\text{Total } RNUP = \text{Weighted Average} = \frac{\sum_{i=1}^{t} RNUP(N_i) * |N_i|}{\sum_{i=1}^{t} |N_i|}$$

By performing the second abstraction process or application/information abstraction at the peering point and calculating the percentage of data (in Megabytes) going to the abstracted or common applications versus data just being passed through to the device or peering point, an Application Interoperable Percentage ("AIP") can be calculated on a network-wide basis. AIP=AVG(Underlying Network & Frequency Abstracted Application & Service Data [Megs] To Common Applications and Service−Total Abstracted Data Megs)/Total Abstracted Data [Megs])

Let AD(N)=Abstracted Data in network N. then:

$$AIP = \text{Weighted Average} = \frac{\sum_{i=1}^{t} AD(N_i) * |N_i|}{\sum_{i=1}^{t} |N_i|}$$

The basic measurements and quantifications now exist to provide an aggregate Total Interoperability Rating ("TIR") by weighting the calculations as follows:

TIR=(CIP+AIP)/2−(100%−RNUP)/10

The (100%-RNUP)/10 is a capacity usage weighting that is subtracted out of the AVG of the CIR and AIP combined. The purpose for this is to magnify the excess capacity of the aggregate networks to encourage interoperability technology and usage. For example if a bounded range is only using 60% of the average aggregate network capacity there is 40% unused on the network that can allow for inter-network traffic. If average aggregate capacity is 100% the network usage is maxed so nothing is removed from the score.

Situational Awareness Metric

To compute situational awareness of an incident based on network resource presence and usage, a consistent method of measuring resources, abstracting them to a common quantifiable measure and calculating the aggregate usage against the maximum potential usage on a given incident bounded range is required. From these aggregate measure responders at the scene can be given an individual situational awareness score for comparison against the incident average. This can be calculated on real time basis on scene or historically derived through reconstructing audit records (auditing is described in further detail below).

A count and abstracted rating of the network resources available at a bounded scene is used to quantify a base network resource measure. This is accomplished through the discovery process (discovery is described in further detail below). The number of responders, cameras, sensors, combined with a count of the networks on scene and the interoperability rating defined above are also used. These are base ingredients to determine an awareness metric based on what communications occurred on scene.

TC=Total Cameras accessible on scene
TS=Total Sensors accessible on scene
TR=Total Responders (network users) on scene
TIR=Total Interoperability Index
TCU=Total Camera Usage
TSU=Total Sensor Usage
TIT=Total Incident Time
ACPM=Average Communications Issued Per Minute From these base metrics the next level abstracted measurements can be derived.

SVDT (Scene Visibility Device Total)=TC+TS
SVPR (Scene Visibility Device To Responder Ratio)= SVDT/TR
ATSVDU (Aggregate Total Scene Visibility Device Usage)=TCU+TSU
RSVDTA (Responder Scene Visibility Device Total Access)=Unique (Responder User ID for individual SVD device access)++ for All Responders on Scene A total incident awareness metric can now be quantified for the bounded incident scene.

TISSAR (Total Incident Scene Situational Awareness Rating) is a weighted average of the following:
SVPR (Total SVD available Per Responder)
RSVDTA/TR (Percentage of Responders that accessed a SVD device)
ATSVDU/Total on scene network usage (% of usage for VSDs)
TIR*ACPM (total interop rating times A communication per minute provides a weighting for Frequent communications where everyone should receive –level of collaboration)

Individual usage per responder can be calculated and compared against the aggregate score. Similarly, incident scene scores can be compared to come up with a best practices level.

Incident-specific Aggregation

A process of aggregation so that all communications on the scene of an incident can be condensed into a single stream of information is provided to aid in measuring on scene communication capabilities and usage. By utilizing the convergence network bounding method around the scene of an incident and the distributed auditing capabilities it is possible to create a chronological sequence of communication events that occurred on the scene of an incident. An aggregate incident event stream can be assembled by ordering the network user's transmission by identity and time stamp. Once this communications timeline and event assembly has occurred it is possible to provide a multi media playback of the scene by using the transmissions generalized application and information type ID. This will allow a scene playback application that supports the generalized application format types to show video data, sensor readings, group communications transmissions, cell phone calls, email, text messages, chats and the data entry of the on scene commander to the command and control log or application in actual event time. This is illustrated in FIG. 13.

Figure 13:
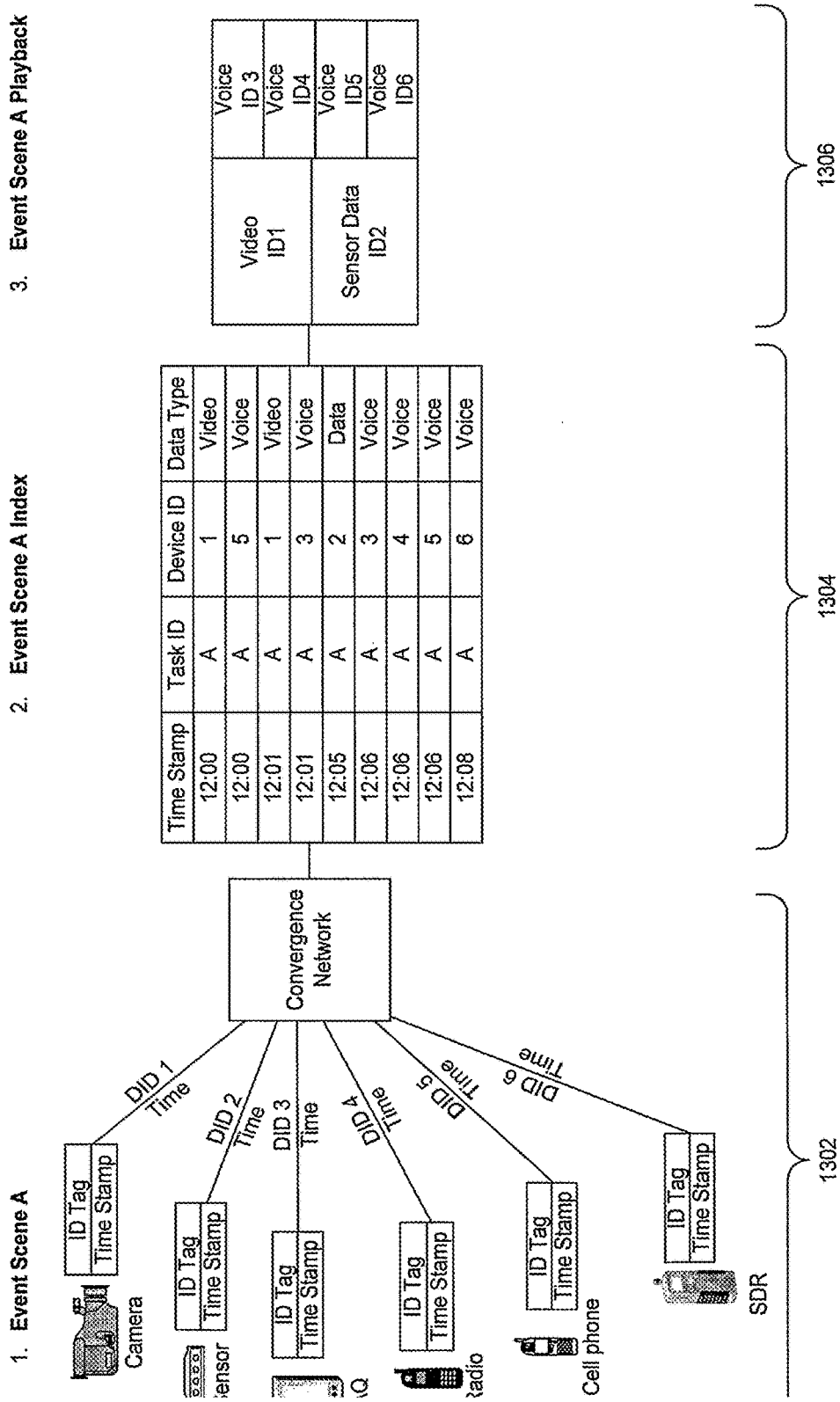
FIG. 13 is a block diagram illustrating an example of event scene collection and playback.

FIG. 13 illustrates (1) event scene collection 1302 showing archiving of camera data, radio data, sensor data, and group talk group data; (2) a single aggregate incident stream index 1304 in chronological order with timestamps and task IDs pointing to specific transmissions with different task or data IDs; and (3) a stream pulling tasks and multi-media playback application 1306. The illustration shows point-to-point playback with names on both sides, and a video playback showing one view of a scene.

Convergence Network Generalized Priority Management

Priority management of network resources is a desirable feature. The ability to distribute resources based on a priority level is an important need for responders when responding to incidents and disasters. Responders need their vital communications to get through on terrestrial networks, wireless carrier networks, satellite networks, LMR networks and peer-to-peer networks in times of crises. A few networks have implemented priority service for responders on their networks such as the National Communications System's priority program for voice communications on wireless carrier networks. The problem is that there exist multiple priority mechanisms on different networks. There is no consistency of priority between networks and no aggregate priority enforcement. Also lacking is the ability to set multiple levels of priority on a per-user basis so that, for example, an incident scene commander and firemen inside a building have a higher priority than other responders on scene so that as resources become scarcer the most important communications on the scene of an incident can get through. A consistent means of priority on an aggregate basis is desirable to manage priority of voice, video and data transmissions on multiple networks.

A facility is provided for consistent priority on multiple networks and in the aggregate is now possible on a management, enforcement and usage basis by leveraging the power of a peer-to-peer protocol such as a COMP and a convergence network environment with the ability to control the underlying networks shared usage through a distributed policy based mechanism. By supporting priority as part of the policy rule set and being able to interface with the underlying networks priority capabilities a powerful convergence aggregate priority and multi-network task priority can be achieved.

Aggregate Inter-network Priority

A method is described to enforce a consistent priority over multiple networks for voice, video and data is needed in a convergence network environment. The ability for the network peering points to enforce policy based rules for underlying network and each peer-to-peer device on the network able to enforce the same policy it is possible to provide a consistent priority level mechanism throughout the entire convergence network by providing a generalized priority level rule in the policy. Each peering point and device can enforce the priority rule given the networks current load and capacity. This provides the desired effect of allowing the network to function efficiently and only those areas of the network that are at capacity need to implement the priority rule sets in aggregate for the load at the point only in the network.

Figure 14:
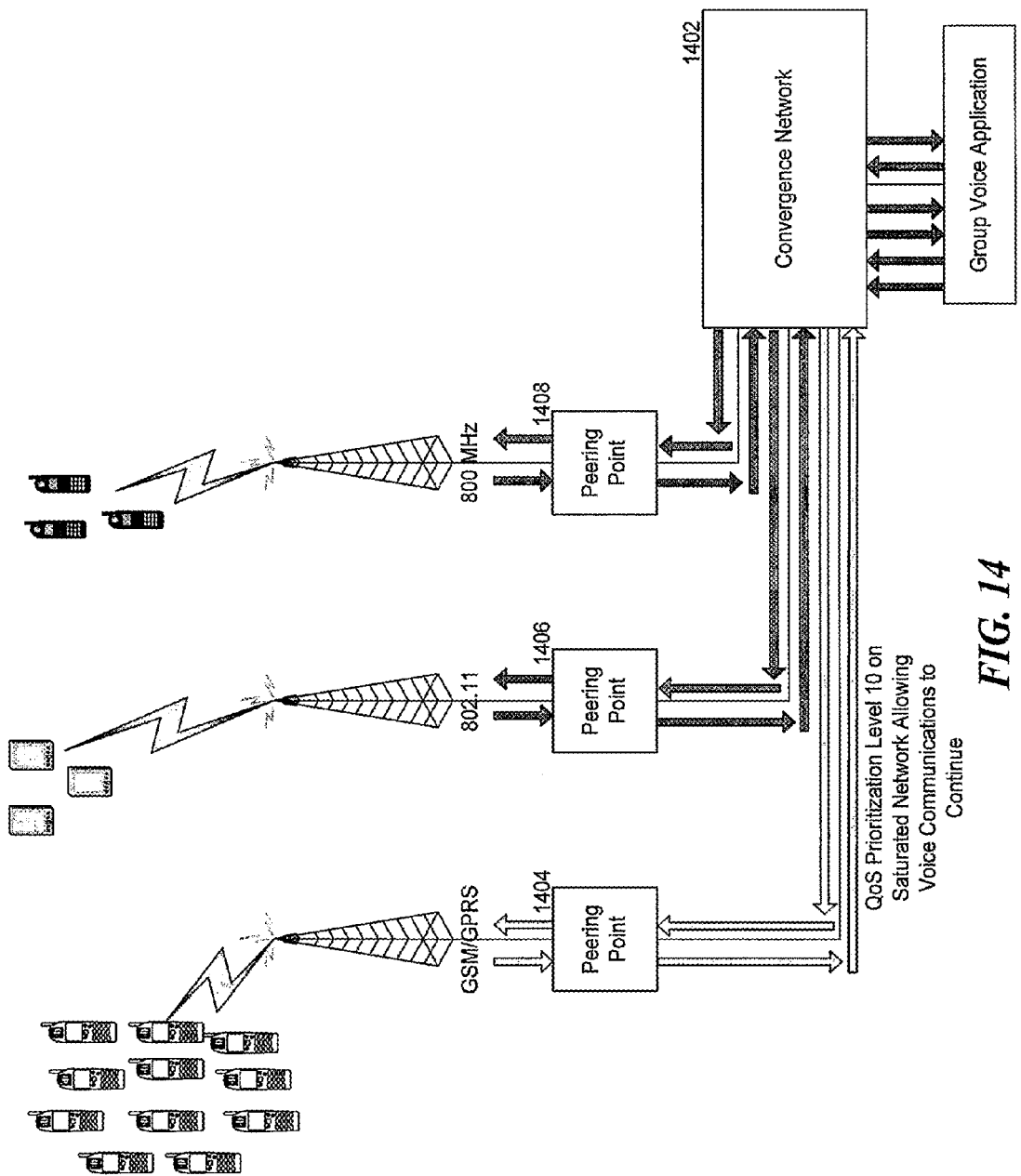
FIG. 14-17 are block diagrams illustrating examples of priority enforcement distribution in convergence networks at various levels of capacity utilization and in various embodiments.

FIG. 14 illustrates an example of priority enforcement distribution in a convergence network. According to the figure, a convergence network 1402 (wireless carrier, 802.11, LMR) with three peering points (1404, 1406, and 1408) and three devices using the generalized talk group service on the backbone. The carrier network is reaching capacity saturation and allowing only the priority communications through. Only the carrier segment of the network is providing priority enforcement because the rest of the networks have not faced maximum capacity.

Figure 15:
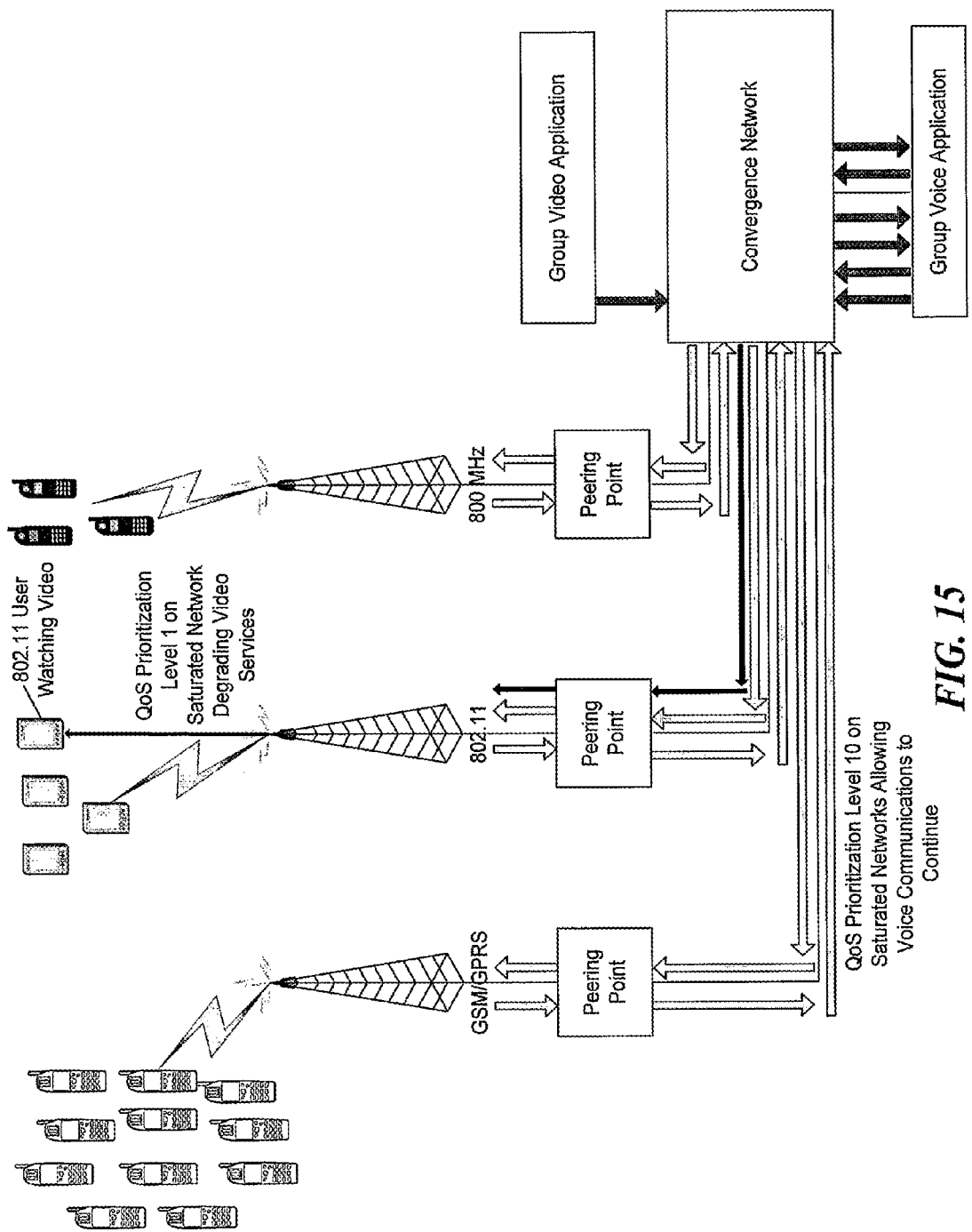

FIG. 15 illustrates an example of multi-network consistent priority. According to the figure, all three networks are approaching capacity. The users of the talk group on all three networks can get through because they each have a level 10 priority, while the others (e.g., the 802.11 users watching videos) have lost capacity and resulting QoS. A degradation of video occurs for the lower priority 802.11 users.

Figure 16:
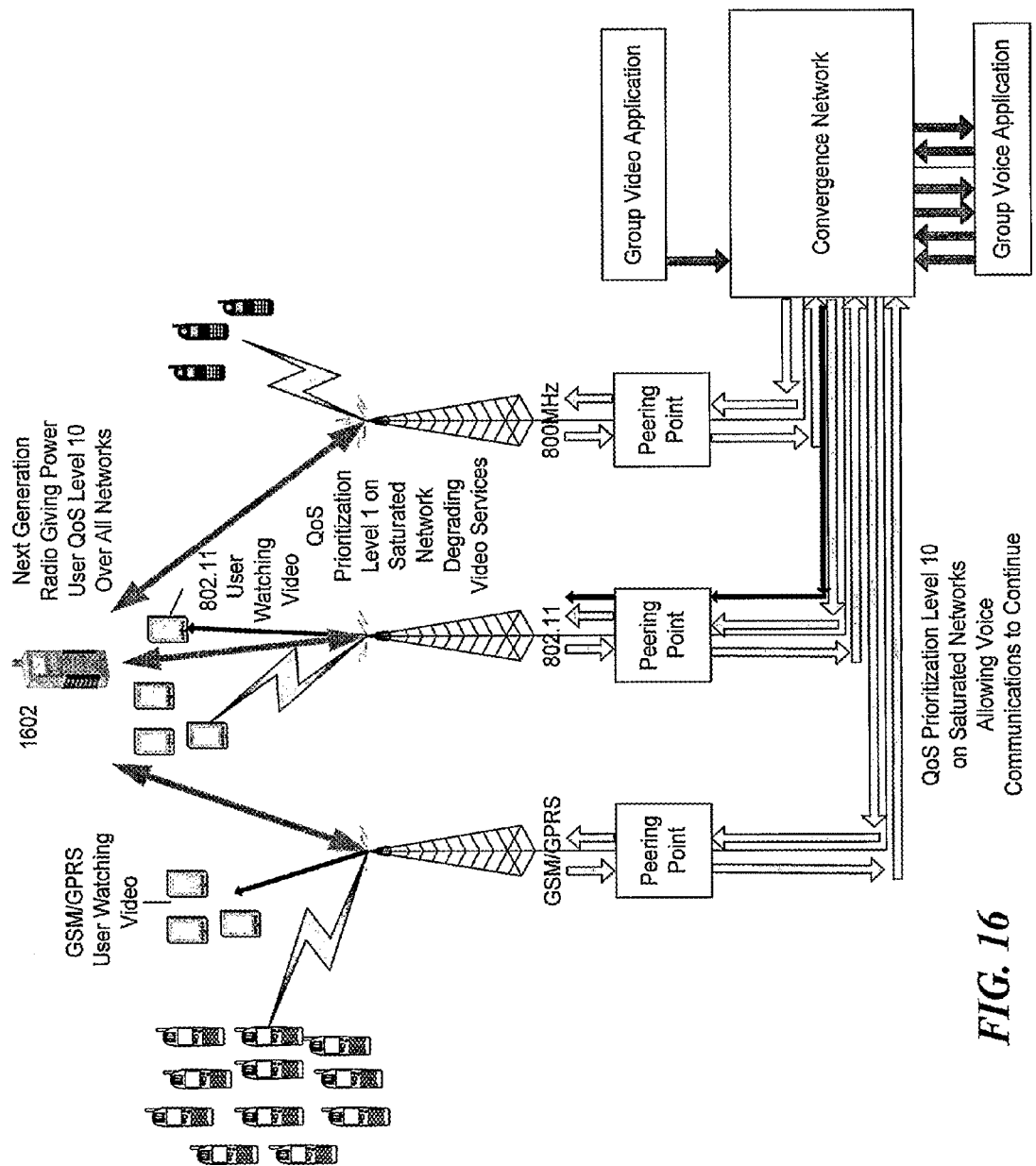

FIG. 16 illustrates an example of aggregate network consistent priority. According to the figure, WiFi users have a new convergence device 1602 that can work over the carrier network and the LMR network. Other 802.11 users on the network are accessing video. The policy of the powerful WiFi convergence device user has a highest level of QoS rule. This power user is connecting to the generalized group talk services through all three networks as a priority 10 user. The other users who are using video have reached saturation on their networks. Each network aggregate priority of the power user still allows the power user to use the highest priority on each network, with slight degradation of video to the other users on all networks.

Figure 17:
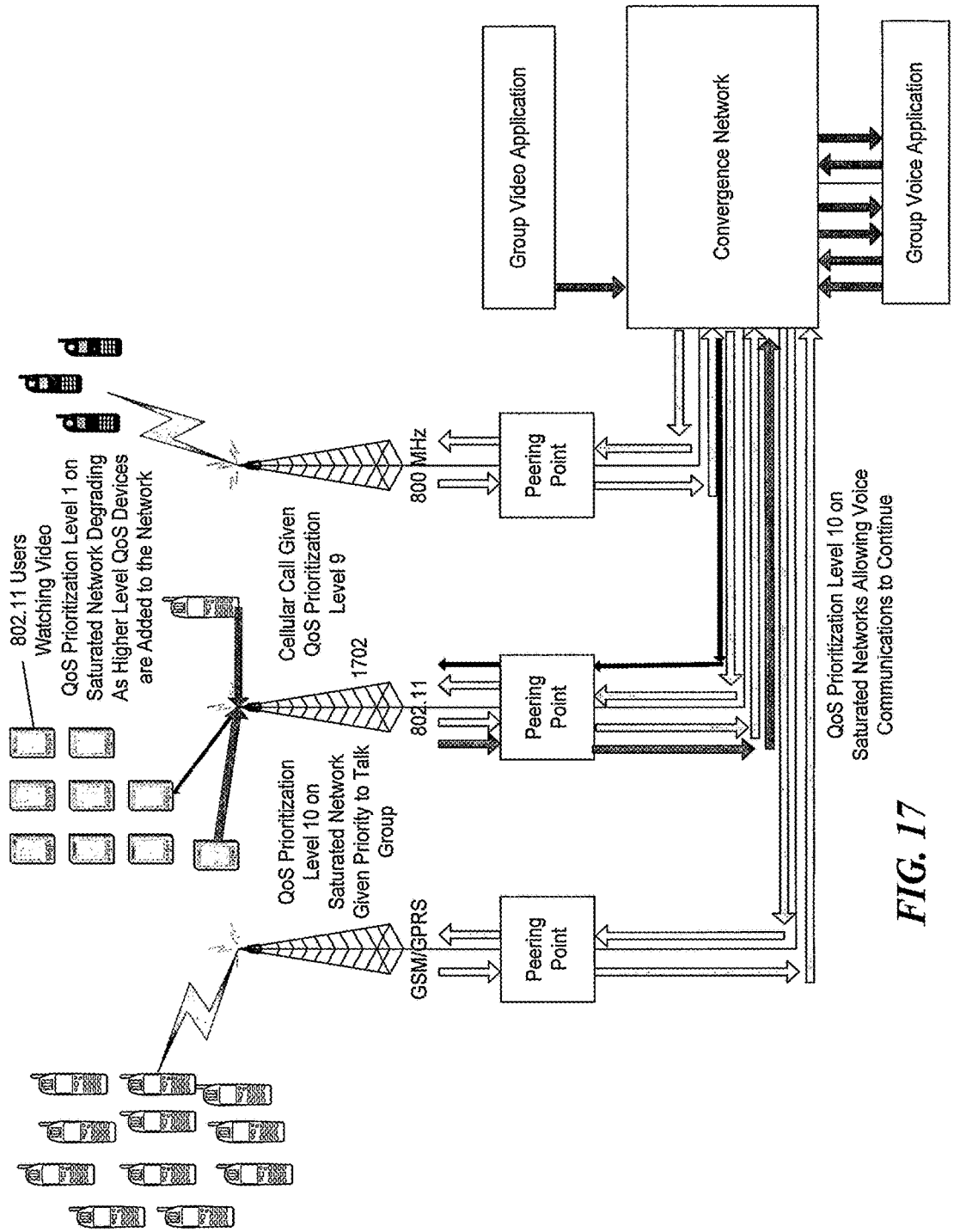

FIG. 17 illustrates an example of enforcing multi-network, multi-priority level QoS. According to the figure, the WiFi network 1702 is saturated with 10 users (nine computing devices and one cellular telephone), each with different priority levels. The user with priority 10 is connecting to the talk group server and getting through. The other users are watching video with only slight degradation. A user making a cell phone call through the WiFi network gives up no bandwidth to the others who are watching video. Another slight degradation to video occurs as resources have been prioritized and shifted.

Figure 18:
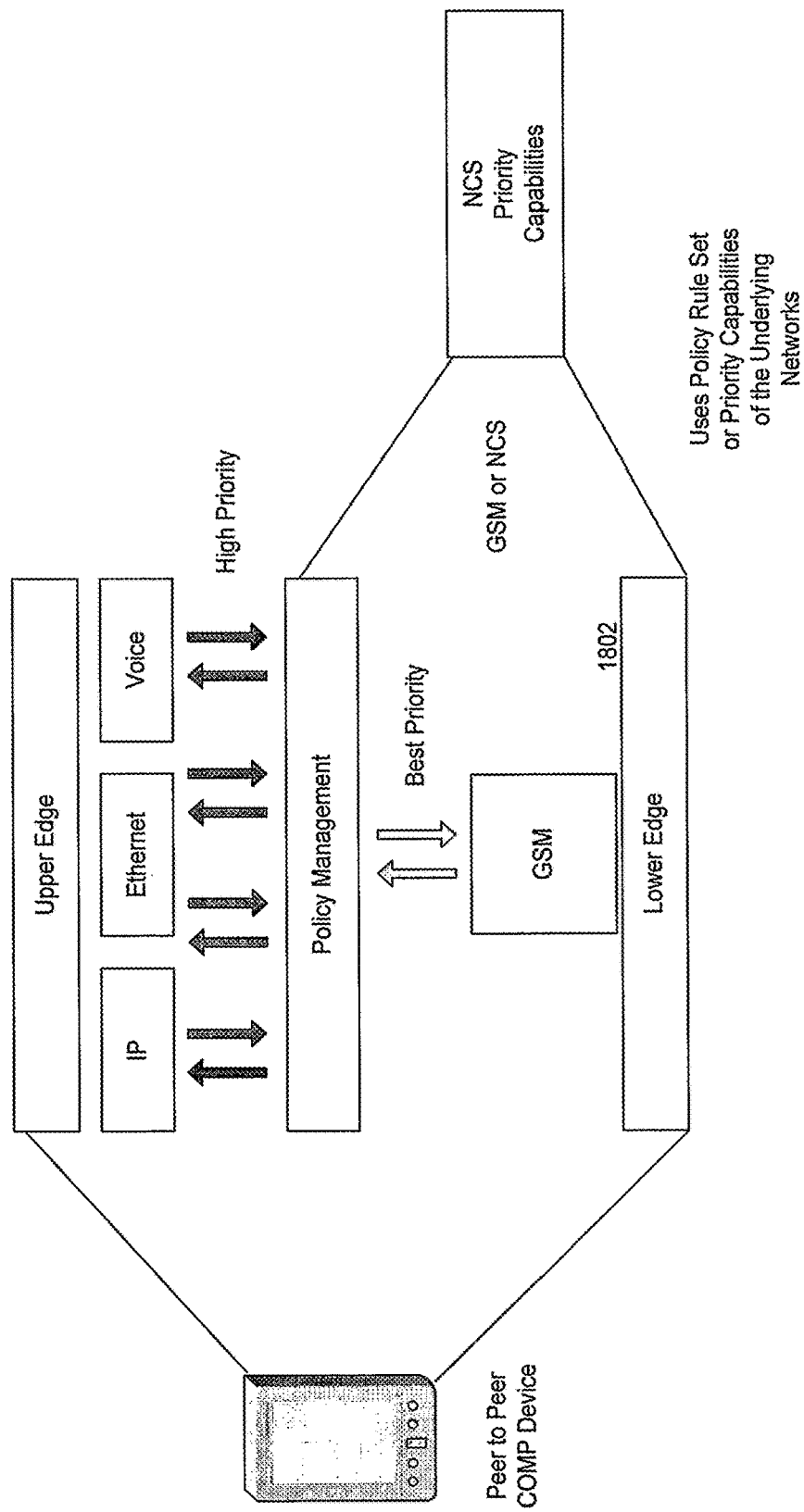
FIG. 18 is a block diagram illustrating upper and lower edges of a network.

FIG. 18 illustrates an example of how a peer-to-peer device uses best priority carrier the network can offer. According to the figure, the upper edge and lower edge, similar to FIG. 16, where the policy management section shows high priority, and the lower edge using the best priority that the underlying network can offer. The lower edge 1802 is a GSM network with NCS priority capabilities. From a peer-to-peer COMP device, the priority rule set causes the lower edge to activate and use the priority capabilities of the underlying networks.

Through this process of generalizing a priority system that uses rule based policy to enforce a consistent priority through the convergence network and utilizing the priority capabilities of the underlying networks based on that policy an aggregate prioritization can be established and enforced on a distributed basis throughout the network.

Convergence Network Generalized Services and Applications

It is conventionally difficult to determine whether coordinated attacks against America are occurring in timely manner. Today, the country's news services are typically the fastest way to get information on a national basis about an incident—from powder found in a post office to Anthrax breakout to explosion. If an Anthrax breakout hits the local news in LA, another one in Boston, and a third in Chicago, notice would be taken that three separate geographic regions had a similar incident. At this point contemplation of coordinated attack would begin, as the malicious spread of a deadly disease would become a likely possibility.

Most incidents are logged or recorded by a responder group prior to the news agencies showing up on scene. At the hospital it could be a record of the symptoms at check in or at the time of ambulance pickup in the EMS dispatch log. A fire, chemical spill, explosion or armed standoff is typically recorded at an emergency dispatch center (e.g., 911 dispatch) or with dispatch at a specific responder department. There currently exists no standard way to share this information as these are typically separate applications running on separate networks. This information could be automatically screened and analyzed for coordinated attack probability on a nationwide basis by generalizing the incident or dispatch recorded information.

Shared Dispatch

Figure 19:
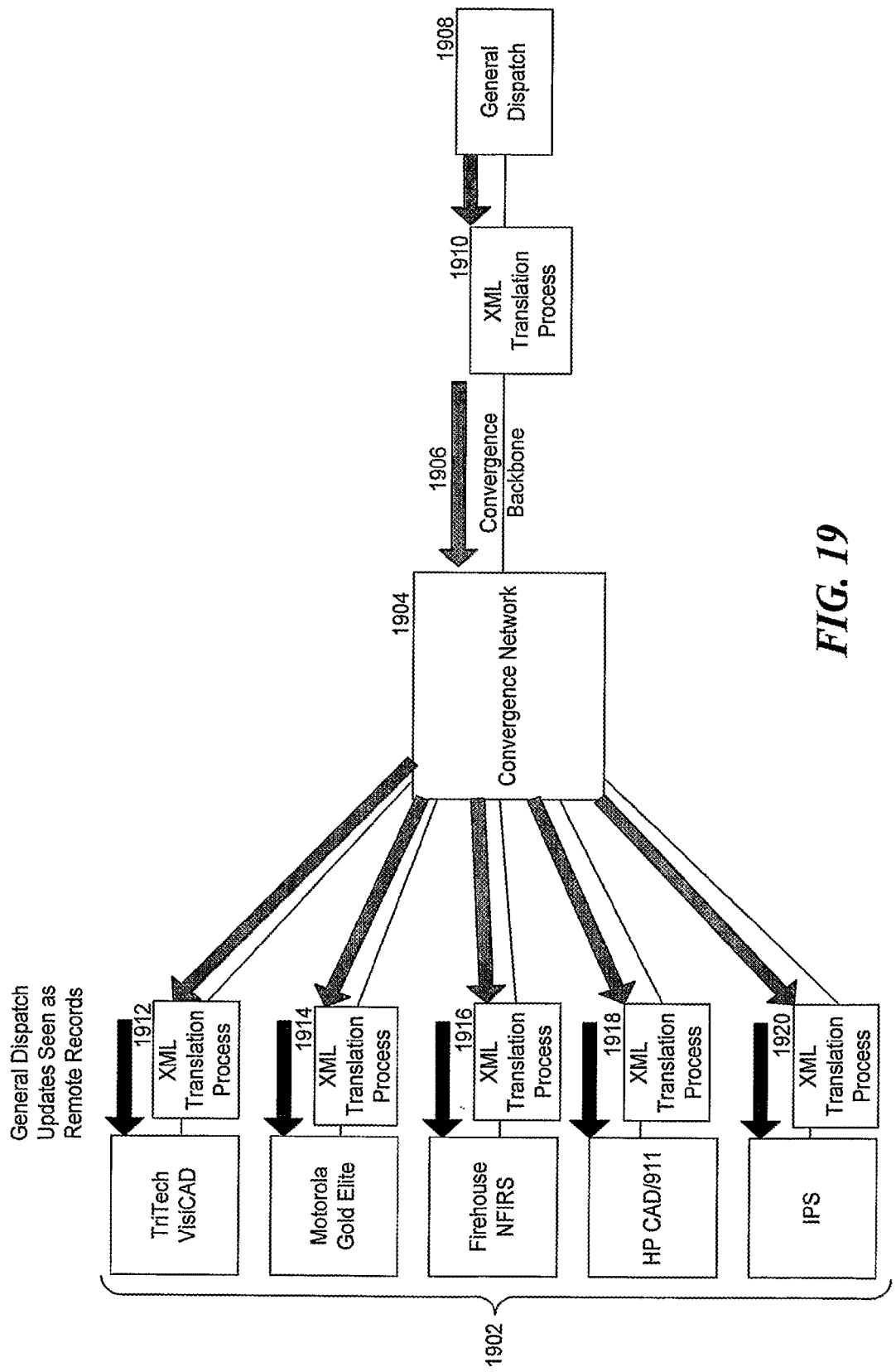
FIG. 19 is a data flow diagram illustrating flow of data when data from multiple dispatch systems are correlated.

A process is described for dispatch sharing so that information to be disseminated in a timely manner between agencies and so that coordinated attack analysis can be conducted on a geographic basis. A method is provided for sharing and analyzing information to lead to the detection of possible coordinated attacks and for inter-agency sharing of incident and dispatch events. Through the converged network approach of dual abstraction it is possible to interconnect different networks in a secure manner and to also provide generalized services and applications that can intemperate throughout the network. A Generalized dispatch application that utilizes the publication and subscription capabilities of a shared dispatch system can be created without the need for replacing every dispatch system. By exporting and importing data and communicating on the secure convergence network to a generalized dispatch service area and providing a thin translation layer between the native dispatch system and the generalized dispatch record format, dispatch records can be shared using existing systems. This feature is illustrated in FIG. 19.

According to the figure, several dispatch systems 1902 are connected to a convergence network 1904. Also shown is convergence network connectivity to the network that the native dispatch systems are connected to, along with the convergence backbone 1906 and the generalized service area 1908. XML based translation 1910 is performed and records are then published to the dispatch system. Records from one of the others can show up in another native dispatch system via subscriptions. Also shown is the process of subscription and retranslation (1912, 1914, 1916, 1918, and 1920) from the generalized dispatch event to the native dispatch systems format. Although arrows are shown for clarity, one skilled in the art will recognize that data would flow both ways. As an example, data would flow from one of the dispatch systems through the convergence network to the general dispatch after XML translation. The data could then be retranslated and provided to the other dispatch systems via subscription.

Figure 20:
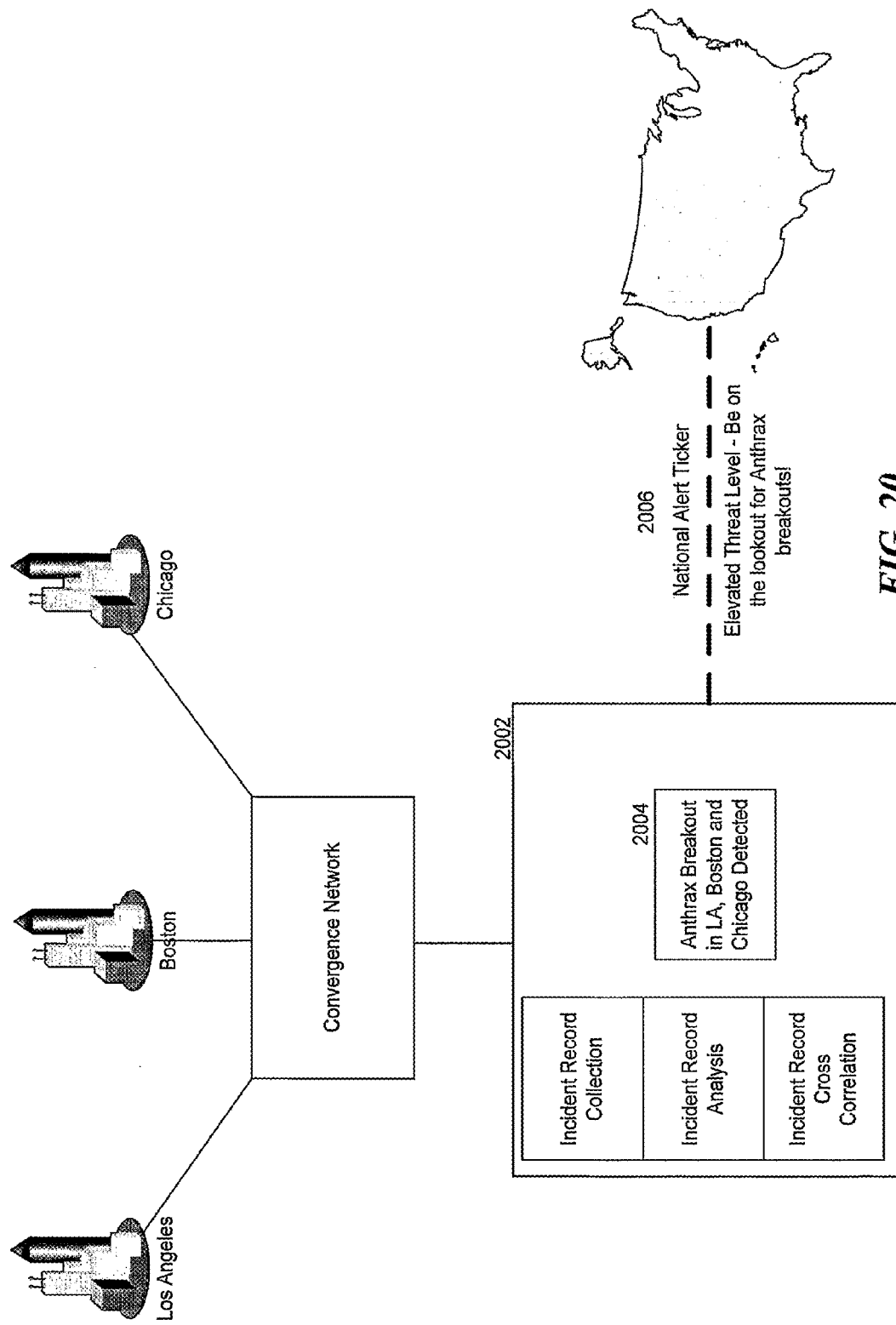
FIG. 20 is a block diagram illustrating a generalized dispatch store.

Once a generalized dispatch store exists, automated analysis, cross correlation of incident records can be performed and groups of events that fall in similar categories of interests can be measured on different time groupings to help determine if a coordinated attack is occurring and over what timeframe. This feature is illustrated in FIG. 20.

According to the figure, a generalized dispatch store 2002 runs grouping and analysis scripts for anthrax breakouts within the last 2 weeks and determines that an alert 2004 is required indicating three events relating to LA, Boston, and Chicago. Also shown is an automated ticker publication 2006 request broadcast nationwide, with a threat level tag of elevated, saying "Be on the lookout for Anthrax breakouts!"

Network Peering

Since the advent of inter-networking and particularly since the United States Government decision to break a large network carrier into multiple corporations, it has become useful to connect pieces of networking equipment owned by multiple parties. This process is referred to as "peering." Connecting networks is complex from either party's perspective since the other party could easily cause malfunctions, overuse the shared connection, or unfairly delay or discard messages destined for third peering parties.

Internet service providers (ISPs) set up peering points—the physical locations where exchanges happen—and negotiate peering agreements (which are essentially legal contracts setting out the exact details of how traffic is to be exchanged). Most peering points are located in co-location centers, where the different network operators "co-locate" their points of presence.

In today's mobile, ad hoc networks, this arrangement can be too unwieldy to be effective. The entire duration of interaction between two devices can be a few minutes or even as short as several seconds. In this environment, there is not sufficient time to negotiate, write and exchange signed contracts among device owners.

An apparatus is provided for exchanging desirable peering characteristics, negotiating a common peering agreement, exchanging digitally signed documents intended to serve as an audit trail, and verifying that performance complies with existing signed documents.

Quantifying Underlying Transport Characteristics

Figure 21:
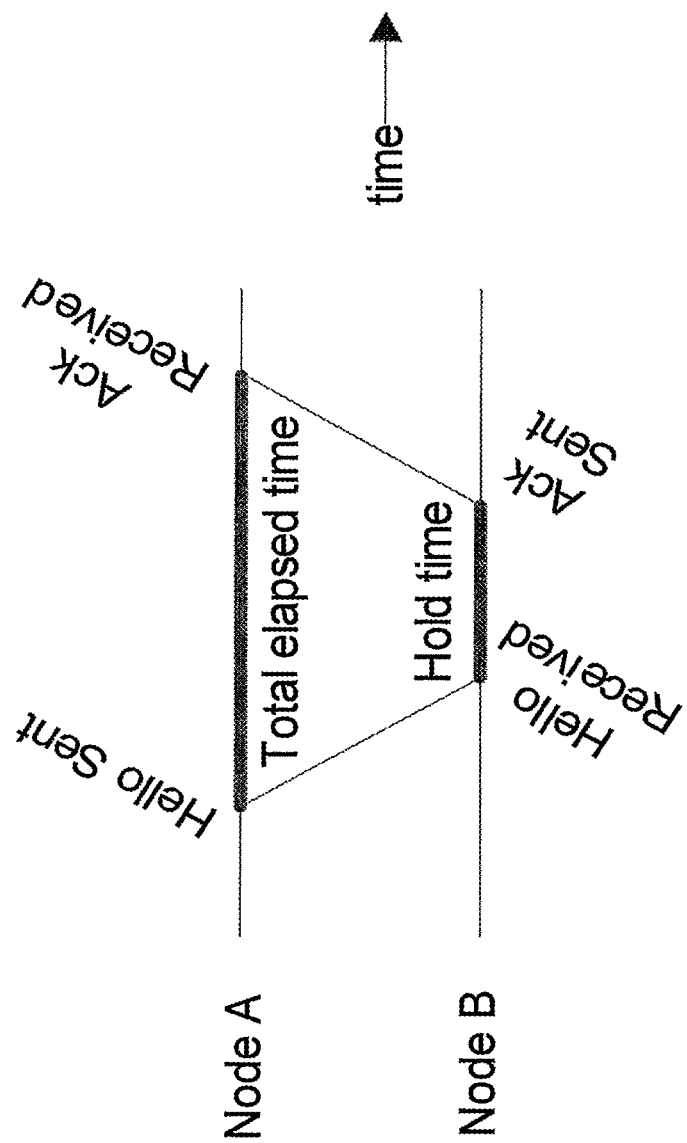
FIG. 21 is a block diagram illustrating link measurement between two network nodes.
Figure 22:
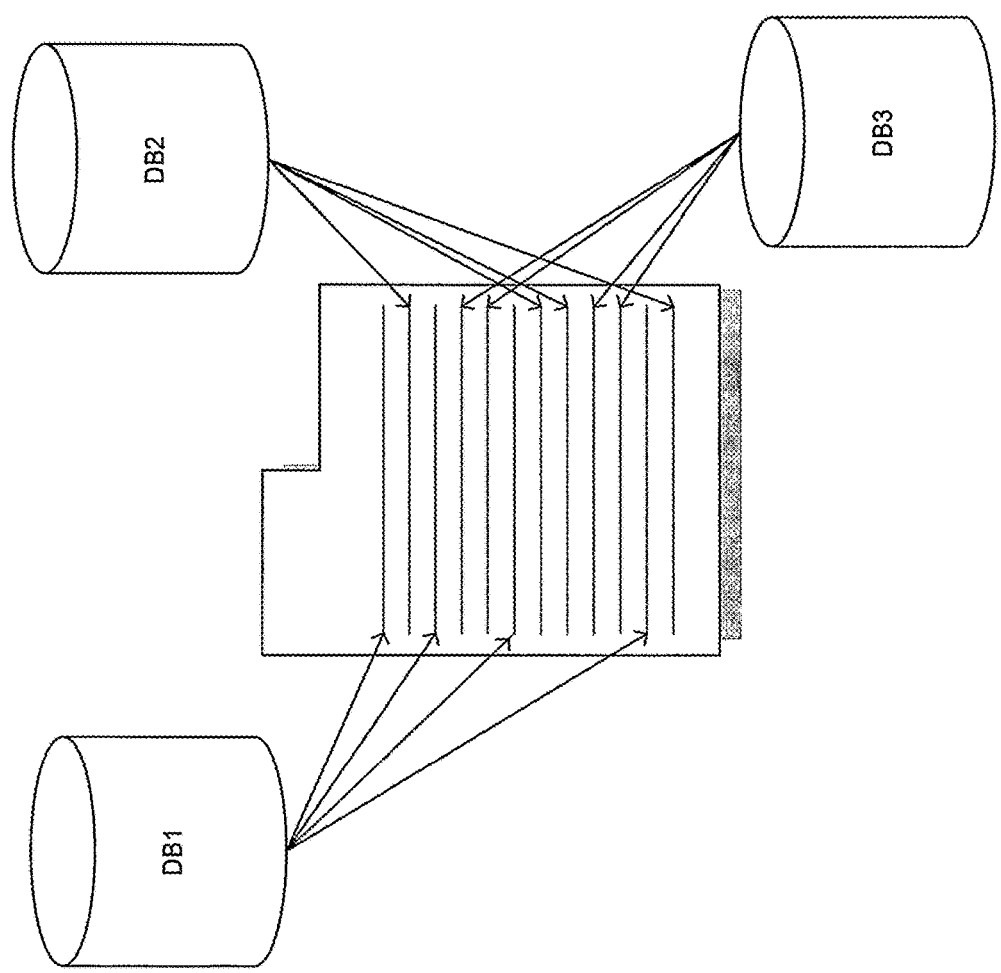
FIG. 22 is a block diagram illustrating distributed archival and chain of command.

To perform these features each machine should be able to measure the performance of a communication channel and of remote channels as advertised by other machines. Rather than relying upon a human to describe the state and functionality of a network, the apparatus employs a feature by which each network element can learn and communicate these characteristics. This feature is illustrated in FIG. 21.

To measure a communication channel between one machine and another, the parties execute the following protocol for some or all messages exchanged between them.
1. The sender, "Alice" for the purpose of discussion, records a temporarily unique message identification number into a memory table, inserts the identifier number into the message, and records the time at which it transmits the message. This is referred to as a transmission record.
2. The recipient, "Bob", records each incoming message identifier and the time at which the message arrived into a queue of unacknowledged messages.
3. At the next time Bob has a message to send to Alice, he retrieves one or more entries from the unacknowledged message queue and calculates the number of milliseconds passed since he received the matching message, also known as the hold time of each message.
4. In addition to executing this protocol symmetrically as the sender of a new message, Bob appends the retrieved message numbers and their respective hold times to the outbound message. These are referred to as message acknowledgements.
5. Upon receipt of the new message from Bob, and in addition to executing this protocol from step 2 as the recipient, Alice retrieves the entries from the transmission record as indicated by the message acknowledgements. For each, Alice calculates the difference between the transmission time and current time, called the round trip time, and then subtracts the hold time to calculate the observed channel delay.
6. Upon receiving a message acknowledgement out of order from the transmission record, Alice records all skipped entries as dropped messages.
7. Alice then records the size of each message and the observed channel delay, or that it dropped, in order to calculate the total observed bandwidth, total observed loss, and typical channel delay over a period.

With this information, each party on the network can automatically understand the media by which they connect. Using the calculations performed, it becomes trivial for each node to communicate the local network structure to more or less distant peers. Because there is no human interaction, the system responds rapidly to changes during catastrophic events.

Load Redistribution Using Predictive Risk Analysis

Joining Disparate Backbone Links Together

When constructing a large network with multiple owners, each with multiple sites, message routing policies should be exchanged and enforced according to the various constraints, such as those mentioned earlier. Rather than induce inefficiency and bottlenecks by connecting the large number of sites to a central peering point, the facility employs a routing system based upon a cryptographic overlay mesh protocol.

The facility connects each site to two or more backbone or point-to-point communication channels and installs a mesh networking protocol node at each site. This seamless redundant backbone appears as a single, fully connected network whose routing characteristics follow the natural and political boundaries between the multiple owners.

To create this effect the facility installs a network router at each site, including connecting each available backbone or peer-to-peer channel to the router. Each router then executes the following process.
1. According to the process described in Quantifying Underlying Transport Characteristics, measure and record performance characteristics of each link.
2. Each time a message is sent across a particular link, calculate the difference between bandwidth used and observed capacity.
3. Periodically (e.g., once per minute in some embodiments), select a number of links capable of reaching each recently requested destination. Make that selection such that the observed capacity of the aggregate selected links is larger than the highest recently sent message volume.
4. If during a given hour, the selection process in step 3 allocates more than a specified margin (e.g., 75% in some embodiments) of the total capacity, issue a warning to request human intervention.
5. Configure a cryptographic mesh overlay routing protocol to use the selected collection of links.

Figure 23:
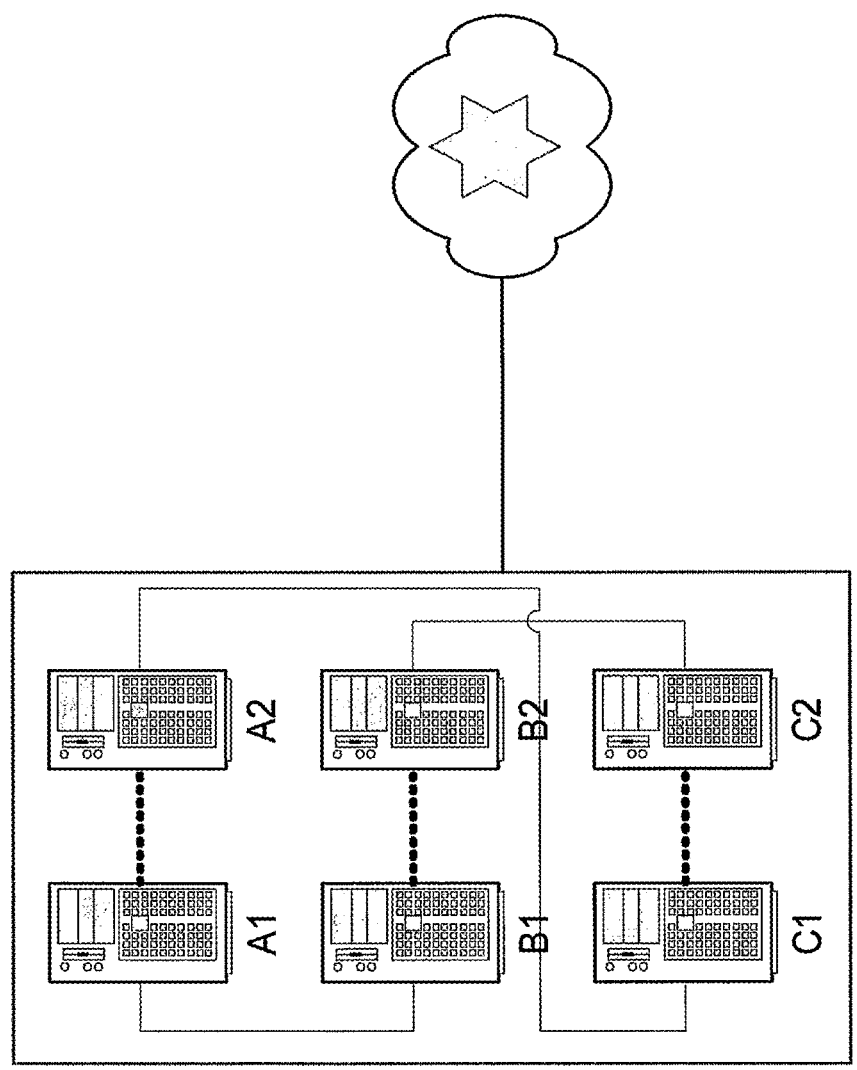
FIG. 23 is a block diagram illustrating a multi-agency peer-to-peer backbone.

Due to the dynamic nature of such a protocol, the bandwidth will come online transparently, making the network appear to have on-demand backbone capacity just in excess of the required utility. FIG. 23 provides an illustration of a multi-agency peer-to-peer backbone.

Creating Machine-Enforceable Resource Usage Policies

Figure 24:
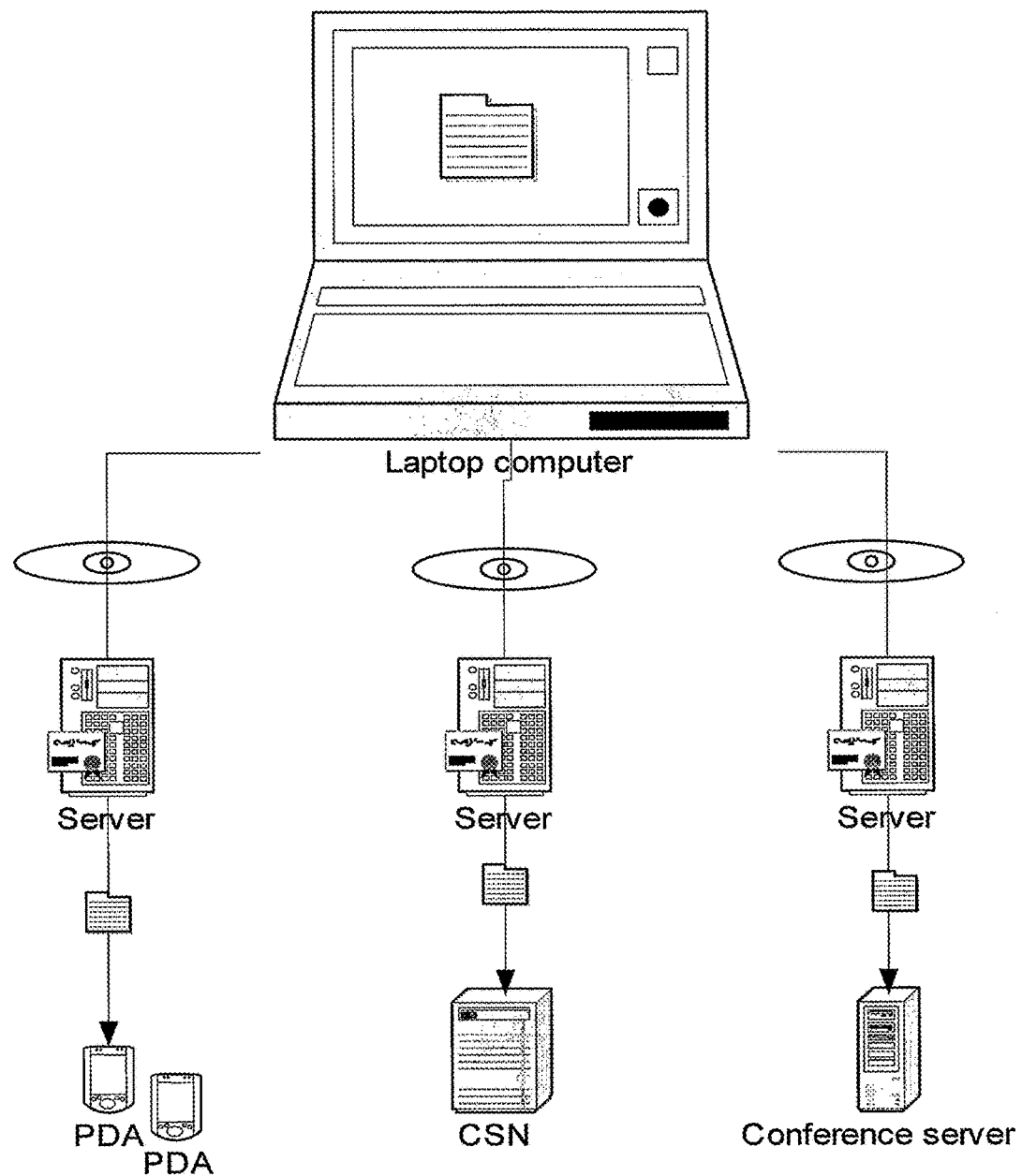
FIG. 24 is a block diagram illustrating a policy management system.
Figure 25:
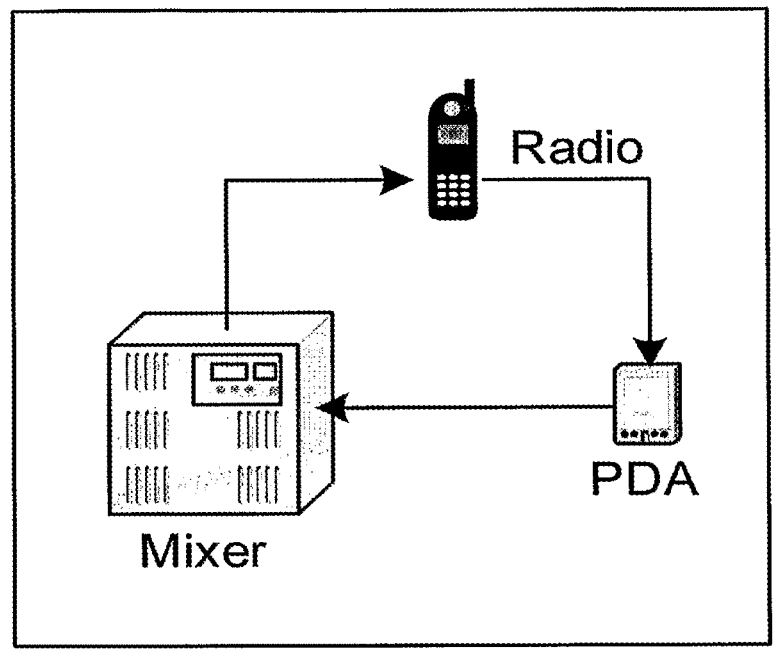
FIG. 25 is a block diagram illustrating feedback induced by radio.
Figure 26:
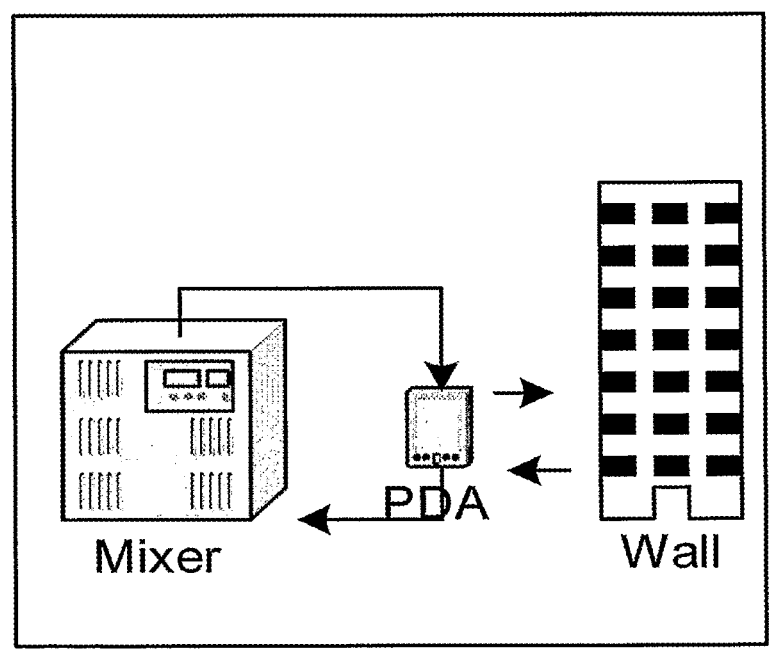
FIG. 26 is a block diagram illustrating feedback induced by environment.
Figure 27:
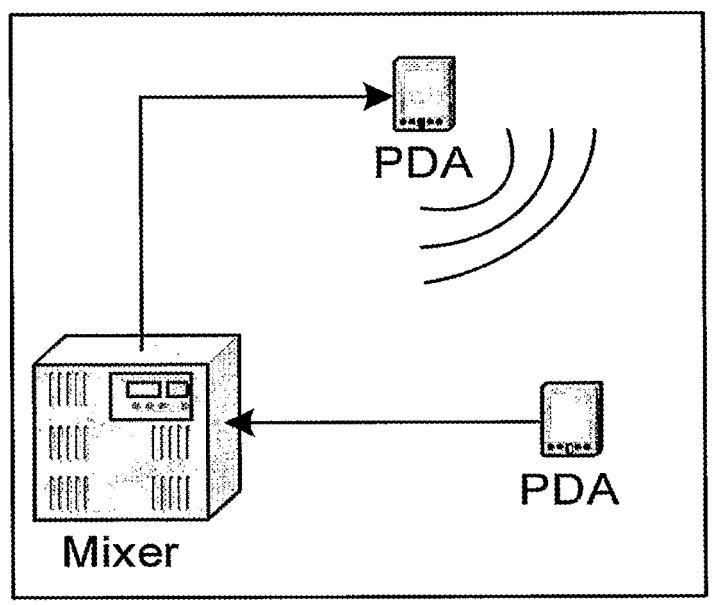
FIG. 27 is a block diagram illustrating feedback induced by multiple users in proximity.
Figure 28:
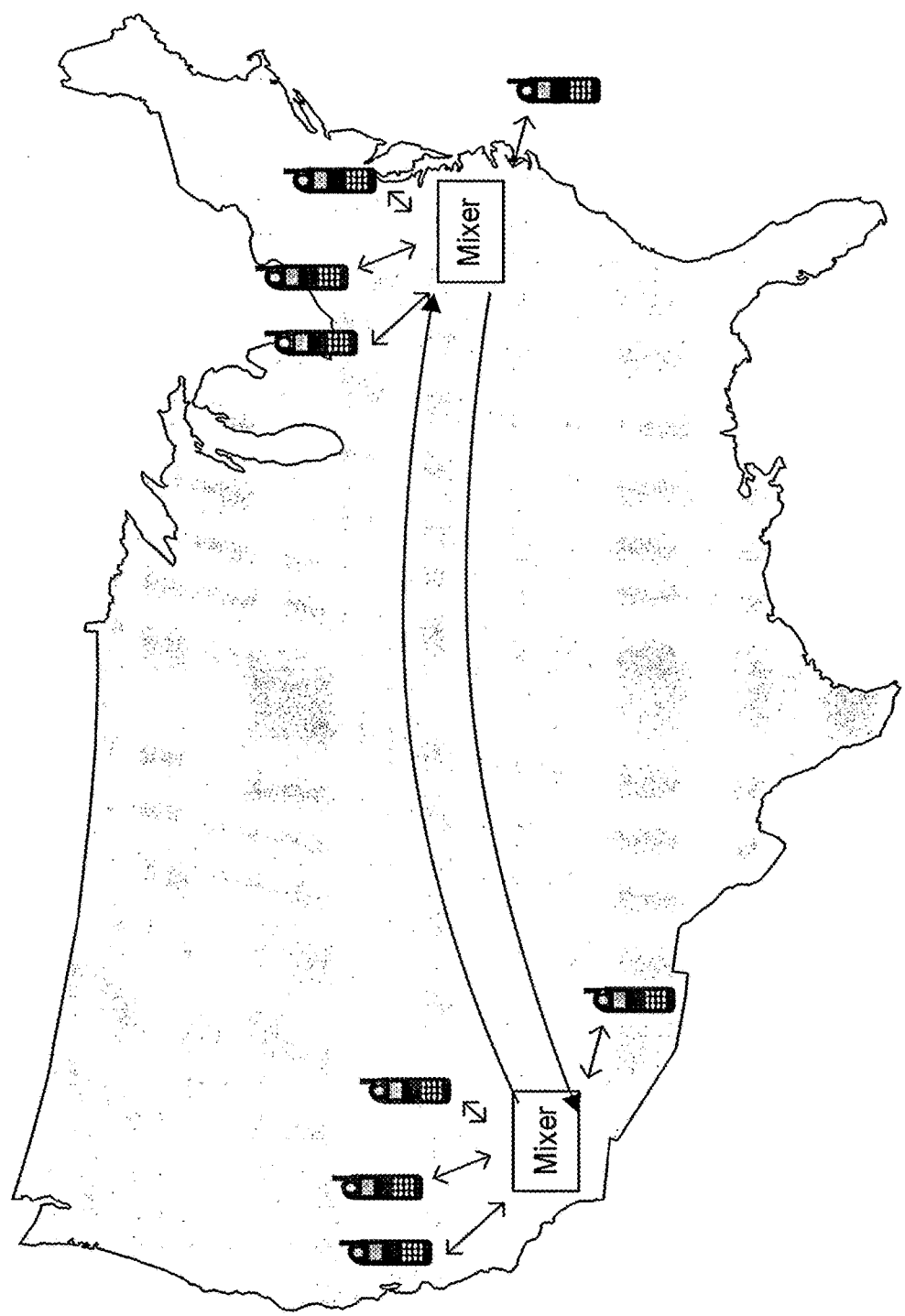
FIG. 28 is a block diagram illustrating a multi-mixed conferencing environment.
Figure 29:
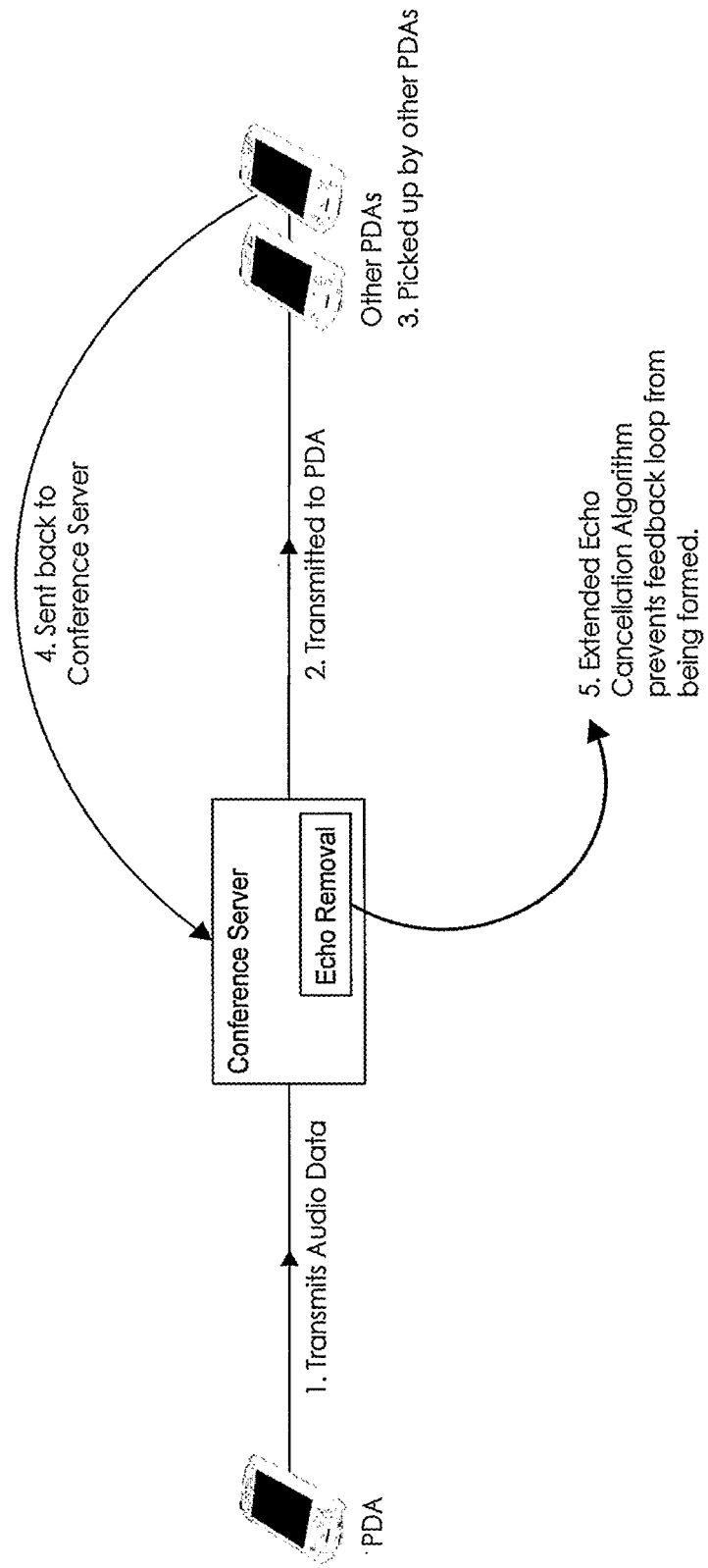
FIG. 29 is a block diagram illustrating voice bridge loop removal.
Figure 30:
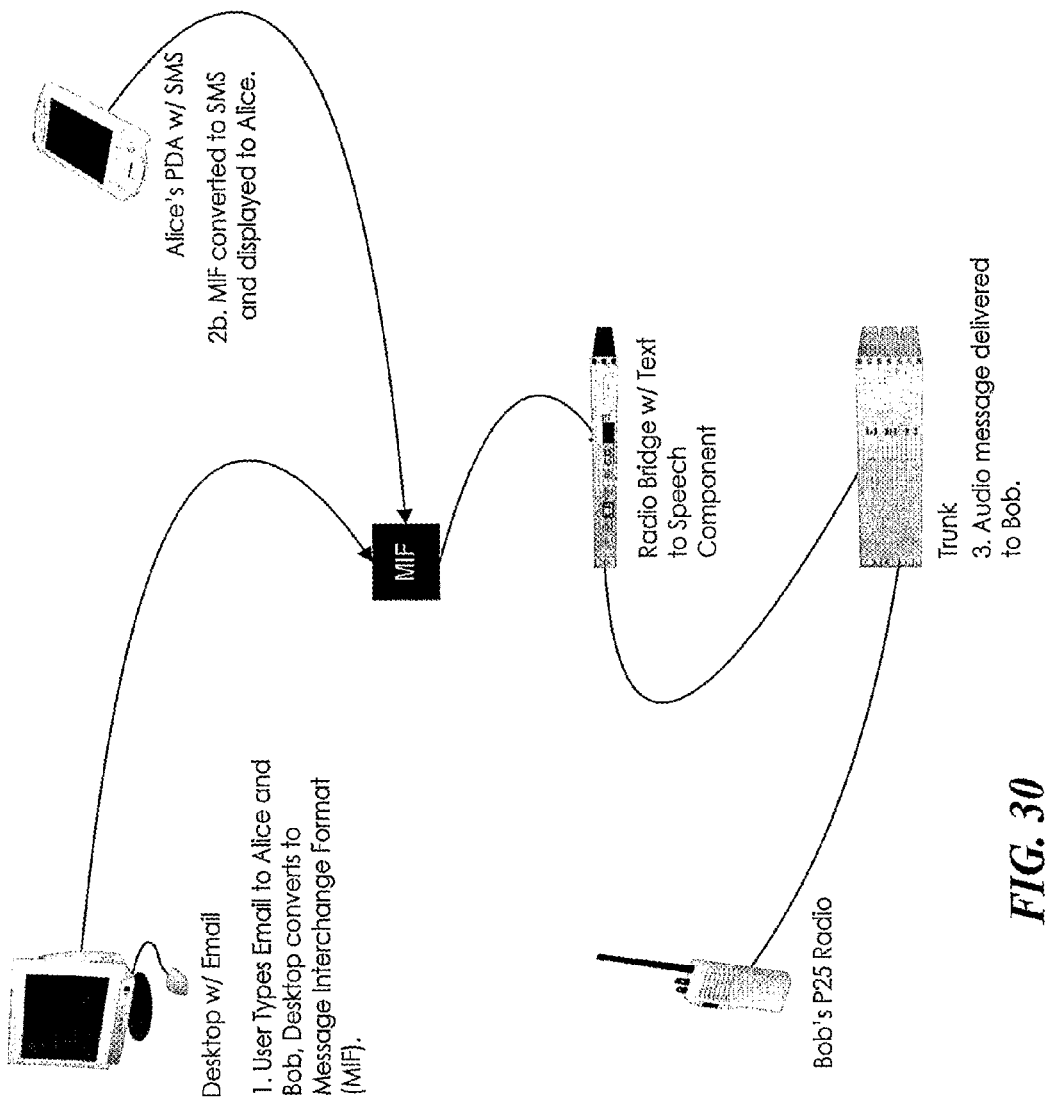
FIG. 30 is a block diagram illustrating multi-medium broadcast and interoperable text messaging.
Figure 31:
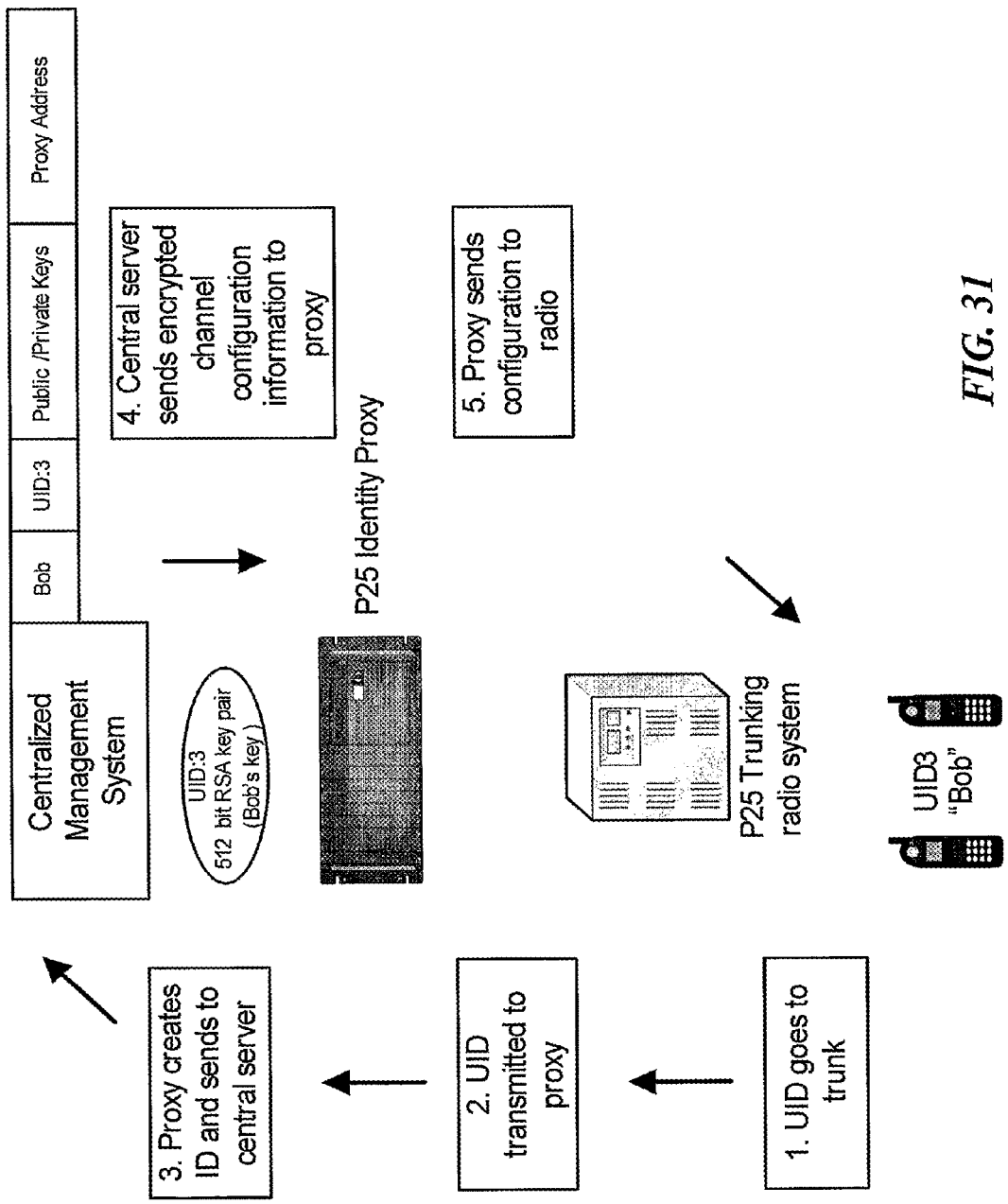
FIG. 31 is a block diagram illustrating identity proxying and centralized provisioning.
Figure 32:
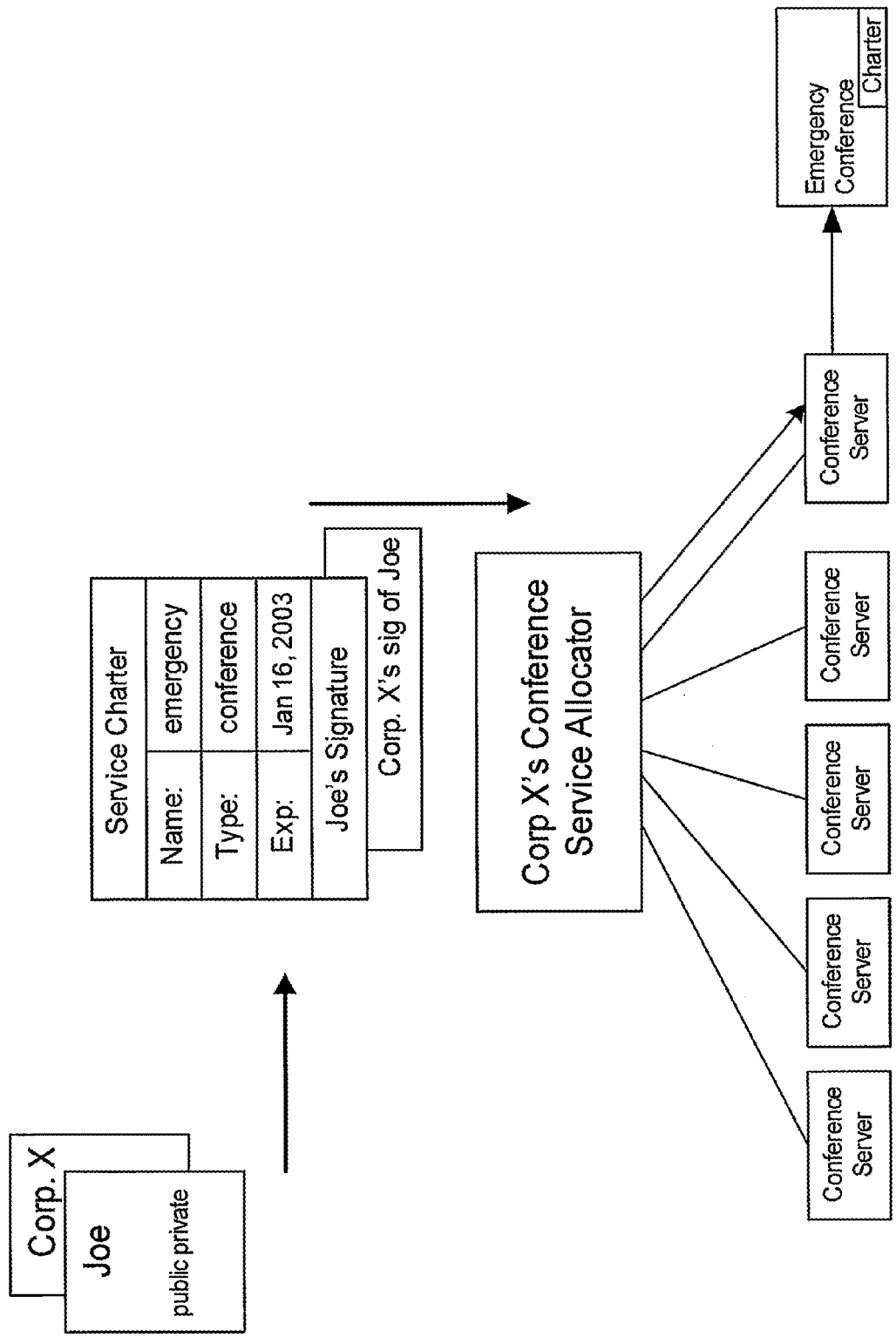
FIG. 32 is a block diagram illustrating use of a service provider and a service charter to create a service.

By using network-portable service agreements, the facility can securely exchange machine-readable files to describe shared resources and the strategy by which they are to be allocated. FIG. 24 is a block diagram illustrating a policy management system.

In some embodiments, the facility creates three tiers of allocation:
1. Allocate as much as 5% of a given resource on demand to any recognized entity, allowing for fault tolerance when specialized resources cease to function.
2. Of the remaining resource available, allocate as much as 30% on demand to any entity with credentials deriving from the same authority responsible for the resource, allowing for general load distribution inside an organization.
3. Of the remaining resource available, allocate up to 100% to any entity with a credential created specifically for the resource.

Verifying Intra-Organizational Quality of Service

Using the link measurement technology described in Quantifying Underlying Transport Characteristics, an organization can understand the capacity and performance of its internal network and its external links. However, it generally cannot measure performance outside that area.

Using a cryptographic overlay mesh routing protocol gives us the ability to trust that when a node chooses to send messages through the network, intermediary nodes are unable to decipher the content. Thus, it is possible for a node at the perimeter of an organization's network to test the enforcement of quality of service measurements advertised from remote areas.

To measure the quality of service, a given node executes the following process.

1. Collect a list of network identities observed during name resolution and other sundry network processes. Ignore all identities whose credentials derive from the same authority that owns this network node.
2. Select a random element from the list and initiate a voice-quality circuit with a single bit indicator set to inform the target to echo every communication with the same priority as a packet of voice data.
3. Query the network routing layer to retrieve the expected performance to the selected remote node.
4. Choose a random arrangement of 128 zero and one values to represent a number that is very difficult to guess.
5. Using the circuit created, transmit packet data matching the profile of three seconds worth of voice data. In each packet, fill the area reserved for voice data with the output of a one-way hashing function over the string formed by concatenation of the random number selected above with a zero-based counter. This way, the remote node cannot forge the return packets to bolster the apparent quality of service.
6. For each message received from the circuit, measure the total round trip time to calculate network latency and record the value in a list.
7. Once the entire test series is complete, find the worst latency in the list and compare it to the advertised expectation. If the observed latency is greater than the advertised value, record the service violation for human intervention.

Network-Portable Authentication of Administrative Commands Hierarchically Validating Resource Charter After receiving an administrative command document, a node may need to ensure that the security credentials of the creator are sufficient. The administrative command process is an application of the network-portable service agreements and their associated policy process.

In this way, individual nodes can validate and authenticate administrative commands without respect to the method of transmission used. See FIG. 22.

Distribution of Administrative Commands

To communicate commands rapidly throughout a complex and self forming network, multiple transmission schemes need to be created and managed. Executing the following process creates a blend of broadcast and narrowcast channels for this purpose. See FIG. 24.

1. Create a list of network elements that need periodic administration.
2. Create a series of categories of those networks elements so that each category represents one likely target grouping for administrative commands. Be sure to include a category for all elements, in case the list of categories proves to be incomplete.
3. Create and distribute a network-portable service agreement for each listed network element, and sign it with a credential recognized by all those devices.
4. At each network node so configured, execute the process to join a naming ring for each category containing that node. In this way, each device is addressable via each configured category.
5. For each command to be distributed, create a network-portable service agreement with a specified list of recipients and the command to execute, and then sign it with an appropriate administrative credential.
6. Mechanically compare the list of recipients to the list of available transmission categories, and select the category with every listed recipient and the fewest listed non-recipients.
7. Execute the naming ring broadcast process to send the command document to each node.
8. At each node, execute the process described in Network-Portable Authentication of Administrative Commands.
9. Search for the node's identity in the list of recipients. If the name is not in the list, discard the command. Otherwise, execute the administrative command as requested.

Efficient Public Safety Conferencing

In recent years, providing efficient communications during an emergency has become an important problem facing responders around the world. Most existing group communications options are heavily dependent on centralized infrastructure to distribute voice data to the necessary parties.

Radios conventionally require high-powered repeaters to extend a channel to any meaningful distance. Most modern radio systems also rely on a trunking controller that resides in a single location. Telephony conferences require telecom infrastructure and a centralized location to mix audio streams and redistribute them to the calling parties.

The centralization of resources necessary for communication between emergency personnel means that communication could easily be disrupted or disabled by an attack on any necessary infrastructure component.

In emergency situations, auditing conversations at some later date is often desirable. Traditional conferences can be recorded and audited at later points. Even a hypothetical peer-to-peer distributed conference could be recorded in its entirety and audited later. However, many devices participating in an emergency conference with no infrastructure would not have the ability to record an entire conversation.

In normal operating conditions centralizing the conferencing and mixing services can be desirable and does provide several advantages: easier load balancing, support for more participants, large amounts of storage for audits and recordings, etc.

Conferencing solutions that induce any amount of latency between the origin and destination of any audio data are can potentially create a feedback loop with the system providing the mixing services. This can happen in a number of different scenarios (see FIGS. 22-24). In these scenarios, the feedback loop is created because the audio is emitted at an endpoint later than it is produced at the mixing source, this allows a device to pick up the product and send it back into the mixing device where it will be redistributed to the endpoint devices and potentially fed back into the mixing device. The feedback will continue ad infinitum, or, more likely until it is attenuated to an indiscernible state.

Traditionally this issue is not dealt with because telecom conferencing is not subject to feedback owing to extremely small delay (any feedback is attenuated extremely quickly)

or efficient client device design (placement of microphones such that audio emitted from the speaker reaches the microphone with little or no energy). Traditional teleconferences assume that none of the devices in the conference will be in auditory range of each other.

A facility is provided that enables several methods that together allow conferencing to take place in emergency environments that lack a specific infrastructure. It also provides mechanisms to improve the efficiency of centralized conferencing solutions for public safety networks. Several methods are described to avoid inducing any feedback loops in conferencing systems. Various techniques are applied to either anticipate the feedback and mitigate it or to stop it from occurring by preventing devices from emitting audio into other devices. The facility also describes several methods that allow for conferencing devices without a centralized mixing mechanism. A method for associating every audio stream with a strong identity is described along with a method for prioritizing communication across the channel is described. The facility enables several mechanisms that allow a group communications channel to both emulate and extend capabilities similar to that of a traditional half-duplex radio system. The system provides all the components necessary for an effective emergency group communications mechanism. See FIGS. 22-25 and 29.

An individual may at any time be in possession of multiple devices capable of communicating in one talk group (e.g., one person may have a P25 radio and a next-generation digital/converged communications device, such as a voice communications capable PDA). Each of these devices may have different latency characteristics as well as different talk activation mechanisms. For instance, a PDA may be activated by voice detection and a radio may be activated by pressing a PTT button. If the radio were to output voice data prior to the PDA, the PDA might detect a voice signal and retransmit it into a mixing application. This would immediately cause a feedback loop. (See FIG. 22.)

This scenario can be prevented by associating each of the users devices with the user himself. The network or mixing application can then realize that a user has multiple devices active on a given communications channel and transmit it only to the optimal one. The optimal device would be determined by provisioning each device with a priority level. The priority level information would be shared with the mixing device. The mixing device could then output a voice stream to only the highest priority device, preventing a feedback loop from being created.

A feedback loop could alternately be induced by one individual with one device that is operating in full-duplex mode. Voice communications could be emitted from the device and the resulting audio could echo off the surrounding environment and be picked up by the full-duplex device's microphone (see FIG. 23). A poorly designed device may also simply pick up audio directly off the output device (i.e. speaker.)

This can be prevented by executing any number of widely available echo cancellation algorithms on the endpoint. The algorithm would recognize that the device had recently emitted a given audio stream and prevent it from being reintroduced into the system. Echo cancellation is explicitly designed to prevent feedback loops in any kind of voice communication. The facility prevents compounding feedback loops in an environment with multiple simultaneous devices.

Multiple devices in auditory proximity where one device is transmitting and any other device is receiving audio data could easily induce a feedback loop by picking up voice from a nearby device (with differing latency characteristics) and reintroducing it into the mixing device (see FIG. 24).

Echo cancellation algorithms with an extended window (at least the size of the maximal round trip latency of the most latent device on the channel) implemented at the mixing device would effectively prevent any previously transmitted audio from being reintroduced into the channel. This would eliminate any potential feedback loop from being introduced into the channel.

In many situations the participants in a conference, especially a VOIP conference, will have drastically variant latencies. The round-trip time (RTT) from one device to another may vary greatly from the RTT to a centralized mixing location. There are two ways to mitigate this and improve response time. One is to use a peer-to-peer conferencing solution as described below. Another way is to split the mixing responsibilities up across a few mixing devices and then combine the data at a centralized location.

Splitting the mixing responsibility allows all of the benefits of a single mixing location with the added benefit of reduced latency between close devices and the ability to combine conference arbitrarily without redirecting all of the participants. Mixing devices can easily combine streams of audio and output a product. The product could be sent to another mixing device that mixes streams from mixers. This chain can be compounded to an arbitrary depth with an increasing latency penalty for each level (see FIG. 25).

Latency can be reduced in the following situation: Assume a number of devices take input from a land mobile radio system and convert it into a digital form that are grouped in two groups of five, one group on the west coast and one on the east coast. The cross country latency is much higher than the latency from each of the radio bridging devices inside each group (which are physically connected to each other via an Ethernet switch). Response time can be improved for the local radio conference by placing mixers locally on the east coast and the west coast and attaching the radios to the closest mixing device. The west coast could then connect its mixer to the east coast to provide a nationwide conference. Each of the local devices will be able to communicate much more rapidly because they are limited only by the local latency, not the network-wide latency.

In a conferencing scheme with multiple participants and multiple devices, it is often desirable to allow each participant to use the codec of their choice so that they can make optimal usage of the resources available to them. This means that the audio stream may be encoded multiple times, once for each endpoint. An equivalency class is a group of endpoints that all share common encoding properties. By only encoding the outbound data once for each equivalency class the amount of work done by the mixing device can be reduced.

In an emergency situation centralized mixing equipment may not be available. To still provide effective group communications, audio needs to be distributed to each party and mixed at the endpoints. Multicasting allows one chunk of data be addressed to many recipients. An intelligent network that supports multicast will only split the data into multiple copies when it is necessary. This means that one device could potentially broadcast voice to hundreds of recipients even if the device only has enough upstream bandwidth to send data for one or two conversations. In this system each participant transmits data over a multicast link to every other participant only when the participant is actively speaking.

To support the need for auditing, prioritization, and greater situational awareness a method is provided for attaching an identity to each audio packet as it is sent to a remote endpoint. In the system, each participant gives a key to an asymmetric cipher to every other participant along with an identification. Before a participant sends any audio data he encrypts the audio data with his side of the key pair and attaches his name. This allows the remote side to locate the correct decryption key quickly (via the attached name) and to verify the origin of the transmission (e.g., by testing for a successful decrypt).

If multiple data packets are received from different source for a given time span, each device mixes the data together before playing it out. This effectively distributes the work of mixing the audio data across the network and allows multiple actively speaking participants.

To ensure that high profile individuals have communications precedence, a pre-negotiated priority is attached to each such individual. This can be accomplished by distributing keys out of band and associating each one with a name and priority. Other mechanisms could be used to negotiate priority. Assuming each packet arrives with some way to associate it with a priority level, the packet is associated with a moment in time (e.g., using RTP). If more than a preset n number of packets is received for a given time, all packets are ignored but the highest n priority packets and only those are mixed.

The feedback prevention mechanisms can easily be applied to a peer-to-peer conference as described above. Wherever the methods for feedback prevention mention the 'mixing device', or 'mixer', simply execute the algorithms on every node in the conference, as each one is considered a mixing device.

It may be desirable to set up a system whereby only a limited number of parties may talk at once. This provides us with a more clear communications channel (and one that is potentially free of any feedback problems.) The notion of traditional radio PTT as 'right-to-talk' is abstracted. In a given communications channel, based on policy, some N parties may at a given point in time be able to acquire the right-to-talk. The right to talk is acquired by transactionally requesting the right to talk from every device in the network. This may fail if a traditional radio system is presently receiving data, or the radio system may choose to transmit anyway. Once every device has registered and verified (by executing the channel right-to-talk policy) the requesting parties right-to-talk, they update their state and continue. Once a party has acquired the right to talk, mixing devices will allow input from the device to proceed through the mixer and be output to the network (this works for peer-to-peer as well as centralized conferences.)

If two parties ever attempt to acquire the right-to-talk (RTT) simultaneously, the channel's RTT policy is executed and the competing parties are assigned a priority. If the number of people trying to acquire RTT is below what the channel's limits are, then permission is granted to all parties. Otherwise the remaining RTT slots are filled in priority order.

The algorithm can be modified to allow for priority override if RTT is allowed to be revoked once it has been established. The priority comparison and RTT slot assignment should simply be done for both the requesting parties and the active parties. If a requesting party has a higher priority than a party that already has RTT, that party may lose RTT depending on how many slots are available.

The policy may be executed before checking for available slots because it would be valid for the policy to increase the number of slots.

Infrastructure Free Cooperative and Emergency Resource Allocation and Discovery

A party desiring to allocate resources in a network conventionally requests someone to allocate the resource, and may need to provide proof of various facts, such as permission. Additionally, whatever process determines which resource to allocate needs to know which resources are available to allocate.

Automatic discovery of computing resources available for use in an area would be advantageous if made available to public safety personnel in a variety of situations.

In an emergency, the needs of local public safety officers may exceed their available resources. While the idea of surrendering bandwidth or other network resources to the police in the event of an emergency is not often considered, it could easily become a real situation in the event of a large terrorist attack or natural disaster. The inventors are unaware of real mechanisms for law enforcement personnel to effectively surrender bandwidth even if it were needed.

A facility is provided that defines a service charter as a cryptographically verifiable autonomous digital document that describes a service that some machine will have the knowledge to create. The facility provides a method whereby machines capable of creating services register themselves with a machine capable of assigning them work. This work-assigning machine is discoverable by other machines on the network. The facility provides a system that allows for the discovery of resources in geographic proximity to a location as well as the ability for public safety personnel to commandeer private resources for use in an emergency.

To allow service and resource agreements to be fulfilled on a global scale without the need for centralized infrastructure, the concept of a "service charter" is introduced. The facility assumes that every user has a cryptographically strong identity that can be used to associate the user with various rights. The facility also assumes that all service providers have policies that tell them whose service requests can be fulfilled.

A service charter necessarily includes enough information to reconstruct a service and carries all the information necessary to authorize the creation of the service. It is in a sense "service currency." A service charter should include the name, type, and access rights of the service being described. It should be signed by whomever's resources are to be used to create the service, e.g., Joe acting on behalf of Corp X (Joe has a document signed by Corp X giving him the right to create conferences on the behalf of Corp X.) It would also include an expiration time for using the charter to create a service. It may include other arbitrary policy elements (such as delegation to a resource provider for re-issuing the charter). This document may provide proof that Corp X wants to allocate resources for a given service on the network somewhere. This proof is entirely portable and may not require Joe or Corp X's actual presence on the network, only the ability to verify their signatures. By including a complete signing chain and the public keys used to sign, any verifier only needs to store a hash of Corp X's public key in order to successfully verify the certificate.

The use of the service charter requires knowledge of a service provider capable of creating the service described by the charter. The facility uses a distributed hash map that contains a list of providers that are capable of creating the desired service and a list of service providers that will provide service to a given organization.

In large networks, picking which service provider to talk to in a way that utilizes resources efficiently would be difficult. To address this, the facility adds a "service allocator" mapping to the hash map. It maps an identity and service pair to a well defined machine. This machine keeps track of all the available service providers for the given identity/service pair. It tracks which services are currently running and where they are running at. This allows the service allocator to use any of a number of available resource allocation algorithms to make determinations about where services should be created. Exactly which node functions as the service allocator is decided by using an election based algorithm for all machines capable of serving as such. If the network ever gets split into smaller segments, each segment will elect its own service allocator for each service/identity pair.

The node would look up the servers capable of creating and the servers willing to create it, take the intersection of the two lists, and then hand the charter to a well-defined service allocator from the list. The allocator will either create the service and tell the node where to reach the service, or if it already exists, simply tell the node where to locate the service (see FIG. 32). The service provider asked to provide the service would then double check to make sure it wasn't duplicating a service, and proceed to activate the service.

The service charter, because of its portability, allows a service to be created separately on any two completely disjointed networks. Because the mechanism allows an existing service to be discovered on a network where it exists, and to be created on a network where it does not, it can be ensured that a given service remains available in the event of a total network separation. The only additional step required to ensure this is to provide each user of a service with a copy of the original charter.

Now that services can be located based on type, the capabilities of the network can be extended by adding a table to the hash map that is keyed based on location and stores a list of service providers. In order to effectively use the new geographic location information the facility adds a new kind of service allocator for a special type of service referred to as the "location" service. This location service allocator is looked up like any other service allocator. It requires a charter that specifies geographic closeness to a location. The location service allocator will then return a machine-readable document (it may fetch it from other machines actually running a location service) that describes service types that are available to the requester that match the geographic search criteria.

To locate more general types of services, such as a camera or a heat sensor in close proximity, the facility creates another entry in the hash map which associates network wide agreed upon names, like "camera" and "temperature sensor," with a list of specific service types that fulfill the desired operation. If a node needs to find the more general type of service, the node simply requests that type in his location search charter.

In an emergency, the police or other public safety personnel may have a great need for network resource in excess of what is usually available to them. To address this, a mechanism is provided that would allow police to temporarily take control of available network resources.

This is done by creating a new commandeering service. Any party operating on the network may be required to operate a commandeering service. This service will only accept charters from valid law enforcement agencies. The charter contains the name of a service type or the identity of a specific service provider that will be reassigned to the requesting party for the length of time listed in the charter.

The results of such a request are completely auditable, so enforcement can be handled offline through the legal system. An organization with a need for a resource that could not be commandeered could simply not obey any commandeering requests directed at it, or the commandeering service could refuse to honor the requests. Provided the organization had obtained prior permission from the relevant government entity to deny a commandeering request, it would be immune from prosecution or fines.

A given agency may require services of a type not available to it in close enough proximity to where they need the services, or at all. The commandeering service charter can include a desired service type. If the commandeering service cannot locate an adequate resource, it forces a node to offer a service type that it is not presently offering, provided it has the physical and software components necessary to fulfill the request.

After the service charter expires, a commandeered node would revert to its former state as it remembered it. The commandeering service could also store state from commandeered devices not capable of storing their own state. This effectively restores the network to the desired state after the emergency is over. A charter could also be issued by the original commandeering party revoking the commandeering order.

Global Revocation Management

Public key cryptography has been in use for many years in many different environments. Public Key Infrastructure (PKI) is a term that is used to describe systems that manage key provisioning, distribution, and revocation of keys. Key revocation is one of the most technically difficult problems involved in the creation of an efficient PKI system.

A key revocation can be necessary for many different reasons. Once a certificate authority (CA) has decided that it needs to revoke a certificate, it will need to use whatever mechanism their PKI supports. CAs would ideally be able to invalidate any use of the desired certificate instantaneously and on a global scale.

There are essentially two mechanisms for handling revocation that are in wide use in PKI systems today. They both involve creating lists of certificates. A white list contains a list of all valid certificates. A black list contains a list of all invalid certificates. Many systems exist to distribute and these lists, each with its own drawbacks and strengths.

In general white lists are good for systems with a low number of certificates and black lists are generally better for larger systems that don't anticipate a frequent need to revoke certificates. In an environment where there are a very large number of certificates with a potential need to revoke a huge number of them, e.g. a secure mesh network, there are no good existing solutions.

There are a few other mechanisms to enact revocation, but they are not as widely used. These mechanisms include creating certificates with a short validity period (thus requiring all clients to frequently refresh their certificates.) This method in particular is not often used because it has very high traffic and administrative overhead.

Figure 33:
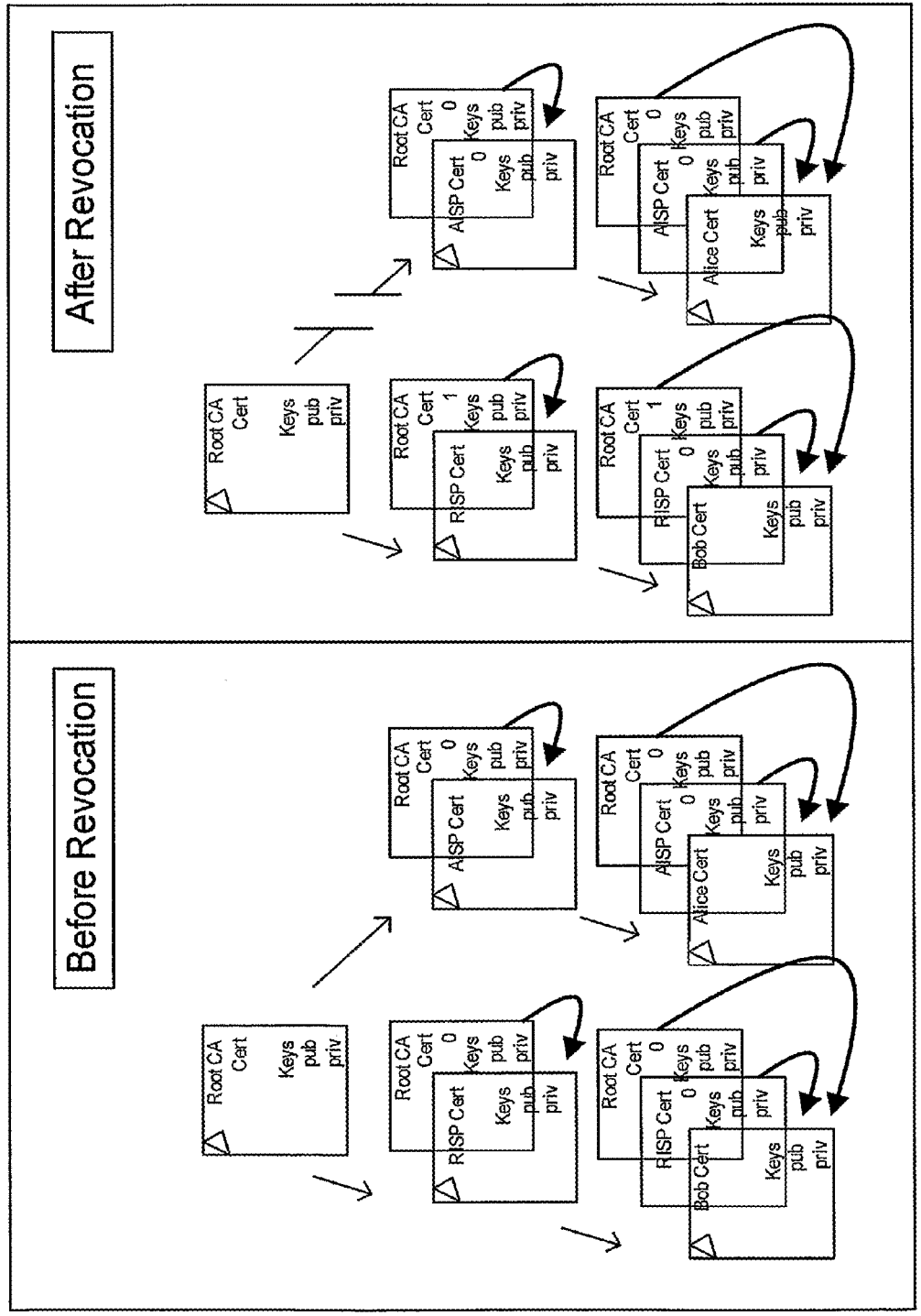
FIG. 33 is a block diagram illustrating certificate issuance, such as when using RISP.

A facility provides methods whereby a CRL can be compressed to a very small amount of information that can easily be shared and validated by any part of the PKI. This is illustrated in FIG. 33.

Efficient CRL exchange is achieved by making a few observations and using them to create an alternate notion of a white list. It could be viewed as isomorphic to a traditional white list that has been compressed to one number.

First, a CRL enables a given node that trusts a particular CA to verify that a certificate the CA signed is still valid. White lists provide a signed list of certificates that are valid. A black list contains a signed list of invalid certificates.

Each CA will issue each certificate with an edition number. This number is monotonically increasing and is incremented when the CA decides to issue a new edition of its signed certificates. (See FIG. 34.)

A CA would initially issue every certificate with an edition of '0'. '0' would then be considered the CA's present edition. In this system a certificate is valid only if it bears an edition number equal to the CA's present edition.

In a situation where a CA had issued 20 certificates with an edition of '0' and then decides it is necessary to revoke 5 of them, it would proceed as follows:
1. Resign all certificates it wishes to continue to be valid with an edition of '1'.
2. Make the certificates available to the necessary nodes.
3. Increment his present 'edition' number to '1'.

It is important to note that each of the clients of the CA, if they are themselves CAs, do not need to resign their child nodes certificates, they only need to provide them with the up to date copy of their own signed certificate.

When a third party needs to validate a given certificate, it only need ascertain the current edition of the CA that issued the certificate. The white list of a given CA is thus compressed to one number—its edition number.

This method has several other useful properties. In the event one were unable to or simply found it undesirable to contact the CA to ask for its current edition, a node could determine the current edition (or at least get close to the most current edition) by tracking the current edition for every CA that it encounters. If a node ever communicates with a node that has proof of a more up to date edition for a given CA, the node can simply update its record of that CA's edition, without the need to contact the CA. This method may not always produce the correct answer, but it will be closer to being correct than having no idea whether a certificate is valid.

This scheme also allows for very effective propagation of revocation. When a CA issues a new edition, each of its directly signed nodes could be contacted and given the new certificate directly. This is an inefficient part. If the CA was a root level CA or otherwise quite high in a trust hierarchy, there may be hundreds of thousands of nodes that need to be notified of the changes. Only a small portion of these will be direct children of the CA.

Once the direct children of the CA have been updated, any node that communicates with the children can simply copy the new certificate block from the child. More generally:
1. Node A has an old edition of a certificate at the second level of a 7-level certificate chain proving his identity.
2. Node B has a copy of the correct edition.
3. If Node A attempts to communicate with Node B, Node B can simply give Node A a copy of the certificate with the correct edition.

This method then limits the amount of traffic on the network due to a revocation (change of edition) to close to the lower limit of what is possible. It also allows the information to be propagated on a need to know basis, preventing massive traffic floods of nodes asking for new CRLs.

The certificates can be exchanged securely in this system without the need to contact the issuer provided each node keeps track of a hash of every CA's public key along with its edition. Any node can then look at the new certificate and verify its signature via the following process:
1. Ensure the complete public key is attached to the certificate.
2. Hash the public key and verify that it matches your record of it.
3. Verify the signature using the attached key.
4. Update its edition I certificate chain if the signature is valid.

The methods described above provide dynamism and low resource consumption to provide an effective global scale certificate revocation scheme that is suitable for ad-hoc networks.

Efficient Aggregation and Dissemination of Messages

In many large organizations, there are many available platforms on which to notify the members of the organization of an important event. The importance of notifications is magnified in the public safety sector. In an emergency the difference between two minutes and five minutes for the delivery of crucial information could be fatal. The manner of delivery is also very important, an email is not going to help two policemen on a bike route gain any situational awareness. Likewise a loud radio alarm with a message converted from text to speech is not going to be a very effective day to day mechanism of reaching the governor.

A facility is provided for individuals and groups to publish a message in any format and have it be delivered to another group or individual in the best format for any individual that the message reaches. See FIG. 30.

Individuals and groups can publish their notification policies onto the network as well as the capabilities of their communication devices. They do so by putting the information in a network wide distributed hash table. Each person is associated with a unique cryptographic identity. The hash of the public portion of this identity is used as a key into the hash table.

Any communications device on the data dissemination network knows how to translate a message in its native format into a standard message interchange format. For example, an email client may be able to translate an email into a standard XML document and a radio bridged onto the network may have the ability to translate speech into text and store it in the same standard XML format. Likewise, any device participating on the network may be able to render the standard XML format in its native format, e.g. a radio bridge may be able to convert the text in a standard XML format into speech. This ensures that any device on the network can both transmit and receive a message.

Every party on the network should have a stored policy document describing how to notify the party in different circumstances. The party should also have a communications configuration that maps to the policy, i.e., if the party has both a radio and an email notification device, their policy should spell out when to reach them via voice and when to reach them via text; the communications configuration document should describe the capabilities of each device the party is carrying and a priority number if the party is carrying multiple device capable of notification in the same manner. When a message is sent into the network the same policy document describes what characteristics should be attached to the message, e.g., 'Urgent'. When deciding which device to deliver the message to for a given recipient, the policy is consulted and a unique result is obtained. The message is then routed to that device and rendered into the correct format based on the receiver's policy.

Some devices may have multiple users associated with them, for example, a standard VHF radio may have approximately 50 officers on the same channel. The communications configuration document describes how many people might be reached for a given rendering format. The same would apply for mailing lists. When a device successfully renders a message it reports back to the sender on how many people were reached and, if the rendering device is capable or confirming receipt, whether or not message receipt was confirmed. The sender can then view a recipient by recipient confirmation list as well as aggregate information about message delivery.

Centralized P25 Provisioning

The P25 radio standard is a standard for digital radio communication that allows radio handsets to be addressed individually in a debatably secure fashion. Problems are encountered when one wishes to use the advanced (for the field of land mobile radios) feature set of P25 radios in a modern secure digital converged communications environment.

A facility is provided that enables a centralized service to provision P25 radio systems with IDs that translate onto modern secure networks and how those networks can then be used to manage the devices. See FIG. 31.

Using a standard public key infrastructure system a certificate authority can issue a certificate to a proxy for a given radio system that allows the proxy to issue certificates for individual radios. Whenever a new radio is brought online its unique P25 identifier is associated with a new public/private key pair by the proxy service. The proxy service has awareness of all the P25 radios it has provisioned and all of their identities. Various proxy servers can aggregate this information to a centralized data store. The proxy answers network traffic destined to any of the P25 identities it is proxying for. Whomever controls the centralized data collection point can then address any of the radios over the computer network in a cryptographically secure manner.

The proxy can provide a standard interface to the P25 system it administers. Using network policy various configuration commands can be executed on the radio network based on preprogrammed events or through direct control by a party with appropriate access rights.

Network-Portable Secure Document

Security of transmission of a document is generally divided into four attributes: privacy, integrity, authenticity, and non-repudiation. Depending on the application in question, each of these attributes may be required for the transmission of a document to considered fully secure. For example, in the case of a secure financial transaction all aspects are required for every message transmitted: knowledge of the details of the transaction should be limited to the involved parties, the integrity of each part of the transaction should be ensured, the authenticity of each part of the transaction—particularly the identities and financial stats— is correct and not falsified, and it should be ensured that the identity and authorization of the involved parties is attached in a way that withstands later questioning. In a second case of a public announcement or alert that should be verifiable by any recipient even in the absence of any direct contact by the author and recipient, integrity, authenticity, and non-repudiation are important but privacy is not. That difference in requirements allows an important new method of handling public secure documents.

Conventional solutions to these problems use public key cryptography in a process that requires access to central infrastructure, particularly for the non-repudiation portion of the process. Conventional solutions also provide for the secure transmission between one party and another but provide no mechanism by which that message may be forwarded to a third party while retaining all of its security properties. Alternate solutions that do not require centralized infrastructure will enable many new applications, particularly those that involve heavy use of cryptography to secure message transmission and that require these messages to be stored and retransmitted as availability of resources and network status change.

By packaging the full signer certificate chain with a document, the document may be made verifiable by the receiving party without any further communication. The advantages in doing this are twofold: not only may the receiver verify the signatures on the document without further communication, the receiver may at a later time redistribute that document to any number of other parties without losing any of the security properties of the document. That is, even the document's recipient several transmissions removed will still be able to verify the message's authenticity, the message author's identity, and the identity of every signer of the message author's identity all the way back to the root certificate.

To mitigate the bandwidth and computational resource requirements in this process, some of the cryptographic properties of a document constructed this way can be taken advantage of to allow differential transmission of signing information and full verification of identity without verifying every signature in the document. These optimizations are possible without impacting the security of the process.

For the purposes of this description data that has the required properties of verifiable authenticity, offline-verifiable authenticity (non-repudiation), and verifiable identity of the author will be called a "network-portable secure document," The process of construction, transmission, and verification of one of these documents is described below.

Construction

To construct a network-portable secure document the data to be included as the body is prepended with an identity certificate identifying and authenticating the originator and the originator's signing key. A cryptographically strong hash of the document including the originator's certificate (HMAC) is then appended to the document and the result signed with the originator's signing key the same key mentioned in their identity certificate-using standard public key techniques. The actual full content of the originator's key is then appended to the message. This key should be either the root key of the PKI hierarchy, signed by the root key of the hierarchy, or have a signer whose signature chain can be eventually traced to the root key of the hierarchy. In the first case, the originator's key is sufficient. In the second, the root key is then appended to the end of the collection of keys to be included. In the third case, not only is the originator's key appended and the signing key for their certificate, but also each higher certificate in the hierarchy required to verify that the chain of signatures reaches all the way to the originator of the message. This collection of data represents the entirety of a network-portable secure document.

Transmission

Once the document has been constructed in this way, naïve transmission requires only that the complete document be transferred to the recipient. Because the document contains all data required for the recipient to verify the document's authenticity based on the signature of the trusted root key this transmission may include arbitrary time and distance and over transmit-only mediums without affecting the verifiability of the document on receipt.

If a two-way medium is available for transfer of the document, it is possible to optimize the transmission based on the shared certificate base common between the transmitter and receiver. At transfer time the transmitter need only transmit identifying information for the keys attached to the document in order from the originator's key to the root key, one at a time, until a common key is found. No further keys may need to be transmitted as the remaining signing hierarchy may then be deduced to be already stored in the receiving party's keychain. For transmissions between organizationally close parties this optimization along with the ability to verify only the newly received certificates will allow a great reduction in the amount of data transmitted and the number of certificate verification operations executed.

Verification

Upon receipt of the document the recipient first checks that the HMAC embedded in the document and the computed HMAC of the relevant portion of the document (author's certificate and data) are identical and that the digital signature attached to that portion of the document is valid and was generated by the key indicated in the identity certificate embedded in the document. This process verifies that the contents of the document are unaltered from the time of creation and that the document is certified authentic by the owner of the key indicated inside the document.

Given that it is verified that the document is internally consistent, a remaining task is to verify that the signing key indicated by the attached identity certificate and the identity specified within that certificate are authentic. This is accomplished by examining the certificate chain attached to the document to verify that the certificate used to sign the document is ultimately indirectly signed by the root key, that is to verify that there is a continuous series of certificates beginning with the signer of the document and ending with the root key in which each certificate is signed by the next one in the series with the exception of the root key which is implicitly trusted.

Secure Network-Portable Aggregation

In a typical public-key cryptography application special authorization and full trust is required to publish "trusted data." In this case trusted information is data that will be used by other participants in the same PKI infrastructure and thus will have its signature checked for validity prior to taking any action based on the contents. In effect there are only two classes of entities in this system, trusted and untrusted, and only the trusted individuals may publish trusted information.

There are two key drawbacks to this approach. The first is that there is no means of validating that a trusted individual is operating correctly to generate the trusted data even when that trusted individual is merely operating on other trusted data to produce its output. The second is that even those operations that are mechanical functions of trusted data sourced from outside trusted sources require execution within a trusted entity in order to be able to publish a trusted result. The consequence of these two drawbacks is that in the absence of trusted entities with the ability to publish trusted data no trusted data may be published at all. This leads to a failure case in which a collection of entities who are isolated from all trusted entities will no longer have the ability to publish trusted data among themselves, even when such data may be mechanically generated.

A common way for an untrusted party to perform computations in a verifiable way on trusted data to produce new pieces of trusted data will enable more new applications to be built, for example distributed decision making and notification tools for emergency communication.

A process is provided that enables an untrusted party to perform validated computations in a verifiable way on trusted data to produce new trusted data. This is accomplished by building a mechanism that allows data tied back to a specific computation and for the specifics of that computation to be verified, not just the identity of the person doing the computation.

One new application enabled by this process is automatic tracking of the number of first responders on an incident scene. Rather than require every responder's device to update every other responder's device with its status when it comes on-scene, each responder's device simply locates the highest on-scene authority and sends its identifying information to that authority. That authority may then initiate notification messages based on an increasing number of on-scene responders and attach sufficient authenticating documentation to that notification for any recipients to be able to verify the validity of the alert without consulting other parties on the network.

This process is particularly useful when portions of the network may lose connectivity and become isolated from any standard source of authority. In this case even an entity without typically sufficient privileges may collect data and broadcast alerts based on that data as long as the source data is signed and the decision-making criteria are well-known. This provides a path of graceful degradation from optimal operation with all resources and authorities on-line to sub-optimal operation with few resources available and no valid authorities on-line with minimal disruption to the availability of data aggregation and notification services.

The secure network-portable aggregation process is based on three key concepts: the secure network-portable document, aggregation, the trusted entity, and the verifiable process. The secure network portable document, described in detail below, is a portable format for transmitting information with cryptographically verifiable integrity and authenticity. Aggregation is the process of collection several pieces of data and performing a computation on them to produce a new piece of result data. A trusted entity is an entity that is authorized to perform a certain function, in this context described by what data they have the rights to sign. For example a surveillance camera may have the right to use its cryptographic key to sign video captures along with attached GPS coordinates of the camera but not any other type of data or any data not marked with the same GPS coordinates (e.g., it cannot sign an e-mail or an image from a location where the camera is not). A verifiable process is a computing operation that is described in a mechanically executable way and is signed by a trusted entity. A signed Java executable is an example of a potential implementation of this component. These concepts allow construction of secure network-portable aggregation.

Construction

To produce a secure network-portable aggregation of data a strict process should be followed:
 1. Source data signed by trusted entities is gathered by the aggregator
 2. The aggregator verifies the authenticity of the source data by performing the appropriate signature checks and signer identity verification as described elsewhere.
 3. Verifiable processes signed by trusted entities are executed and the resulting output data is collected.
 4. For each piece of output data that will be published create a new network-portable secure document containing the data and the aggregator's signing key.
 5. All data necessary to transmit the signed aggregated data is now ready for transmission. At this stage the aggregated data may be evaluated to determine whether it needs to be transmitted to other hosts on the network for notification purposes.

Transmission

Transmission of the aggregated data is accomplished in a similar manner to the transmission of a secure network-portable document. Similar to the Network-Portable Secure Document (NPSD), the actual transmission includes not just the core portion of the document itself but also all indirect signing information including the full signature chain of the aggregator, the verifiable process document containing the process used to do the aggregation computation, all source documents used in the computation, and all signing hierarchies back to the root key for each piece of source data and the verifiable process document.

Once all of this data is collected it may be transmitted without further negotiation to any other device or entity on the network. To reduce the number of certificates that should be transferred the transmitter and receiver may determine what certificates, verifiable policies, and pieces of source data are already held in common and transmit only the missing difference.

Verification

Upon receipt of the aggregated data and all associated validating information the receiver's should first validate that the data is valid. In the base case where the only common information or trust between the transmitter and receiver is the root key's certificate all attached data will need to be verified.

1. The authenticity and integrity of the data is verified, as for any network portable digital document.
2. The authenticity and integrity of the attached verifiable process is verified.
3. The authenticity and integrity of the attached source data is verified.
4. The verifiable process is executed with the attached source data as input and the output is verified to be identical to the aggregated data.

While intensive, this process serves only as the baseline means of verifying the aggregated data. The receiver need only verify the identity certificates, source data, and verifiable policies that it has not already verified prior, thus avoiding a significant amount of computation when the transmitter and receiver have similar signing hierarchies and available data. In addition if the aggregator is in fact a trusted entity for the particular aggregated data being transmitted, for example if both entities are members of the same organization and there is an organizational policy that all members of the organization have a certain degree of trust for each other then the receiver may verify only that the aggregated data was indeed published by the purported author and proceed to treat that data as authentic.

Secure Network-Portable Policy

A secure network-portable policy (SNPP) is a network-portable secure distributed document adhering to a specific format describing conditional actions in a mechanically executable way building on the infrastructure provided by the secure network-portable aggregation process. The primary purpose of a SNPP is to provide the network as a whole and all users with a way to manage distributed execution of rule sets that describe resource allocation policies, incident escalation policies, provisioning policies, etc. With this infrastructure in place it is possible to enable a wide variety of applications, from incident-local provisioning (deputization) to threat-level triggered user prioritization.

Construction

A network-portable policy contains three key elements in the data portion of the secure network-portable document it is contained in:

Enabling criteria
Actions
A signing key

The enabling criteria describes the conditions that should be in effect for the policy to take effect. These conditions include network-state (connectivity to a specific named device), message criteria (a message should be received with specific properties, for example specific authorship and contents), and published conditions (values published in a subscription-aware network database). These conditions are each assigned a score and a method for evaluation. For example a published property at the location "us.gov.dhs.threatlevel" may be numerically compared to a fixed value ("yellow") and based on that match either add or subtract from the enabling criteria score. If the enabling criteria score exceeds the threshold embedded in the enabling criteria section of the document the policy is considered immediately active.

The actions section of the SNPP contains a list of actions to take when the policy becomes active. The actions list is broken into two groups: Enabling actions and disabling actions. The enabling and disabling action groups are further broken down into subgroups called steps. Contained in each subgroup is a set of actions which may be executed simultaneously, including publication of a value (for example to set "us.gov.dhs.threatlevel" to yellow) and sending of a message (to a particular device or identity with specified payload).

The last section of the SNPP is the signing key. This signing key is the key of the policy itself and may be used by the policy to sign messages, published conditions, and even to sign provisioning documents or further policies.

Execution

To execute a policy a device should simply walk through the enabling criteria, evaluate each element, and verify if the resulting score exceeds the embedded triggering threshold. To evaluate any published properties the device should first subscribe to that property in order to be notified if its condition changes. If at any time the score exceeds the triggering threshold then the device should execute each action in each step of the enabling actions attached to the policy using its key to secure each action as well as the policy executer's key. Once this is done the enabling criteria are monitored for changes. If any of the criteria change sufficiently to bring the score below the triggering threshold then the disabling actions are taken and monitoring continues.

Situational Policy

Policy Describing Deputization Criteria

At the time of an incident it is often appropriate to give escalated authority to on-scene first responders or other individuals. By implementing the correct secure network-portable policies it is possible to allow this to be enacted largely mechanically by the network infrastructure and devices themselves with minimal human intervention.

The first task is to identify what additional privileges the first responders will need during the situation in question and what actions their devices should take on their behalf. In the case of an emergency one measure that would be taken is to increase all first responders' network priority using the underlying QoS model of the network. In addition first responders may be granted the ability to deputize (add an endorsing signature to) civilian identity certificates, giving them similar communications and situational visibility rights to a full-fledged first responder but perhaps without the ability to execute the escalation policy themselves. To increase situational visibility, an action may be added to the SNPP enabling actions list causing it to subscribe the device's ticker application to an incident-specific message broadcast and to publish its location into the incident-specific available personnel namespace.

The second task is to specifically identify and codify the criteria under which the responders (in this example) may activate the policy to gain additional privileges. First responders will typically need escalated privileges during an emergency. An emergency might be quantified as one of two cases: Either a local emergency or a nation-wide threat alert. A local emergency may be described in terms of the user holding the device either being in the locale (i.e. in the city of Washington D.C.) or within 100 miles of the border of the locale where the emergency is taking place. This is measured by comparing the device's physical location (provided by GPS or another location service) with the location or region in which the emergency is described as being. The nation-wide threat alert may also be handled mechanically. With the DHS threat level published into the global condition namespace, this criteria might be specified by referencing the location in the namespace ("us.gov.dhs.threatlevel") and the required level for automatic prioritization of first responder traffic (perhaps red). In addition the policy should specify that only users with identity certificates that are marked as first responders or deputies are eligible for prioritization.

These criteria and actions may be codified into a secure network-portable policy document and embedded in each first responder's device. See FIG. 36.

Controlled Incident Escalation

A policy may be implemented that grants additional rights to a first responder or other entity on the network based on situational data, such as in the event of the presence of a local emergency or of a DHS threat alert. In such a case, conditions are published into the global condition namespace by a third party and read by the policy. As noted in the secure network-portable policy definition, conditions may be published as an action as well as subscribed to as part of the enabling criteria. Using this mechanism, the facility can achieve policy-based automated controlled incident escalation. For example, the facility may determine that in any single local incident in which there are more than twenty first-responders present, the mayor, the police commissioner, the fire chief, and other local decision makers should all be notified of severe incidents without delay.

In this case, the facility may simply define a SNPP that publishes local alerts this and ensure that it is executed on all local first responders' devices. The specific implementation would state that a current local alert level of 1 be published to a location in the global condition namespace at a well known location, for example "us.states.dc.washington.alertlevel," as soon as any registered incident had more than twenty on-scene responders. The only additional policy that needs to be set is one specifying that on any change of the "us.states.dc.washington.alertlevel" all members of the decisionmakers' group be sent a message and for those people to be added to that group.

With these policies in place as well as the one described in the previous section all first responders at an incident will notify the incident commander as soon as they come on-scene (per the policy in the previous example). Once the incident commander registers the twenty-first on-scene responder his device will automatically publish the value "1" to the location "us.states.dc.washington.alertlevel" as prescribed by policy and without delay or human intervention. As soon as the alert level goes to 1 the policy indicating that the messages should be sent out will be executed and the proper group will have been notified, allowing the escalated authority to take action.

Network-portable Service Agreements

Creation

A network portable service agreement is a specialized version of a secure network-portable policy designed to allow two parties to formalize the sharing of resources in a way that can be mechanically evaluated, executed, and audited by the resources being shared and other devices operating on the network. The process by which two parties construct a network-portable service agreement is similar to constructing any other type of SNPP document:

1. Parties agree to and codify the exact terms of resource sharing, particularly what devices will take part, what types of service priority will be given, what type of logging will 'lake place, and for what term the agreement is valid.

2. Both parties sign the resulting service agreement document and attach their full signature chains.

3. The policy is distributed to all participating devices.

Enforcement

Enforcement of systemic compliance to network-portable policy is enforced by means of logging all perceived non-compliance incidents for manual verification and resolution. If, for example, a device from one organization is denied access to a resource from another organization that under the active resource sharing policy should be available to it a noncompliance event will be created. The noncompliance event consists of a secure network-portable document composed of the following elements:

The nature of the noncompliance event (access denied, link denied, etc.)

The identities of all parties involved (typically the device's own identity and the remote device or service's identity)

Copies of applicable SNPP documents.

Once the document has been constructed it is simply transmitted to the configured auditing service for later resolution.

Prioritized Recovery

In order to preserve the functionality of the network for first responders and other emergency response personnel it is important that during periods of recovery from network disruptions non-responder use of the network be restricted so as to allow recovery and reconvergence in a minimum amount of time. There are several measures that are used to achieve this goal:

Priority reconnection

Priority flood

Priority re-registration

Priority reconnection is the mechanism by which communications needed by priority users are brought up first before other users are serviced. This is achieved by granting each priority user a certificate denoting their status at provisioning time such that they may then present their identity when attempting to gain connectivity and be linked into the network as soon as possible without waiting for any non-priority users.

Priority flood is the mechanism by which information is broadcast across the entire network with maximal speed before other network information distribution, routing, or resource location services are ready for service. To initiate a priority flood the sending user should (similar to priority reconnection) have additional credentials to be active during a time of emergency. In this case the user will be able to send a single message which will be replicated and forwarded throughout the entire network until every device is reached. This mechanism is useful for ensuring that status updates, alerts, service location requests, etc. may be sent out as soon as connectivity to the network is gained.

The last mechanism used to ensure prioritized recovery is priority service re-registration. This mechanism ensures that as services re-register themselves on the network and as users attempt to reconnect to servers that priority users are given first preference for access. Prioritized re-registration works similarly to priority reconnection—as devices attempt to connect to network resources they present their identity along with their priority credentials and are thus granted immediate access to network-available services such as messaging, conferencing, and data collection.

Live-network Upgrade

Publishing Software & Configuration Updates

Before an update can be applied it should first be published in an accessible and secure form. In the case of a distributed update system the update should be made available in at least one reliable hosting location ("trusted delegate") so that it will be available for download. The trusted delegate may be located using a network service location protocol (perhaps a network based distributed database such as a distributed hash table) or it may be explicitly designated. In whichever case, the notification of the update's existence should be published, and this is best done once again into a distributed database that supports update subscription (a method of automatic notification when a portion of the database changes).

Locating Updates

Once the update's location has been published it needs to be found by all clients needing notification for that particular update. To do this, a client needs to subscribe to the correct update feeds, and be able to inventory its installed software and configuration and map that data to a set of subscriptions to initiate. For software updates this is achieved by querying the native package management system on the device (for example the installed software list in the Windows Registry) for a list of installed software and then mapping those names into a standardized namespace for software packages, for example the SoftwareCorp CommunicationsApplication version 3.2.1 might map into the global namespace as "updates.softwarecorp.communicationsapplication.3.2.1." For a configuration update the device should look for its provisioning information in a location determined by its hardware type. In the case of an HP iPaq H5555 with serial number #123456 the path may resemble "hw.devices.hp.ipaq.h5555.123456." In either case the value stored at that location then resolves to a trusted delegate hosting the update data.

Managing Software Updates

Before installing an update the local machine should first verify that the update is installable under the local software update policy. This policy may be constructed using the infrastructure of the SNPP document framework, formalized as the set of circumstances under which a software update may or may not be installed taking into account factors such as current user activity level, administrative authorization, intra-organizational application compatibility, and cost. This policy will also determine what priority and scheduling will be placed on the update's installation. Once the update has passed the policy check a transfer may be initiated.

Transferring Updates

To transfer the update in a scalable manner consideration should be given to distributing the load of the file transfer and providing a method for cached copies of widely distributed updates around the network. While policy updates will tend to be small software updates may be anywhere from a few hundred kilobytes to a few hundred megabytes leading to potential congestion problems. Existing swarming file transfer techniques are sufficient for this purpose. Consideration also should to be given to the balance between impact on other users on the network as balanced against the urgency of update installation. The QoS settings of the update transfer should be set based on the determination of the update policy in order to ensure that urgent updates get transferred with the appropriate relative priority to non-critical updates and other traffic on the network.

Installing Policy Updates

Policy update installation is relatively simple when built on top of the secure network-portable policy infrastructure. The standard document authentication mechanism is used and the signer's credentials are verified to ensure that the policy update is authorized. Once the policy update has been applied software updates may be installed.

Installing Software Updates

Installation of software updates is a task best left to the native package management support built into the device's host operating system. In Microsoft Windows, the standard and best supported framework is MSI, and on that platform MSI is used. Under other operating systems this will vary, for example with RPM package format on Red Hat Linux or proprietary binary flash format on any number of embedded operating systems.

Delegated Offline Provisioning

NPSD containing set of policy, configuration, and signing data for a device

Publish the document on any number of provisioning data servers or trusted delegates Provisioning data may be handled in much the same way as software updates. See FIG. 37.

Identity-based Auditing

Identity-based auditing is an important tool for verifying compliance with laws and organizational policies. By providing strong authentication and cryptographically validateable identity information for activity logging mechanisms it is possible to validate member compliance with policies after the fact and offline. While it is possible to do full policy verification at all times on every device in a distributed fashion there are cases where it can impose significant overhead on normal operations. Because of this it is often desirable to delegate policy verification to an organizationally provided resource by flagging eligible events and transmitting them to a policy-compliance auditing system.

The first piece required is a set of criteria for what events will be logged. These criteria should be formalized and encoded as enabling criteria on a device-local auditing policy. This policy may define criteria such as activation when a policy verification is skipped because of a trust relationship with the remote end of a transaction or when access to a network resource is denied. Typically the criteria will specify common but noteworthy events such as these for the purposes of offloading a significant amount of policy verification work while limiting the amount of logging data to be stored and transmitted. When these events are transmitted they are encoded in the familiar network-portable secure document format including The nature of the activity The identities of all parties involved (typically the device's own identity and the remote device or service's identity)

Copies of applicable SNPP documents.

By including all of this data in the activity report it is possible to fully verify the policy compliance or noncompliance of the activity. The only requirement for a non-compliance to be discovered is that there be at least one party involved in the transaction who logs and transmits that particular activity report. With this criteria satisfied it is possible to discover and verify the great majority of policy noncompliance incidents in an automated fashion and in cases where resolution or adjustment should be done manually the data is at least made available to the person handling the resolution.

A method is described for employing multiple frequencies to provide a push-to-talk service. In various embodiments, the method comprises receiving a signal in a first frequency, down-converting the received signal to a digital signal, applying a business rule to the down-converted digital signal, and, when the business rule indicates that the signal should be transmitted in a second frequency, causing the down-converted digital signal to be translated to a second frequency and transmitted in the second frequency.

A system of employing multiple frequencies to provide a push-to-talk service is described. In various embodiments, the system comprises a first communications network and a first peering point communicably coupled to the first communications network that down-converts a signal received in a first frequency from the first network to a digital signal, transforms a payload of the digital signal, identifies a second network to which the signal should be transferred and provides the digital signal to a second peering point that is communicably coupled to the second network.

A computer-readable medium is described that has computer-executable instructions for performing a method of employing multiple frequencies. The method comprises receiving a signal in a first frequency, converting the received signal to an internal representation, applying a business rule to the converted signal, and, when the business rule indicates that the signal should be transmitted in a second frequency, causing the internal representation of the signal to be translated to a second frequency and transmitted in the second frequency.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A method of facilitating communications between wireless devices using multiple different frequencies via a peer-to-peer network that couples a first peering point to a second peering point, wherein the first peering point communicates with a plurality of first communication devices over a first wireless communications system using wireless signals of a first frequency, wherein the second peering point communicates with a plurality of second communication devices over a second wireless communications system using wireless signals of a second frequency, and wherein the second frequency is different from the first frequency, the method comprising:

receiving, at the first peering point, a down-converted first digital signal with first information from the second peering point,
wherein the first information in the down-converted first digital signal originated from a first one of the plurality of second communication devices that was communicated to the second peering point;
concurrently receiving, at the first peering point, a down-converted second digital signal with second information from the second peering point,
wherein the second information in the down-converted second digital signal originated from a second one of the plurality of second communication devices that was communicated to the second peering point;
applying, at the first peering point, a business rule to the down-converted first digital signal and the down-converted second digital signal,
wherein the business rule comprises a secure-network portable policy comprising enabling criteria and actions,
wherein the enabling criteria describes conditions that are to be in effect at an active peering point,
wherein the actions indicate actions to be taken by the active peering point when the secure-network portable policy becomes active, and
wherein the business rule includes a priority rule that indicates that the down-converted first digital signal has a higher priority than the down-converted second digital signal, and
at a time when the first communication system is approaching capacity, enforcing the priority rule by prioritizing the down-converted first digital signal over the down-converted second digital signal.

2. The method of claim 1, wherein enforcing the priority rule includes:
allowing only communications from the first one of the plurality of second communication devices through.

3. The method of claim 2, wherein allowing only communications from the first one of the plurality of second communication devices through includes:
translating, at the first peering point, the first information in the down-converted first digital signal into a first wireless signal configured to be communicated to a first one of the plurality of first communication devices;
communicating the first wireless signal with the first information from the first peering point to the first one of the plurality of first communication devices; and
not communicating the down-converted second digital signal.

4. The method of claim 1, wherein enforcing the priority rule includes:
communicating the down-converted first digital signal before the down-converted second digital signal.

5. The method of claim 4, wherein communicating the down-converted first digital signal before the down-converted second digital signal includes:
translating, at the first peering point, the first information in the down-converted first digital signal into a first wireless signal configured to be communicated to a first one of the plurality of first communication devices;
communicating the first wireless signal with the first information from the first peering point to the first one of the plurality of first communication devices; and
later translating, at the first peering point, the second information in the down-converted second digital signal into a second wireless signal configured to be communicated to a second one of the plurality of first communication devices,
wherein the second wireless signal with the second information is communicated from the first peering point to the second one of the plurality of first communication devices after communication of the first wireless signal has completed.

6. The method of claim 1, wherein applying the business rule further comprises:
receiving conditions that are published into a global condition namespace by a trusted entity, wherein the conditions are received by all peering points of the peer-to-peer network, wherein the condition identifies that the down-converted first digital signal is associated with the trusted entity having the higher priority, and wherein the down-converted first signal has a priority greater than the priority of all other wireless communications being communicated over the peer-to-peer network.

7. The method of claim 6, wherein the trusted entity is a government agency providing emergency services, and wherein the down-converted first signal is associated with an authorized responder to an emergency event.

8. The method of claim 1, wherein receiving the down-converted first digital signal includes:

receiving the down-converted first digital signal from a backbone network.

9. The method of claim 1, wherein the first wireless communication system is a land mobile radio (LMR) network.

10. The method of claim 1, wherein the first wireless communication system is a WiFi network.

11. A system for facilitating communications between wireless devices using multiple different frequencies, the system comprising:

a first peering point in a peer-to-peer network that couples the first peering point to a second peering point, wherein the first peering point communicates with a plurality of first communication devices over a first wireless communications system using wireless signals of a first frequency, wherein the second peering point communicates with a plurality of second communication devices over a second wireless communications system using wireless signals of a second frequency, and wherein the second frequency is different from the first frequency, wherein the first peering point is configured to:

receive, at the first peering point, a down-converted first digital signal with first information from the second peering point, wherein the first information in the down-converted first digital signal originated from a first one of the plurality of second communication devices that was communicated to the second peering point;

concurrently receive, at the first peering point, a down-converted second digital signal with second information from the second peering point, wherein the second information in the down-converted second digital signal originated from a second one of the plurality of second communication devices that was communicated to the second peering point;

apply, at the first peering point, a business rule to the down-converted first digital signal and the down-converted second digital signal, wherein the business rule comprises a secure-network portable policy comprising enabling criteria and actions, wherein the enabling criteria describes conditions that are to be in effect at an active peering point, wherein the actions indicate actions to be taken by the active peering point when the secure-network portable policy becomes active, and wherein the business rule includes a priority rule that indicates that the down-converted first digital signal has a higher priority than the down-converted second digital signal, and at a time when the first communication system is approaching capacity, enforcing the priority rule by prioritizing the down-converted first digital signal over the clown-converted second digital signal.

12. The system of claim 11, wherein the first peering point enforces the priority rule by:

allowing only communications from the first one of the plurality of second communication devices through.

13. The system of claim 12, wherein allowing only communications from the first one of the plurality of second communication devices through includes:

translating, at the first peering point, the first information in the down-converted first digital signal into a first wireless signal configured to be communicated to a first one of the plurality of first communication devices;

communicating the first wireless signal with the first information from the first peering point to the first one of the plurality of first communication devices; and not communicating the down-converted second digital signal.

14. The system of claim 11, wherein the first peering point enforces the priority rule by:

communicating the down-converted first digital signal before the down-converted second digital signal.

15. The system of claim 14, wherein communicating the down-converted first digital signal before the down-converted second digital signal includes:

translating, at the first peering point, the first information in the down-converted first digital signal into a first wireless signal configured to be communicated to a first one of the plurality of first communication devices;

communicating the first wireless signal with the first information from the first peering point to the first one of the plurality of first communication devices; and later translating, at the first peering point, the second information in the down-converted second digital signal into a second wireless signal configured to be communicated to a second one of the plurality of first communication devices, wherein the second wireless signal with the second information is communicated from the first peering point to the second one of the plurality of first communication devices after communication of the first wireless signal has completed.

16. The system of claim 11, wherein the first peering point enforces the business rule further by:

receiving conditions that are published into a global condition namespace by a trusted entity, wherein the conditions are received by all peering points of the peer-to-peer network, wherein the condition identifies that the down-converted first digital signal is associated with the trusted entity having the higher priority, and wherein the down-converted first signal has a priority greater than the priority of all other wireless communications being communicated over the peer-to-peer network.

17. The system of claim 16, wherein the trusted entity is a government agency providing emergency services, and wherein the down-converted first signal is associated with an authorized responder to an emergency event.

18. The system of claim 11, wherein the first wireless communication system is a land mobile radio (LMR) network.

19. The system of claim 11, wherein the first wireless communication system is a WiFi network.

20. The system of claim 11, further comprising the peer-to-peer network, and wherein the first peering point receives the down-converted first digital signal from a backbone network.

\* \* \* \* \*

UNITED STATES PATENT AND TRADEMARK OFFICE
CERTIFICATE OF CORRECTION

PATENT NO. : 10,098,132 B2
APPLICATION NO. : 14/886704
DATED : October 9, 2018
INVENTOR(S) : Mark L. Tucker et al.

Page 1 of 1

It is certified that error appears in the above-identified patent and that said Letters Patent is hereby corrected as shown below:

In the Claims

• Claim 11, Column 46, Line 2, should read as follows:
over the down-converted second digital signal.

Signed and Sealed this
Twenty-second Day of January, 2019

Andrei Iancu
*Director of the United States Patent and Trademark Office*